INVENTOR
G. J. KNANDEL
BY R. C. Perry
ATTORNEY

INVENTOR
G. J. KNANDEL
BY R. C. Terry
ATTORNEY

INVENTOR
G. J. KNANDEL
BY R. C. Terry
ATTORNEY

INVENTOR
G. J. KNANDEL
BY R. C. Terry
ATTORNEY

Oct. 6, 1953 G. J. KNANDEL 2,654,797

TELETYPEWRITER SWITCHING SYSTEM

Filed Sept. 1, 1949 23 Sheets-Sheet 5

INVENTOR
G. J. KNANDEL
BY
R. C. Terry
ATTORNEY

Oct. 6, 1953 G. J. KNANDEL 2,654,797

TELETYPEWRITER SWITCHING SYSTEM

Filed Sept. 1, 1949

23 Sheets-Sheet 6

INVENTOR
G. J. KNANDEL
BY R. C. Terry
ATTORNEY

Oct. 6, 1953 G. J. KNANDEL 2,654,797

TELETYPEWRITER SWITCHING SYSTEM

Filed Sept. 1, 1949 23 Sheets-Sheet 7

INVENTOR
G. J. KNANDEL
BY R. C. Terry
ATTORNEY

INVENTOR
G. J. KNANDEL
BY R. C. Perry
ATTORNEY

INVENTOR
G. J. KNANDEL
BY R.C. Terry
ATTORNEY

Oct. 6, 1953 G. J. KNANDEL 2,654,797

TELETYPEWRITER SWITCHING SYSTEM

Filed Sept. 1, 1949 23 Sheets-Sheet 10

INVENTOR
G. J. KNANDEL
BY R. C. Perry
ATTORNEY

INVENTOR
G. J. KNANDEL
BY R. C. Lerry
ATTORNEY

Oct. 6, 1953 G. J. KNANDEL 2,654,797

TELETYPEWRITER SWITCHING SYSTEM

Filed Sept. 1, 1949 23 Sheets-Sheet 12

INVENTOR
G. J. KNANDEL
BY
R. C. Terry
ATTORNEY

INVENTOR
G. J. KNANDEL
BY R. C. Perry
ATTORNEY

INVENTOR
G. J. KNANDEL
BY R. C. Terry
ATTORNEY

INVENTOR
G. J. KNANDEL
BY R. C. Perry
ATTORNEY

INVENTOR
G. J. KNANDEL
BY R. C. Terry
ATTORNEY

INVENTOR
G. J. KNANDEL
BY R. C. Terry
ATTORNEY

INVENTOR
G. J. KNANDEL
BY R. C. Terry
ATTORNEY

INVENTOR
G. J. KNANDEL
BY R. C. Perry
ATTORNEY

Oct. 6, 1953 G. J. KNANDEL 2,654,797

TELETYPEWRITER SWITCHING SYSTEM

Filed Sept. 1, 1949 23 Sheets-Sheet 20

INVENTOR
G. J. KNANDEL
BY R. C. Terry
ATTORNEY

Oct. 6, 1953 G. J. KNANDEL 2,654,797

TELETYPEWRITER SWITCHING SYSTEM

Filed Sept. 1, 1949 23 Sheets-Sheet 21

INVENTOR
G. J. KNANDEL
BY R. C. Terry
ATTORNEY

Oct. 6, 1953 G. J. KNANDEL 2,654,797

TELETYPEWRITER SWITCHING SYSTEM

Filed Sept. 1, 1949 23 Sheets-Sheet 22

INVENTOR
G. J. KNANDEL
BY R. C. Terry
ATTORNEY

INVENTOR
G. J. KNANDEL
BY R. C. Terry
ATTORNEY

Patented Oct. 6, 1953

2,654,797

UNITED STATES PATENT OFFICE 2,654,797

TELETYPEWRITER SWITCHING SYSTEM

George J. Knandel, Glen Rock, N. J., assignor to Bell Telephone Laboratories, Incorporated, New York, N. Y., a corporation of New York Application September 1, 1949, Serial No. 113,631

19 Claims. (Cl. 178—2)

This invention relates to teletypewriter exchange systems and particularly to those systems characterized by the provision of one or more unattended automatic switching centers for establishing communication circuits between a central office and a plurality of subscriber stations, the telegraph lines of which terminate in the automatic switching center.

Teletypewriter exchange systems of the type in which an automatic switching center is interposed between a group of subscriber stations and a central office are frequently identified as "satellite office" systems or "concentrator unit" system. They have especial utility under the circumstance that the traffic between a central office and a plurality of subscriber stations in a relatively remote area may be handled over a considerably smaller number of communication circuits than the number of subscriber stations in the area. Accordingly, an unattended automatic switching or "satellite" center is located in the general area of the subscriber stations, the lines of the subscriber stations terminate in the automatic switching center, and a number of trunk circuits sufficient to accommodate average peak loads of traffic interconnect the automatic switching center and a central office. The subscriber station lines have access to the trunk circuits and vice versa through the automatic switching mechanism of the unattended switching center.

Systems of the above described type with reference to which the present invention represents a modification and improvement, are shown in Patent 2,228,279, granted January 14, 1941 to C. W. Lucek, Patent 2,340,599, granted February 1, 1944 to F. S. Kinkead et al., and Patent 2,363,666 granted February 6, 1945 to J. A. Krecek, and the disclosures of these patents are incorporated herein by reference as part of the present specification.

The systems shown in the Lucek, Kinkead et al. and Krecek patents are predicated upon a traffic situation in which a very large percentage of the traffic passing through the automatic switching center involves intercommunication between any subscriber station served by that automatic switching center and a subscriber station located in a distant area and served directly or indirectly by the central office, so as to be reachable only through that office. In accordance with this premise the systems shown in the patents above-identified have no provision for direct intercommunication between two subscriber stations served by an unattended automatic switching center through that center, and such intercommunication may be had only by the completion of a communication channel from a calling subscriber station through the automatic switching center and over one of the trunk circuits to the central office, the completion of a communication circuit from the central office over another of the trunk circuits and through the automatic switching center to the called subscriber station, and the interconnection of the two trunk circuits at the central office.

It is an object of the present invention to provide in a "satellite office" type of teletypewriter switching system, switching mechanism by means of which any subscriber station served by that center may have direct access to the line of any other subscriber station served by that center as well as access to any trunk circuits extending to a central office.

It is a further object of the invention to provide message storage mechanism and switching means for automatically associating the message storage mechanism with a calling subscriber's line or with a trunk circuit over which a message is to be transmitted from the central office, when the called subscriber's line is busy, so that from the standpoint of the calling station, wherever located, message transmission proceeds as if the connection had actually been extended through to the called subscriber's line, and the storage message is retransmitted to the called subscriber's line when that line becomes idle.

According to the present invention, there have been added to the automatic switching center of the type shown in the patents identified above, communication circuits somewhat in the nature of trunk circuits, but located wholly within the automatic switching office, and adapted to interconnect the lines of two subscriber stations served by the automatic switching office, and these circuits will hereinafter be referred to as line junctors. Any subscriber station served by the automatic switching center has access to the line junctors in addition to having access to the trunk circuits as disclosed in the patents. A line junctor may be seized in response to the placing of a call for any other subscriber station served by the automatic switching center, to establish a communication path between the calling subscriber station and the called subscriber station in the event that the latter station is idle. In the event that the called subscriber station is busy, the line junctor establishes a communication path between the calling subscriber station and an idle one of a plurality of overflow lines contained wholly within the automatic switching center and terminating in a reperforator. Upon the completion of the communication path to the called subscriber station or to an overflow line, a signal is transmitted to the calling subscriber authorizing him to proceed with message transmission. At the conclusion of the message transmission, the calling subscriber transmits a disconnect or end of message signal which is effective to restore the line junctor circuit to normal condition, thereby disconnecting the calling subscriber's line from the called subscriber's line or from the overflow line as the case may be.

In the case of the storing of the message by the reperforator of an overflow line, the tape containing the message is placed in a transmitter from which a communication path may be extended by a patching cord to a jack associated with the called subscriber's line. When the called subscriber's line becomes idle, this connection is made, the called subscriber is rung to start the receiving apparatus and render it receptive to the message, and the transmitter is started. Thereafter, the message is transmitted to the called subscriber station and at the end of the message a disconnect signal perforated in the tape as a part of the message storing operation shuts down the called subscriber station, and this operation causes a disconnect indicator to be activated at the switching center. Thereupon the attendant removes the cord connection.

As is disclosed in the patents above identified, a call from the central office to a subscriber station served by the automatic switching center arrives at the automatic switching center over one of the trunk circuits and causes a director circuit to operate the link circuit to connect the trunk circuit to the called subscriber's line. In accordance with the present invention, when the director circuit seeks to connect the trunk circuit through the link circuit to a subscriber's line that is busy, the director causes the trunk circuit to be connected instead to an idle one of the overflow lines which terminate in reperforators. Thereupon, a signal is returned to the central office authorizing the transmission of the message to begin and the message will be recorded in the form of perforated tape. The disconnect signal transmitted from the central office at the end of the message will cause the trunk circuit to be disconnected from the overflow line and to be restored to normal and thereafter the retransmission of the stored message to the called subscriber station is handled in the manner hereinbefore described.

In the case of a call from one subscriber to another served by the automatic switching station, the seizure of a line junctor by the calling station is substantially the equivalent of an incoming call on a trunk circuit, the director circuit being caused to operate the link circuit to connect the seized line junctor to the called subscriber's line. If the director circuit finds that the called subscriber's line is busy, it connects the line junctor to an overflow line and the call proceeds as hereinbefore described.

For a complete understanding of the invention reference may be had to the following detailed description to be interpreted in the light of the accompanying drawings comprising 23 sheets, the first of which contains Figs. 1 and 24 and the remainder of which contain single figures.

Figure 18:
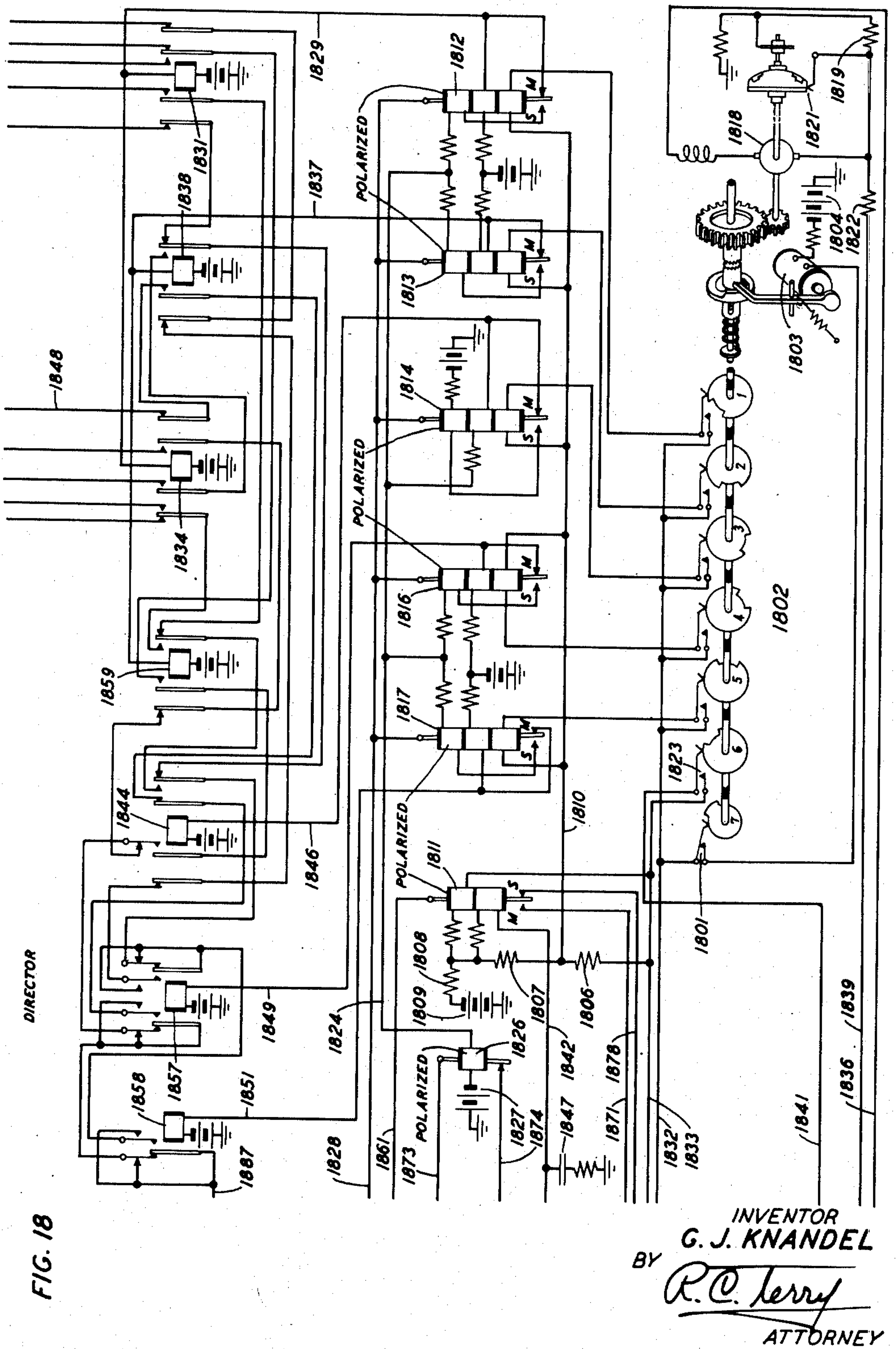
Figure 19:
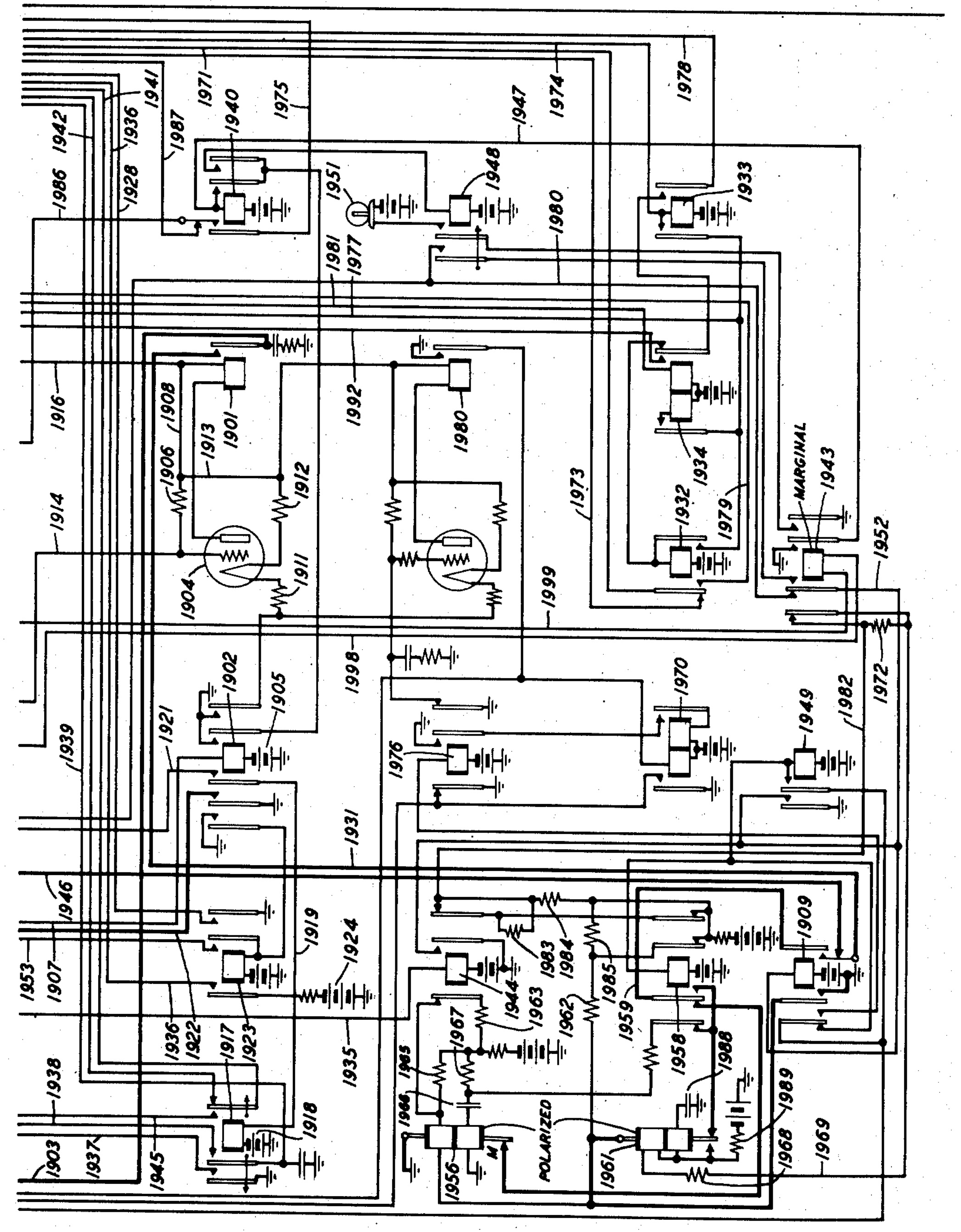

The numbering of the various pieces of apparatus and parts of the circuit shown on the various figures has been kept to a rigid plan. Thus all numerals on Fig. 2, for instance, are numerals between 200 and 299, the hundreds numeral designating the figure of the drawing and the other two digits being the reference designation for the particular element in that figure. Likewise, for example, all of the numerals in Fig. 18 lie between 1800 and 1899, and thus begin with the numeral 18 designating the figure.

*Manual transmitting local subscriber station initiates call*

Figures 1, 24:
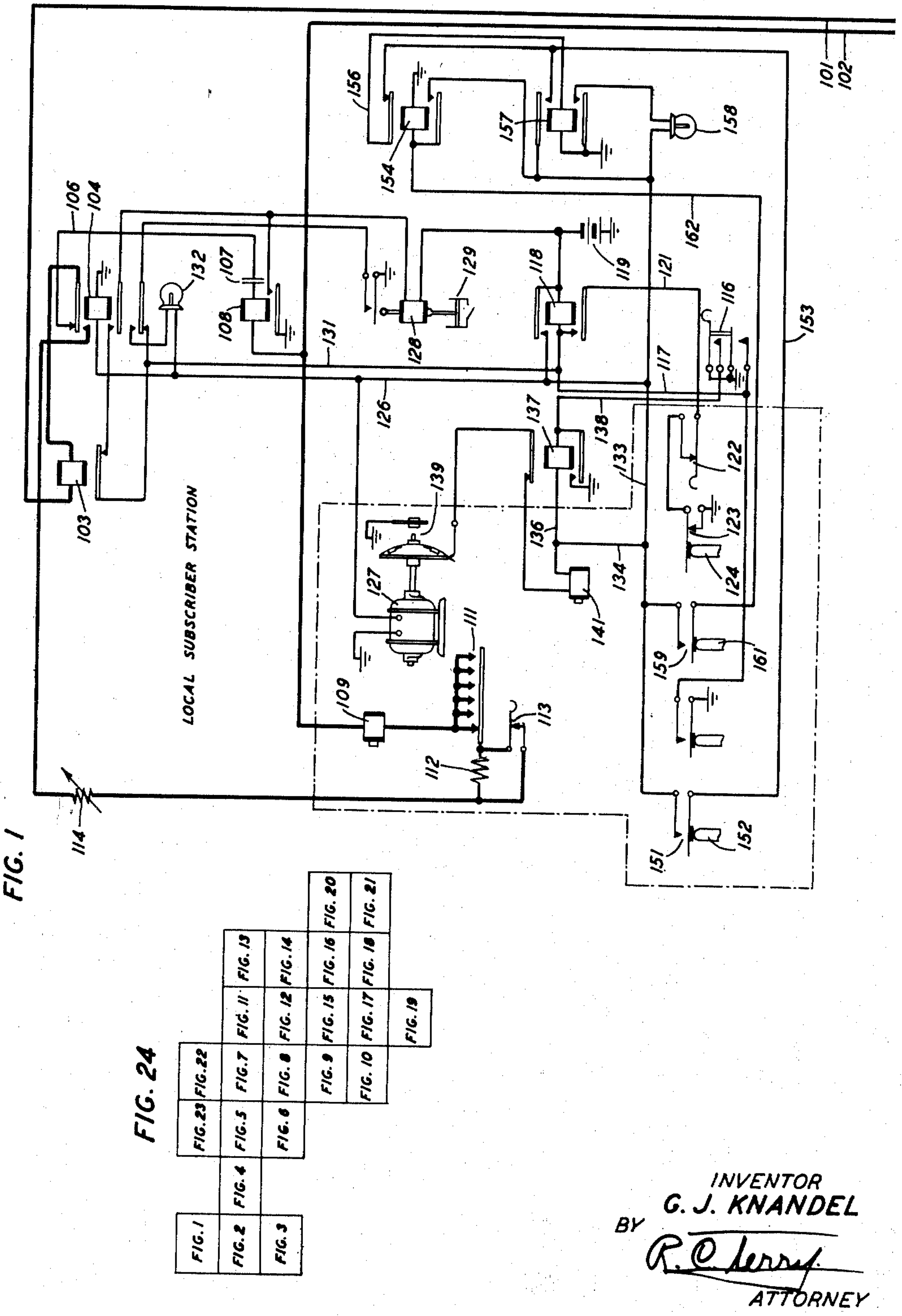
Fig. 1 shows a local subscriber station circuit for an attended station arranged for keyboard transmission only.
Fig. 24 is a block diagram showing how Figs. 1 to 23, inclusive, may be placed to form a complete circuit diagram.

In Fig. 1 the conductors 101 and 102 designate the two sides of a subscriber's loop by which the local subscriber station of Fig. 1 is connected to the automatic switching center. Conductor 101 extends through the winding of a relay 103 to the upper armature of a relay 104, which is deenergized when the station is shut down, so that the circuit is extended through the upper back contact of relay 104, conductor 106, condenser 107 and winding of alternating current relay 108 to the other line conductor 102. Line conductor 102 extends through a winding of the selector magnet 109 of a teletypewriter printer, keyboard transmitting contacts 111, resistor 112 shunted by normally closed break key 113 and variable resistance 114 to the upper front contact of relay 104. The selector magnet 109 represents and will hereinafter be referred to as the teletypewriter printer and this printer may be of the type shown in Patent 1,904,164, granted April 18, 1933 to S. Morton et al. Keyboard controlled transmitting contacts represented by the contacts 111 are also disclosed in this patent and the disclosure of the patent is incorporated herein by reference as part of the present specification.

The station may be activated in preparation for the transmission of a message by the closure of key 116 which completes a circuit from ground through the lower make contacts over conductor 117 and winding of relay 118 to grounded battery 119. Relay 118 completes a holding circuit from battery 119 through its winding and front contact and lower armature, conductor 121, manually operable normally closed emergency stop contacts 122 and normally closed contacts 123 which may be opened by the signal responsive operation of signal responsive element 124 forming a part of teletypewriter 109. It will be apparent that it is only necessary to hold key 116 closed momentarily until relay 118 operates and locks.

At its upper armature and front contact, relay 118 completes a circuit from battery 119 through conductor 126 to operating motor 127 of teletypewriter 109 and to relay 104. At its upper armature and back contact, the relay 104 disconnects condenser 107 and relay 108 from bridging relation to line conductors 101 and 102 and establishes a terminating loop for conductors 101 and 102 through relay 103, variable resistor 114, resistor 112 shunted by break key 113, keyboard transmitter 111 and teletypewriter 109.

At its inner lower armature, the relay 104 completes a circuit from battery 119 through a slow-operate relay 128 the delay in the operation of which may be provided by a dash-pot mechanism 129, inner lower armature and front contact of relay 104, back contact and armature of relay 103, conductor 131, to ground through the lower front contact and armature of relay 118, conductor 121, contacts 122 and 123. Relay 128 does not become energized over this circuit at this time because relay 103 operates on line current through the loop completed by relay 104 and interrupts the energizing circuit of relay 128 before that relay has had time to operate. The line current which operates relay 103 flows from a source, hereinafter to be identified at the automatic switching station, as soon as relay 104 substitutes the direct current path including printer 109, transmitter 111, break key 113 and resistor 114 for the direct current blocking path including condenser 107 and alternating current relay 108. For a reason which will be set forth hereinafter, two different methods of placing a call are contemplated, one involving merely the momentary operation of key 116, the other involving the operation of key 116 with break key 113 held open. In the former case, full line current flows upon the operation of relay 104, and in the latter case reduced current flows as a result of removal of the shunt around resistor 112. Either value of current is sufficient to operate relay 103.

With relay 118 operated from key 116 as previously described and key 116 not yet released, a circuit is traced from battery 119 through the upper armature and front contact of relay 118 downwardly along conductor 126, through conductors 133, 134 and 136, winding of relay 137, conductor 138 and upper make contacts of key 116 to ground. Relay 137 operates and connects ground through its lower front contact and armature to the right hand terminal of its winding in substitution for the ground supplied over conductor 138 from key 116 so that relay 137 will be held operated after key 116 is released.

Motor 127 is provided with centrifugally operable make contacts 139 for completing the circuit of an answer-back magnet 141. An answer back is required only when the station is to be started on an unattended basis under remote control for the purpose of receiving a message, and accordingly the upper armature and back contact of relay 137 are interposed between the centrifugally controlled contacts 139 and magnet 141, so that when the station is started on an attended basis by operation of key 116 for the purpose of transmitting a message, relay 137 will disable the circuit of answer-back magnet 141 before the circuit of that magnet can be completed by the centrifugally operable contacts 139, and answer-back magnet 141 will not be operated.

The operations thus far described, responsive to operation of key 116, represent the initiation of a call by the attendant at the local subscriber station shown in Fig. 1 and no further operation is necessary until the automatic switching center to which line conductors 101 and 102 extend responds to the initiation of the call, in the manner which will be described hereinafter. By way of summary, the condition of the station is assumed to be that relays 103, 104, 118, and 137 are operated, and motor 127 running.

*Tape transmitting local subscriber station initiates call*

Figure 2:
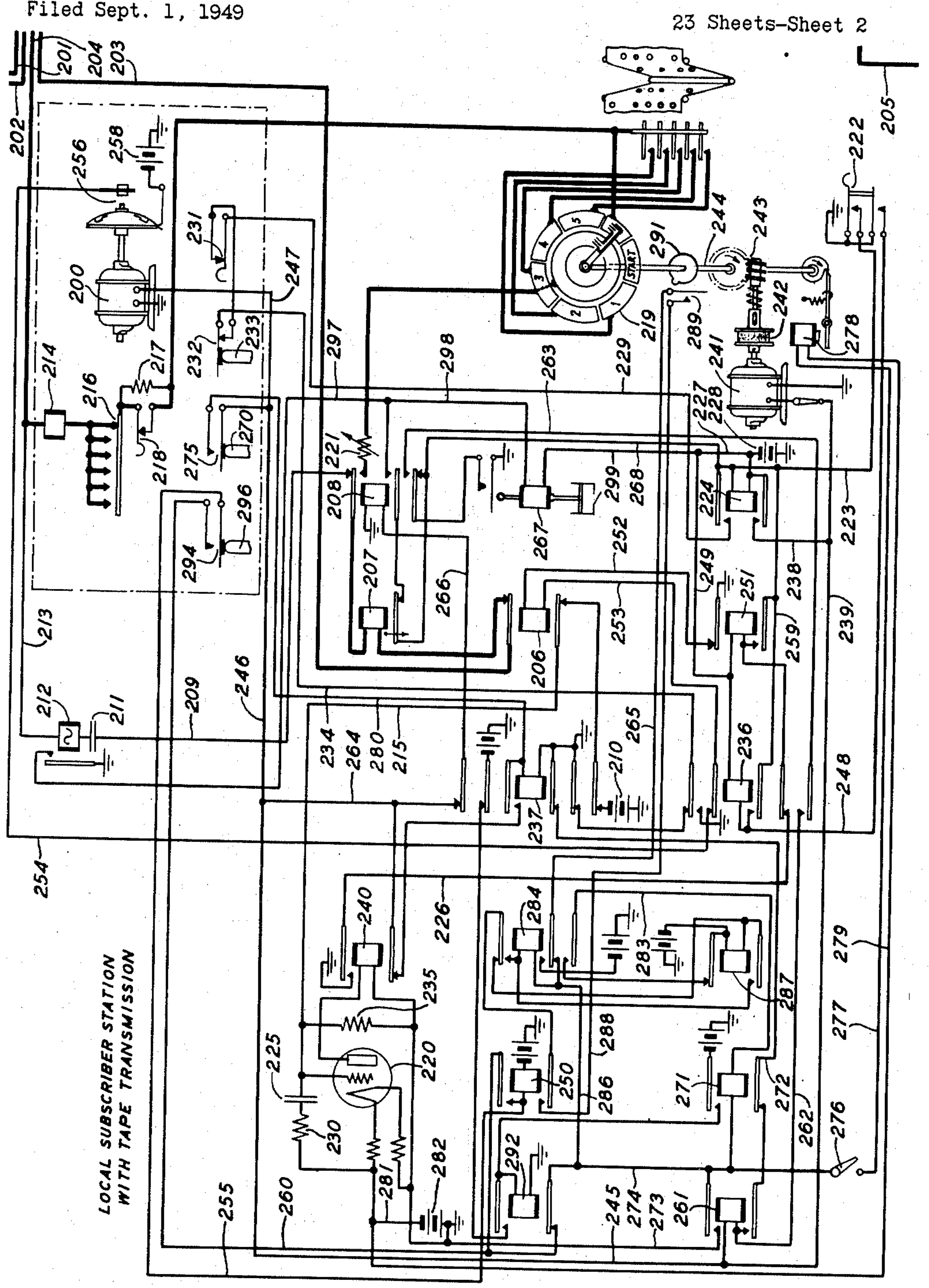
Fig. 2 shows a local subscriber station circuit arranged for operation on an unattended basis, and provided with keyboard and tape transmitters.

Fig. 2 shows an alternative form of local subscriber station which differs from that of Fig. 1 in several respects, an important one of which being that the station is provided with a tape transmitter as well as a keyboard transmitter.

Referring now to Fig. 2, the conductors 203 and 204 designate the two sides of a subscriber's loop by which the subscriber station of Fig. 2 is connected to the automatic switching center. Conductor 203 extends through the upper armature and back contact of a relay 206 and through the winding of a relay 207 to the upper armature of a relay 208 which is deenergized when the station is shut down, so that the circuit is extended through the upper back contact of relay 208, conductor 209, condenser 211, winding of alternating current relay 212 and conductor 213 to the other line conductor 204. Line conductor 204 extends through the winding of the selector magnet 214 of a teletypewriter printer which may be similar to that designated by the reference numeral 109 in Fig. 1, keyboard transmitting contacts 216 which may be similar to the keyboard transmitter 111 in Fig. 1, resister 217 shunted by normally closed break key 218, stop segment, brushes and collector ring of a tape transmitter 219 and variable resistor 221 to the upper front contact of relay 208. Tape transmitter 219 may be of the type shown in Patent 2,055,567, granted September 29, 1936 to E. F. Watson, and the disclosure of this patent is incorporated in by reference to the same extent as if included in its entirety.

The station may be activated in preparation for the transmission of a message by the closure of key 222. At the upper contacts ground is connected over conductor 223 through the winding of relay 224 to conductor 227 to which grounded battery 228 is connected. Relay 224 becomes operated over this circuit. At the upper armature and front contact of relay 224 a holding circuit is completed from the upper terminal of the relay through conductor 229, normally closed emergency stop contacts 231 which are manually operable, normally closed contacts 232 which may be opened by the signal responsive operation of signal responsive element 233 forming part of teletypewriter 214, conductor 234 outer upper armature and back contact of relay 236 and middle lower back contact and armature of relay 237 to ground. At the lower armature and front contact of relay 224 a circuit is completed from battery 228 through, the relay armature and front contact just mentioned, conductor 238 and the rightwardly extending portion of conductor 239 and motor 241 to ground, starting the motor which is provided for driving the distributor 219 through friction clutch 242, gearing 243 and shaft 244. The same battery connection is extended leftwardly through conductor 239 and through conductors 245, 246, 247 and motor 200 to ground, thus starting motor 200 which is provided for driving teletypewriter printer 214 and keyboard transmitter 216.

Key 222 also connects ground through its lower pair of contacts, conductor 248, winding of relay 236 and conductors 249 and 227 to battery 228 thus causing relay 236 to be operated. At its outer upper armature the relay 236 transfers the holding circuit for relay 224 from the ground connection supplied through the middle lower armature and back contact of relay 237 to ground on the front contact which the outer upper armature of relay 236 now engages. At its upper armature the relay 236 disables the energizing circuit for relay 206 to prevent the energization of that relay over a circuit traced from ground on the upper armature of relay 251 through conductor 252, the winding of relay 206, conductor 253, inner upper armature and back contact of relay 236, conductor 254, and centrifugally operated contacts 256 which close when motor 200 comes up to operating speed, to battery 258. At its inner lower armature relay 236 constitutes for the ground connection supplied from key 222 through conductor 248 the ground connection supplied over conductor 229 and through the upper front contact and armature of relay 224, conductor 259 and the innermost lower armature of relay 236, thus establishing a holding circuit for that relay. At its middle lower armature relay 236 disables the energizing circuit for relay 251. At its outer lower armature relay 236 prepares an energizing circuit for a relay 261, the path being traced from the lower terminal of that relay through conductor 262, the front contact and outer lower armature of relay 236 and conductor 263 to the front contact associated with the outer lower armature of relay 208.

At the time that relay 224 connected battery 228 over conductors 239 and 245 to conductor 246 this connection was extended from conductor 245 through conductor 264, the back contact and outermost upper armature of relay 237, conductor 266 and winding of relay 208 to ground thus operating the relay 208. At its upper armature the relay 208 closes a direct current loop between line conductors 203 and 204, opening the circuit of alternating current relay 212. With the direct current loop completed, relay 207 operates on current supplied over the line conductors from the automatic switching center. As in the case of the station shown in Fig 1, a call may be initiated at the station shown in Fig. 2 without or with break key 231 operated. In the latter case, reduced line current will flow when relay 208 operates, due to the presence in the circuit of resistor 217 when break key 218 is open, but either value of current is sufficient to operate relay 207. Relay 208 seeks to complete an energizing circuit for slow-operate relay 267, the circuit being traced from battery 228 through conductors 227 and 299, winding of the relay 267, conductor 298 the inner lower armature and front contact of relay 208, the back contact and armature of relay 207, and conductor 268 to the upper armature of relay 224, which is grounded over a circuit previously traced. However, relay 207 operates immediately after relay 208, and prevents the completion of this circuit. Relay 208 also prepares an energizing circuit for relay 261, which is traced from the make contacts of relay 267, prevented from operating by relay 207, conductor 263, outermost lower armature and front contact of relay 236, conductor 262, winding of relay 261, conductors 239 and 238, front contact and lower armature of relay 224, conductor 227 to battery 228. With the station shown in Fig. 2 in the condition thus far described, namely, with the motors running and relays 208, 224 and 236 energized, the station awaits the response of the satellite office station to the call thus initiated.

*Toll subscriber station initiated a call*

Figure 3:
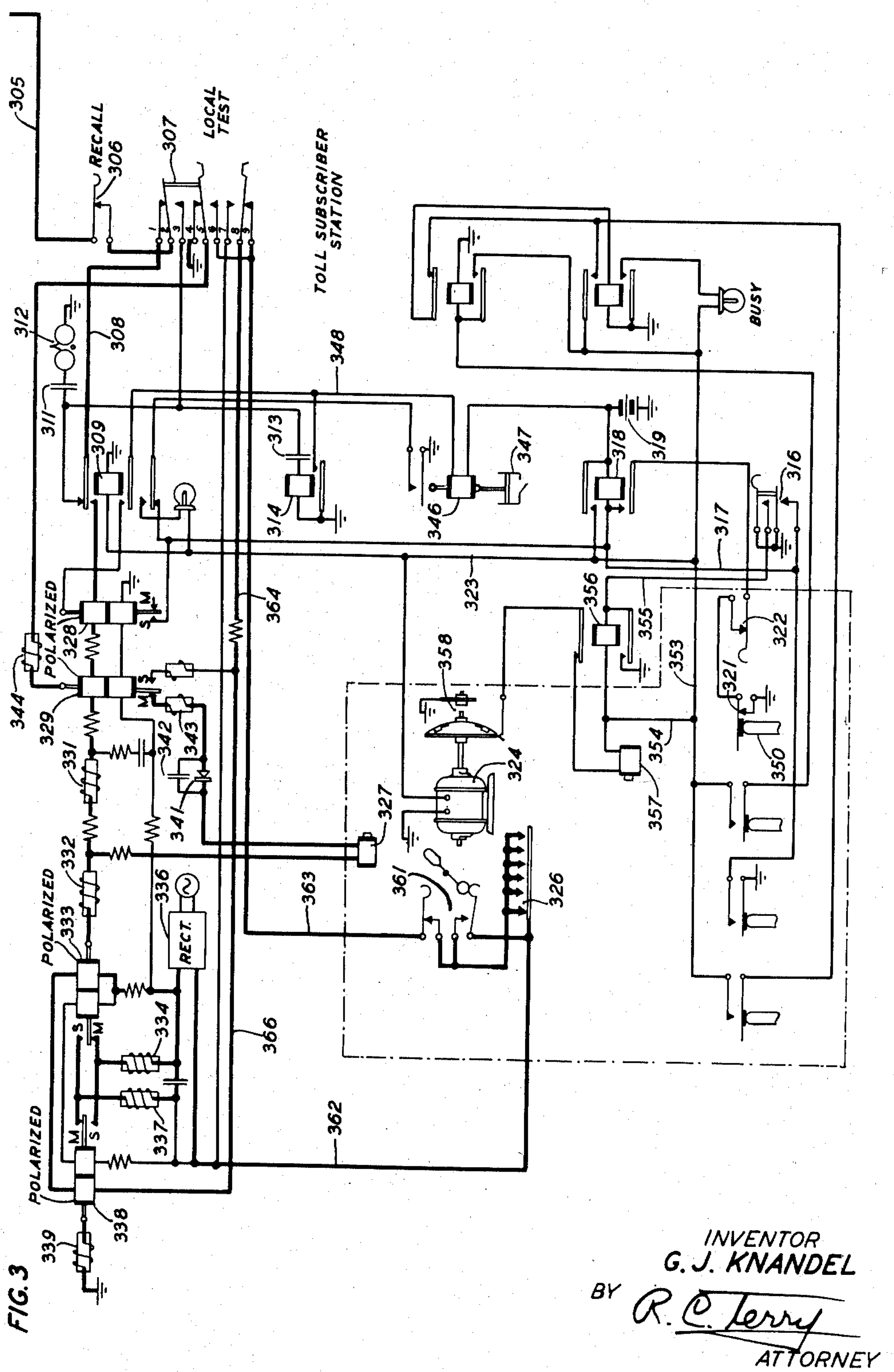
Fig. 3 shows a toll subscriber station circuit.

The circuit of a toll subscriber station is shown in Fig. 3. A single line conductor 305 extends from the toll subscriber station to the automatic switching center and with the toll subscriber station in the shut-down condition the line conductor 305 is terminated in a path through the normally closed recall key 306, springs 1 and 2 of a local test key 307, conductor 308, upper armature and back contact of a relay 309, condenser 311 and ringer 312 to ground and in parallel therewith through condenser 313 and alternating current relay 314 to ground. A call is initiated by the momentary operation of call key 316 which completes a circuit from ground through the lower make contacts of the key, conductor 317 and winding of relay 318 to ground battery 319. At its lower armature and front contact relay 318 establishes a holding circuit from ground through the normally closed selectively operable stop contacts 321 and normally closed manually operable emergency stop contacts 322. At its upper armature and front contact the relay 318 connects battery 319 to a conductor 323. A path extends from conductor 323 through motor 324 to ground so that the motor is set in operation. Motor 324 is employed for driving a keyboard transmitter 326 and a teletypewriter printer represented by selector magnet 327. A path also extends from conductor 323 through the winding of relay 309 to ground so that this relay operates.

At the upper armature of relay 309, conductor 308, which is the extension of line conductor 305 is disconnected from ringer 312 and alternating current relay 314 and is connected through the operating winding of biased polar relay 328, the operating winding of biased polar receiving relay 329, interference suppressor coils 331 and 332, armature and marking contact of biased polar transmitting relay 333, interference suppressor coil 334 to the negative terminal of direct current power supply 336. The positive terminal of the power supply 336 is connected through interference suppressor coil 337, the marking contact and armature of biased polar transmitting relay 338 and interference suppressor coil 339 to ground. From the junction of interference suppressor coils 331 and 332 a branching path is traced through selector magnet 327 of the teletypewriter printer, which may be of the same type as that shown in Figs. 1 and 2, varistor 341 shunted by condenser 342, interference suppressor coil 343, marking contact and armature of receiving relay 329, interference suppressor coil 344 and springs 5 and 4 of local test key 307 to ground. From this it will be apparent that if line conductor 305 is connected at the automatic switching center to ground or to battery or other direct current power supply in series aiding relation to the power supply at the subscriber station, to cause marking current to flow over line conductor 305 to ground at the left hand terminal of coil 339, the armature of receiving relay 329 will be operated to marking and selector magnet 327 will be energized, the varistor 341 being so connected as to present low impedance to current in one direction, which is the marking condition, and to present high impedance to current in the opposite direction, which is the spacing condition.

At its inner lower armature and front contact the relay 309 prepares a path from battery 319 through the winding of relay 346, which has a slow operate characteristic by virtue of dash-pot 347, conductor 348, inner lower armature and front contact of relay 309 to the armature of relay 328. Relay 328 has no circuit connection to its marking contact, but only to its spacing contact. With relay 309 operated, marking current flows in the line and operates relay 328 to marking, thus preventing the completion, by the inner lower armature and front contact of relay 309, of the operating circuit of slow-operate relay 346.

A further circuit completed by relay 318 is traced from battery 319 through the upper armature and front contact of the relay, downwardly from the front contact along conductor 323, conductors 353 and 354, winding of relay 356, conductor 355 and upper make contacts of key 316 to ground, operating relay 356. At its upper armature relay 356 disables the energizing circuit for answer-back magnet 357 so that that magnet will not be operated when centrifugally operated contacts 358 close as motor 324 comes up to speed. At its lower armature and front contact the relay 356 supplies a ground connection for holding itself operated after key 316 is released. The station is now in condition for the transmission of messages into the automatic switching center, with relays 309, 318, and 356 energized and relays 328 and 329 operated to marking.

A call may be placed from the station shown in Fig. 3 in either of two ways, namely, with break key 361 closed or open. The break key is included in a circuit traced from the positive terminal of power source 336 through conductor 362, transmitting contacts 326, break contacts of key 361, conductor 363, springs 8 and 9 of test key 307, conductors 364 and 366, operating windings of transmitting relays 338 and 333 to the negative terminal of power source 336. With this circuit closed, the relays will be operated to marking and impress a marking potential upon line conductor 305 when relay 309 operates. If break key 361 is open when key 316 is operated, this circuit will be open, the transmitting relays will be operated to spacing by current through their biasing windings from power source 336, and upon the operation of relay 309, a spacing potential will be impressed on line conductor 305.

*Toll subscriber's line circuit responds to call*

Figure 4:
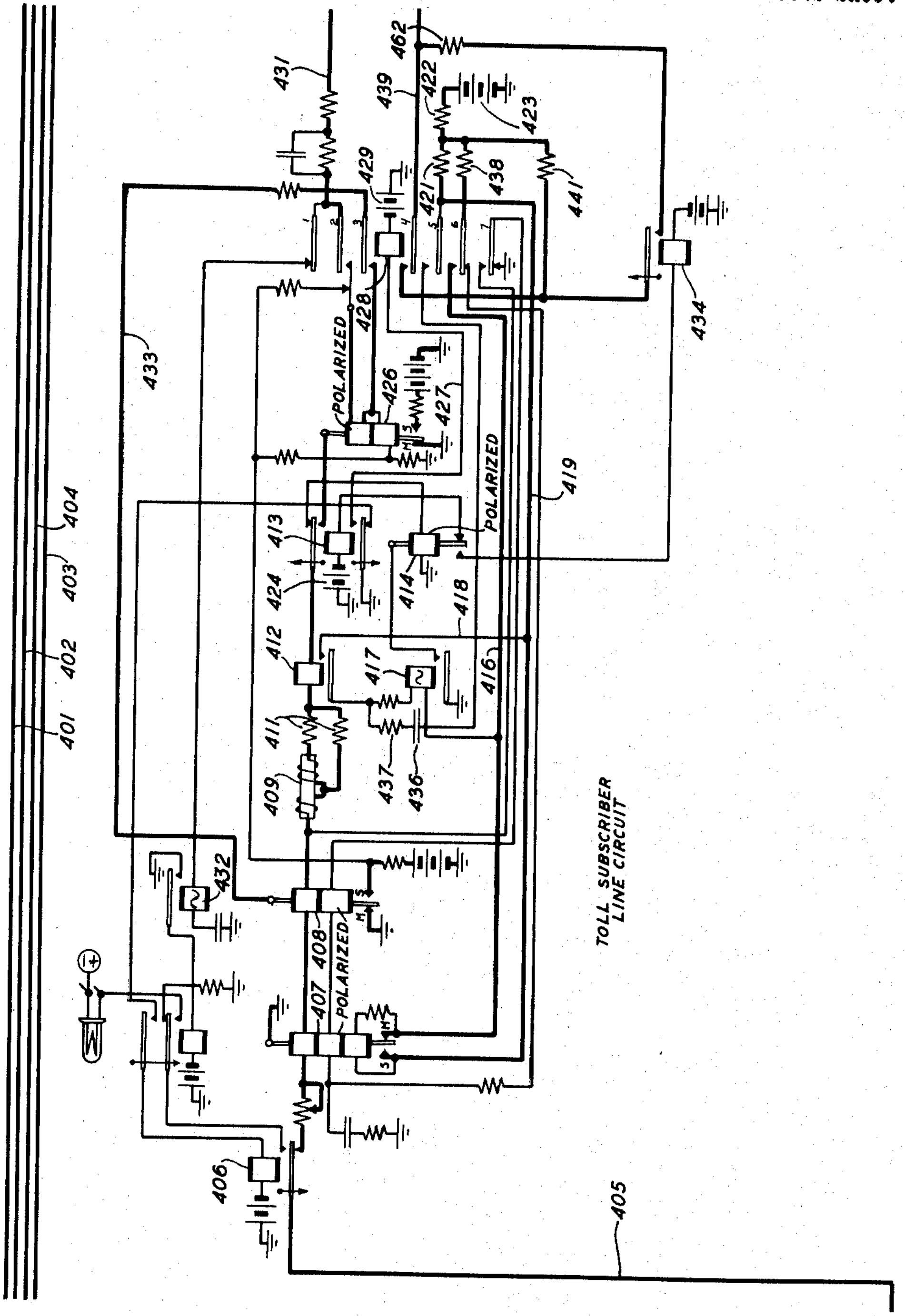
Fig. 4 shows a toll subscriber's line termination circuit.

Line conductor 305 is extended through Fig. 2 as conductor 205 and into Fig. 4 as conductor 405 where a path is traced through the armature and back contact of relay 406, the operating winding of repeating relay 407, operating winding of signal repeating relay 408, retardation coil 409 and associated resistors 411, winding of relay 412, upper armature and back contact of slow release relay 413 and winding of relay 414 to ground. Relay 414 is polarized and is so connected that it does not operate on marking current from the toll subscriber station, but does operate on spacing current. Relay 412 operates upon the completion of the line circuit at the toll subscriber station for the flow of current over line conductor 305 regardless of the polarity of that current. Relay 412 completes a circuit traced from ground on the armature of relay 407 through the marking contact, conductor 416, winding of alternating current relay 417, armature and front contact of relay 412, conductors 418 and 419, resistors 421 and 422 to battery 423. Relay 417, being an alternating current relay, will also energize on direct current and accordingly operates, completing a circuit from ground through its armature and front contact, the armature and right-hand contact of relay 414, assuming that the station in Fig. 3 impresses marking potential on line 305, and the winding of relay 413 to battery 424, thus operating relay 413. At its upper armature the relay 413 interrupts the circuit through the winding of relay 414 and transfers the line circuit extending to the toll subscriber station to the armature of repeating relay 426 which engages the grounded marking contact. The flow of marking current in the line is maintained since the ground on the marking contact of relay 426 is substituted for the ground on the winding of relay 414.

At its lower armature and front contact relay 413 completes a circuit from ground through conductor 427 and the winding of relay 428 to battery 429. At its armature 1 and back contact the relay 428 interrupts a conductive path from conductor 431 of the telegraph transmission circuit to an alternating current relay 432, the function of which is to respond to ringing current. At armatures 2 and 3 a signal transmission termination for conductor 431 is established through the armature 2 and front contact, operating winding of repeating relay 426, front contact and armature 3 of relay 428, conductor 433 and armature and marking contact of repeating relay 408 to ground. The engagement of armature 4 with its front contact performs a useful function only when relay 434 is operated. This relay is operable from the left-hand contact of relay 414 as will be described later. Armature 5 of relay 428 connects a condenser 436 and resistor 437 in series therewith across the make contacts of relay 412 to provide a storage path for current to energize alternating current relay 417 if the relay 412 releases while relay 407 operates between marking and spacing contacts in response to signals received from the toll subscriber station in Fig. 3. At armature 6 and the front contact of relay 428 battery 423 is connected through resistors 422 and 438 to the lower terminal of the winding of alternating current relay 417 and to the marking contact of repeating relay 407. With relay 407 engaging the marking contact current flows from battery 423 through resistor 422 and divides, some flowing through resistor 438, armature 6 and front contact of relay 428 and conductor 416 to ground on the armature of relay 407 through the marking contact and the remainder flowing through resistor 421, conductors 419 and 418, the armature and front contact of relay 412 and the winding of alternating current relay 417 to conductor 416 and thence to ground through the marking contact and armature of relay 407. When relay 407 is on the spacing contact current flows from battery 423 through resistor 422 and then divides, a portion flowing through resistor 421 and conductor 419 to ground through the spacing contact and armature of relay 407 and the remainder flowing through resistor 438 and conductor 416, winding of alternating current relay 417 in the opposite direction from that previously traced, armature and front contact of relay 412 to conductors 418 and 419 to ground through the spacing contact and armature of relay 407. If relay 412 should release while relay 407 continues to respond to signals, the condenser 436 and resistor 437 provides a storage path for charging and discharging the condenser through the winding of relay 417 to produce an alternating current through the winding of the relay and thereby maintain it energized so as to maintain relay 413 operated.

Armature 7 of relay 428 removes a biasing current from the biasing windings of relays 407 and 408 and places the biasing windings under the control of repeating relay 426 to hold the armatures of relays 407 and 408 on marking so that those relays will not follow signals repeated by relay 426 towards the toll subscriber station and revertively transmit them toward their point of origin.

The condition of the toll subscriber's line circuit in response to the initiation of the call by the toll subscriber is that relays 407, 408 and 426 are in the marking condition, relays 412, 413, 417 and 428 are operated, relay 414 is operated to its right-hand contact, battery 423 is connected to line conductor 439 through resistors 422 and 441 and the front contact and armature 4 of relay 428, and the armature of repeating relay 408 is connected to line conductor 431 through armatures 2 and 3 of relay 428 and the operating winding of repeating relay 426.

*Subscriber's line circuit responds to initiation of call*

Figure 5:
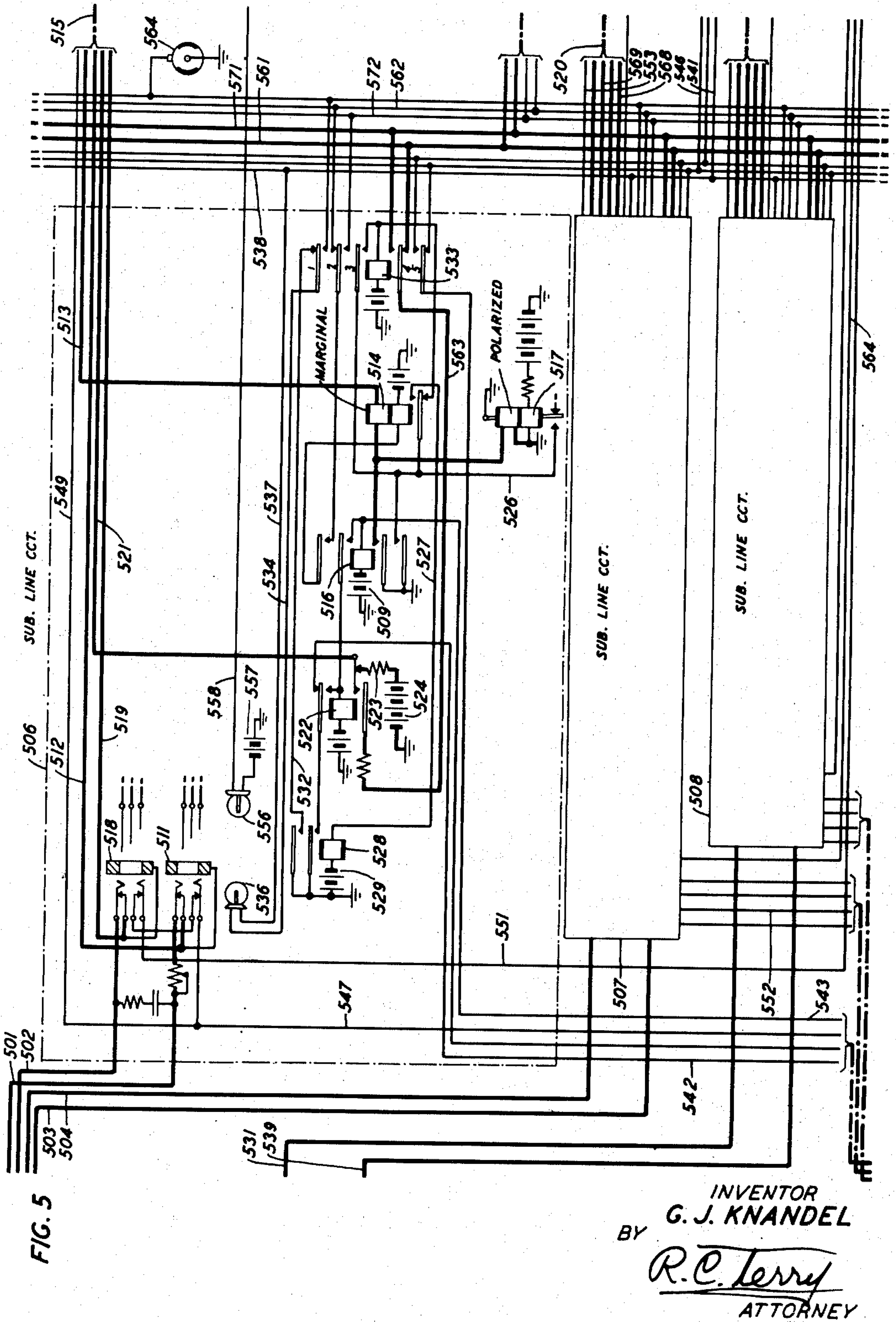
Fig. 5 shows a subscriber's line circuit which will operate with either a local subscriber station circuit or a toll subscriber line termination circuit.

It will be noted that line conductors 101 and 102 of Fig. 1 extend through Fig. 2 as conductors 201 and 202, through Fig. 4 as conductors 401 and 402 and into Fig. 5 as conductors 501 and 502. Similarly line conductors 203 and 204 of Fig. 2 extend through Fig. 4 as conductors 403 and 404 and into Fig. 5 as conductors 503 and 504. Line conductors 431 and 439 of Fig. 4 extend into Fig. 5 as conductors 531 and 539. Each pair of line conductors is connected to a subscriber's line circuit one of which has been shown in detail in Fig. 5 and two have merely been indicated. The subscriber's line circuit for the line conductors 501 and 502 is contained within the dotted rectangle 506, the subscriber's line circuit for line conductors 503 and 504 is indicated by the rectangle 507 and the subscriber's line circuit for the line conductors 531 and 539 is designated by the reference numeral 508. The subscriber's line circuits are alike for local and toll subscriber stations. The line conductors of local subscriber stations connect directly to a subscriber's line circuit whereas in the case of a toll subscriber station the toll subscriber's line termination circuit, such as the one shown in Fig. 4, intervenes.

Figure 7:
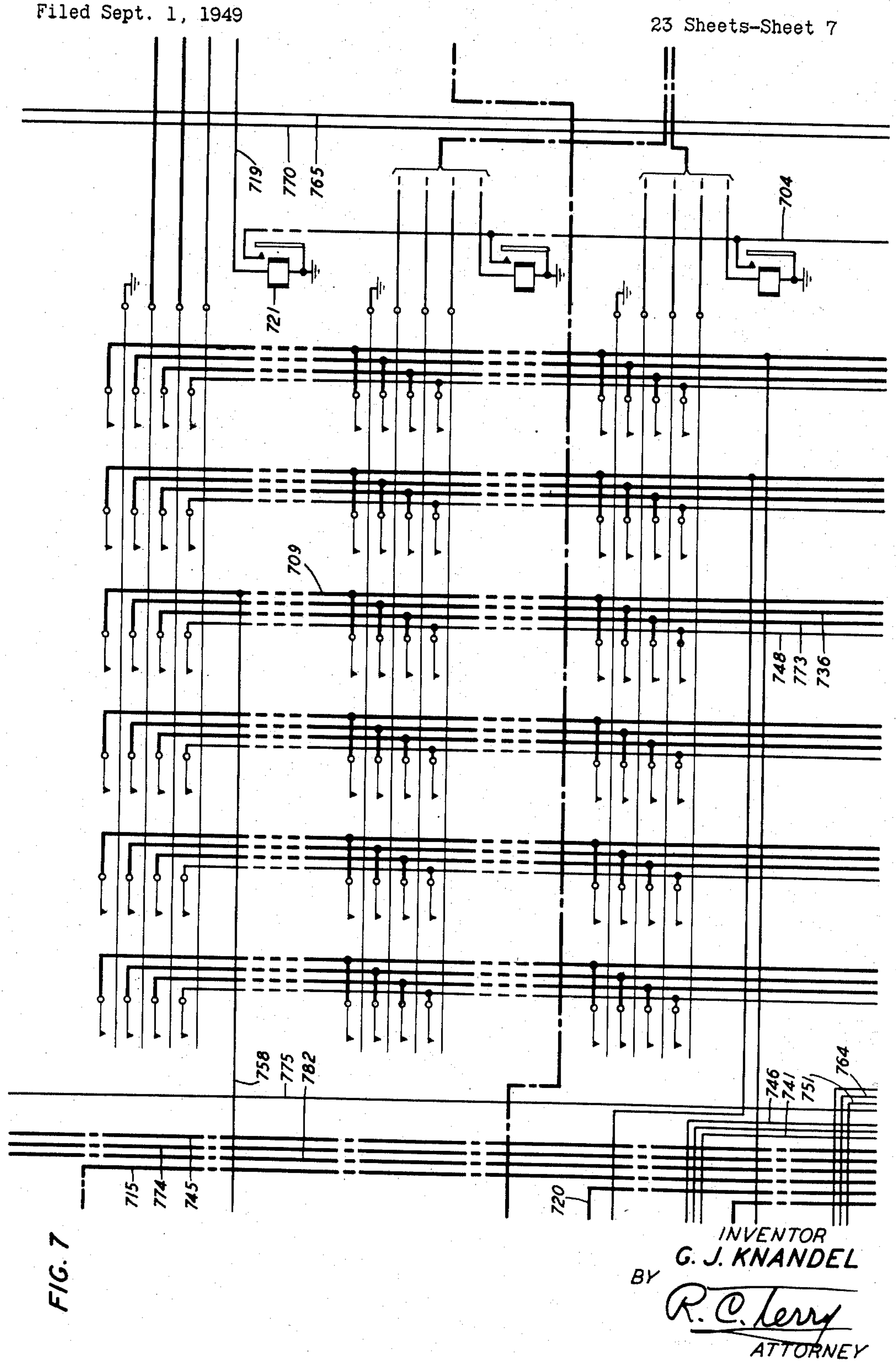
Fig. 7 shows a link circuit for interconnecting subscriber's line circuits and trunk circuits.
Figure 8:
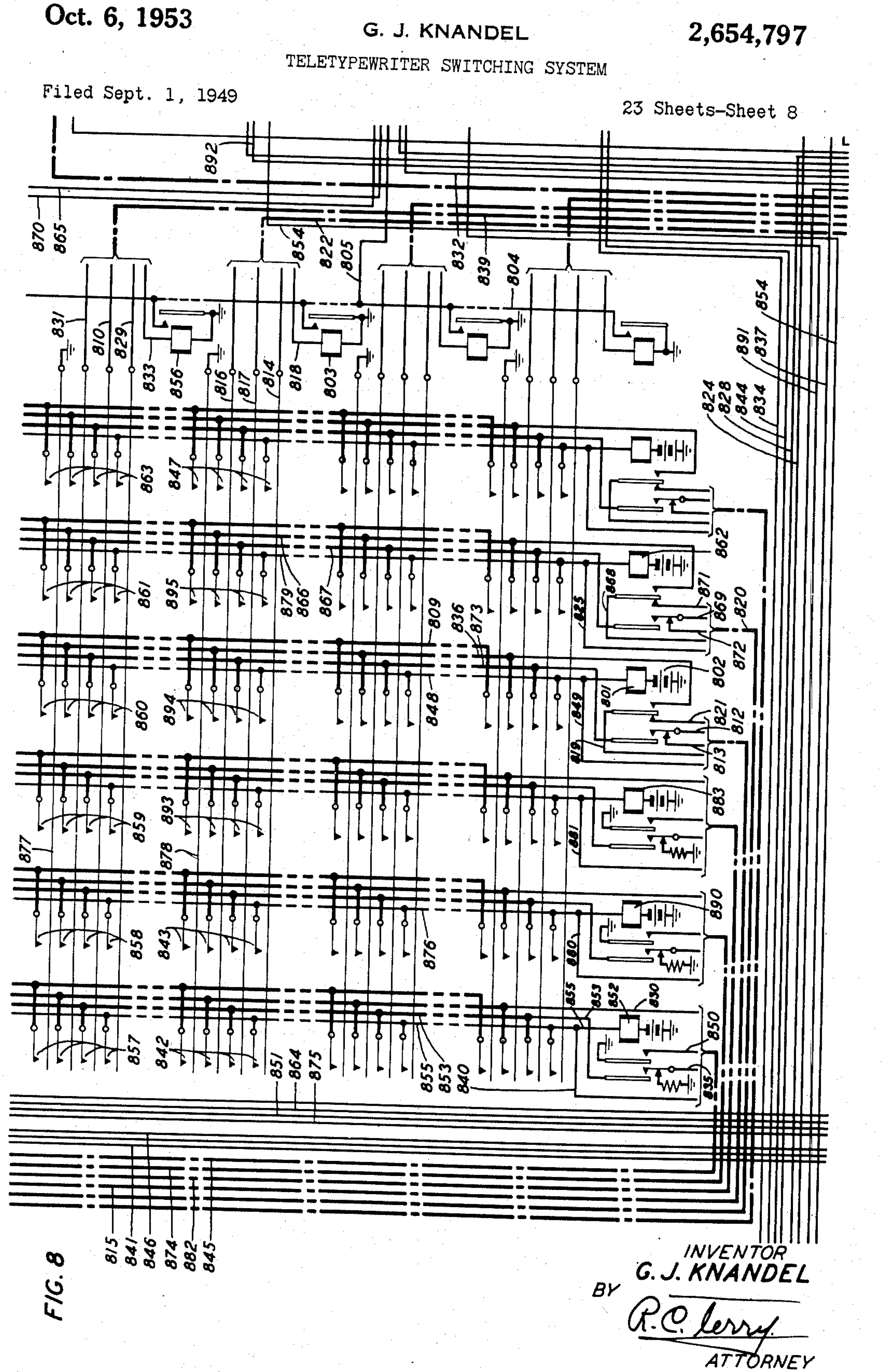
Fig. 8 shows a link circuit for interconnecting two subscriber stations under the control of and through a line junctor.

Conductor 501 is connected through the upper pair of normally closed contacts of a jack 511 to conductor 512 which is one of a group of conductors represented by the dot-and-dash line 515 in Fig. 5, 715 in Fig. 7, 815 in Fig. 8, from which the corresponding conductor 812 emerges and terminates at the front contact associated with the outer armature of a hold magnet 801 of a link circuit. The front contact is part of a make-before-break arrangement and the fixed contact associated therewith is connected to conductor 813 which, as one of the conductors of group 815–715–515, emerges in Fig. 5 as conductor 513, which extends through the operating winding of a biased polar relay 514 to the front contact associated with the inner lower armature of a relay 516, at this time released, and also extends through the operating winding of a biased polar relay 517 to ground. Line conductor 502 from the local subscriber station of Fig. 1 is connected through the upper pair of normally closed contacts of a jack 518 to a conductor 519 which as another conductor of group 515–715–815, emerges in Fig. 8 as conductor 819 and terminates at the inner armature of hold magnet 801. The back contact which is engaged by the inner armature of relay 801 is connected to conductor 821 which, as still another conductor of the group 815–715–515, emerges in Fig. 5 as conductor 521 where it is connected through the front contact and fixed contact of a make-before-break combination of contacts associated with the lower armature of a relay 522 and through resistor 523 to battery 524. Since the initiation of the call from the subscriber station of Fig. 1 involves the interconnection of the two line conductors of that station, the two paths just traced, one terminating at ground on the operating winding of relay 517 and the other terminating at battery 524, are interconnected to form a single conductive circuit from battery 524 to ground including the operating windings of relays 514 and 517.

Relay 514 is a marginal relay adjusted so that it will not operate unless the current flowing through it exceeds a predetermined minimum. The determination of whether or not marginal relay 514 shall be operated is made at the station initiating the call. As previously described the subscriber has alternative modes of initiating a call, one involving operation of the start key 116 only and the other involving operation of start key 116 with break key 113 operated. In the first case both the relays 514 and 517 will be operated and in the second case only the relay 517 will be operated because the current passed by resistor 112 in Fig. 1 is insufficient to operate relay 514.

It will be assumed that the call has been initiated without operating break key 113 and that relays 514 and 517 operate. Relay 517 completes a circuit from ground through its armature and left-hand contact, conductor 526, the armature and front contact of relay 514 because this relay is assumed to have operated, conductor 527 and winding of relay 528 to battery 529, and relay 528 operates. Relay 528 completes a circuit from ground through its outer armature and front contact, conductor 532, outer upper armature and back contact of a relay 533, conductor 534, lamp 536 and conductor 537 to a conductor 538 which is common to all of the subscriber's line circuits. From the conductor 538, a conductor 541 extends through Fig. 7 as conductor 741, through Fig. 8 as conductor 841, through Fig. 9 as conductor 941 and into Fig. 10 as conductor 1041 and winding of a relay 1001 to battery 1002. Relay 1001 is part of a sequence master control circuit and upon being operated completes the energizing circuit of relay 1003. Relay 1003 completes the circuit of a lamp 1004 and also the circuit of buzzer 1006 if the key 1007 is closed. Lamp 1004, and buzzer 1006 if key 1007 is closed, serve as alarms to indicate the initiation of a call and are necessary in the event that some trouble condition is interfering with automatic operation of the system and necessitates manual or semi-automatic operation. Lamp 536, which operates in the same circuit as relay 1001, indicates the particular subscriber's line circuit involved in the initiated call and jacks 511 and 518 afford terminations of the line extending to the subscriber station by means of which a connection to that line may be made with patching cords.

*Subscriber's line sequence circuit and junctor sequence circuit respond*

Figure 6:
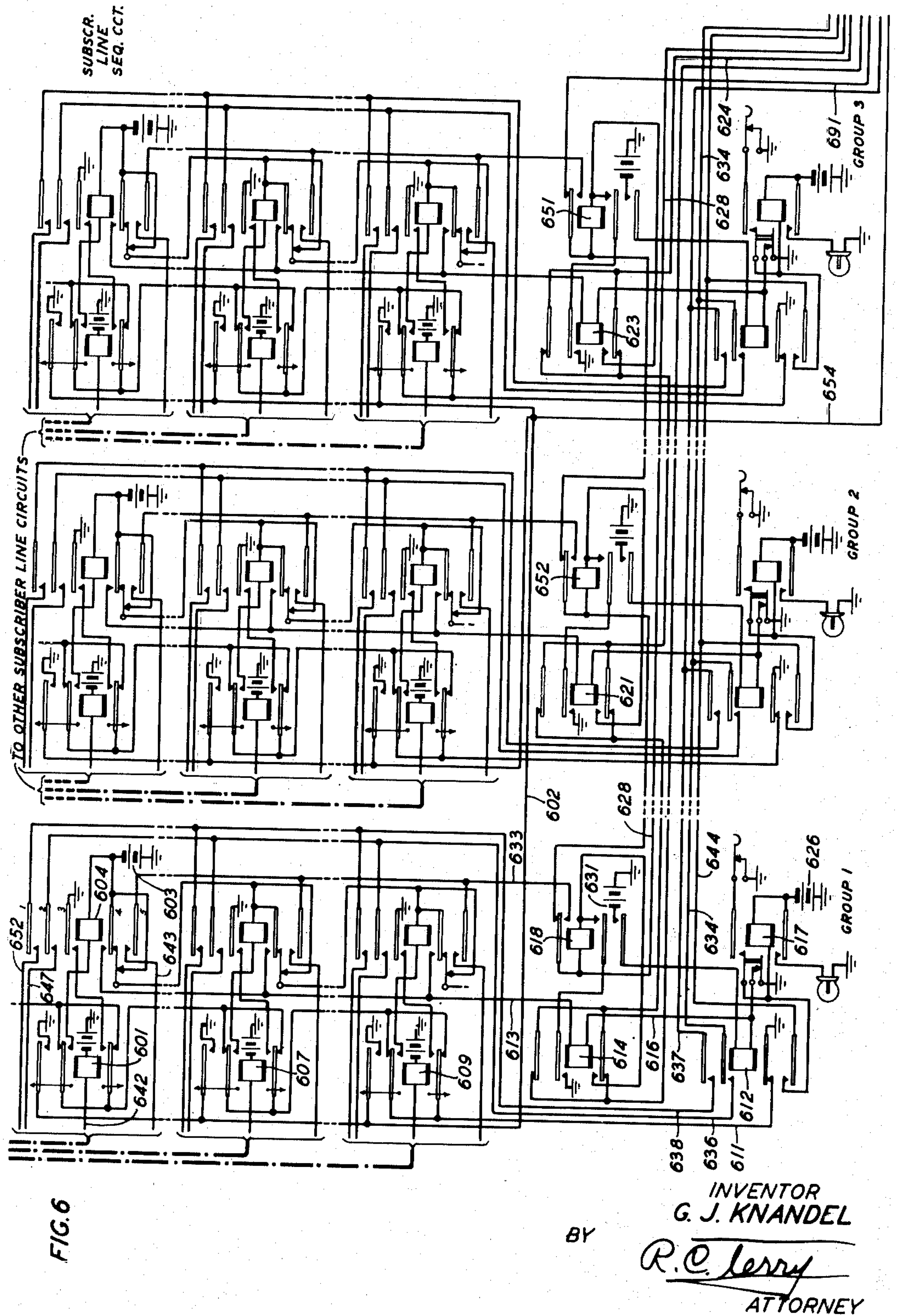
Fig. 6 shows a subscriber's line sequence circuit.

At the inner armature of relay 528 a circuit is completed from ground through the upper armature and back contact of relay 522, conductor 542 and conductor 642 in Fig. 6 to the winding of a slow-release start relay 601 of a subscriber's line sequence circuit. At its outer upper armature relay 601 connects ground over conductor 602 and conductor 654 which extends to the director circuit for performing a function to be described hereinafter. At its inner upper armature the relay 601 completes a circuit which is traced from battery 603, winding of relay 604, front contact and inner upper armature of relay 601, and chain circuit through back contacts and the lower as well as the inner upper armatures of a relay 607 associated with subscriber's line circuit 507 in Fig. 5, and of a relay 609 associated with subscriber's line circuit 508 of Fig. 5, conductor 611 and back contact and inner lower armature of relay 612 to ground. Relay 604 becomes operated over this circuit and provides a holding circuit for itself from ground through the armature 3 and front contact of the relay, front contact and lower armature, and inner upper armature and front contact of relay 601 to the winding of relay 604. Relay 604 will thus be held energized as long as relay 601 remains operated even though relay 612 becomes operated as will presently be described.

Relay 604 completes a circuit from battery 603 through its armature 4 and front contact, conductor 613, winding of relay 614, conductor 616, and break contacts controlled by the upper armature of a relay 617 to ground, thus operating relay 614. At its lower armature and front contact the relay 614 completes a conductive path which will be traced from the right-hand terminal of the winding of relay 618 through the front contact and lower armature of relay 614, chain circuit through back contacts and armatures of a relay 621 corresponding to relay 614 but associated with the sequence circuit for another group of subscribers' lines, back contacts and armatures of a relay 623 which corresponds to relays 614 and 621, conductors 624 which extends through Fig. 8 as conductor 824, and into Fig. 12 as conductor 1224, through the back contact and outer lower armature of a relay 1201 in a trunk sequence circuit, outer lower armature and back contact of a corresponding relay 1203 in the sequence circuit for another trunk, outer lower armature and back contact of a relay 1206 corresponding to relay 1201, conductor 1226 which extends through Fig. 8 as conductor 826, through Fig. 9 as conductor 926 and into Fig. 10 as conductor 1026, armature 7 and back contact of a relay 1008 of a junctor sequence circuit, armature 7 and back contact of a relay 1011 corresponding to relay 1008 and associated with the sequence circuit of another line junctor, armature 7 and back contact of a relay 1013 corresponding to relays 1008 and 1011, armature 7 and back contact of a relay 1016 corresponding to relays 1008, 1011 and 1013, conductor 1017, conductor 1027 which extends through Fig. 17 as conductor 1727, through Fig. 15 as conductor 1527, through Fig. 16 as conductor 1627, and into Fig. 20, which comprises a miscellaneous alarm circuit, outer lower armature and back contact of a relay 2001, conductor 2002 and back contact and upper armature of a relay 2003 to ground.

Figure 9:
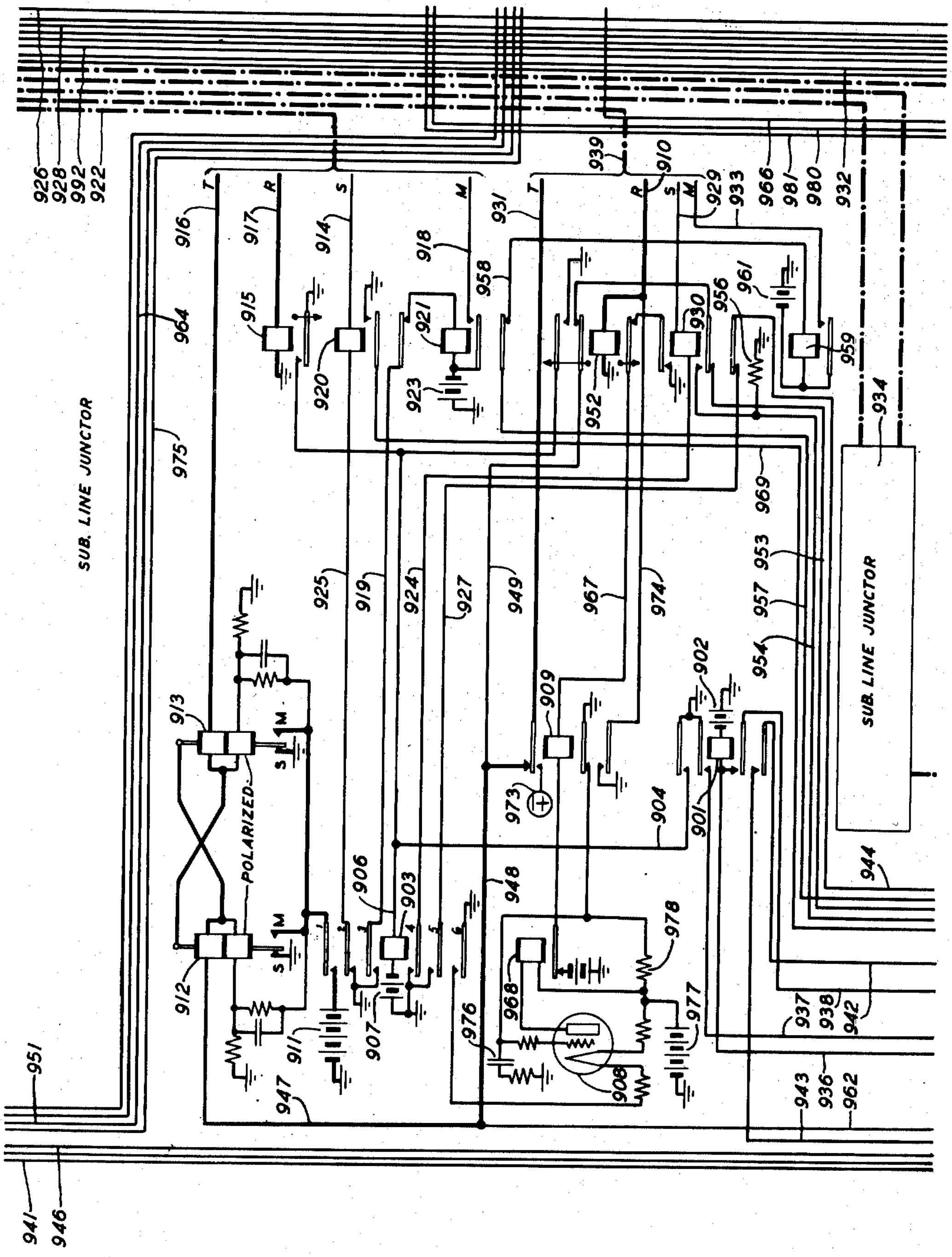
Fig. 9 shows a line junctor circuit.
Figure 10:
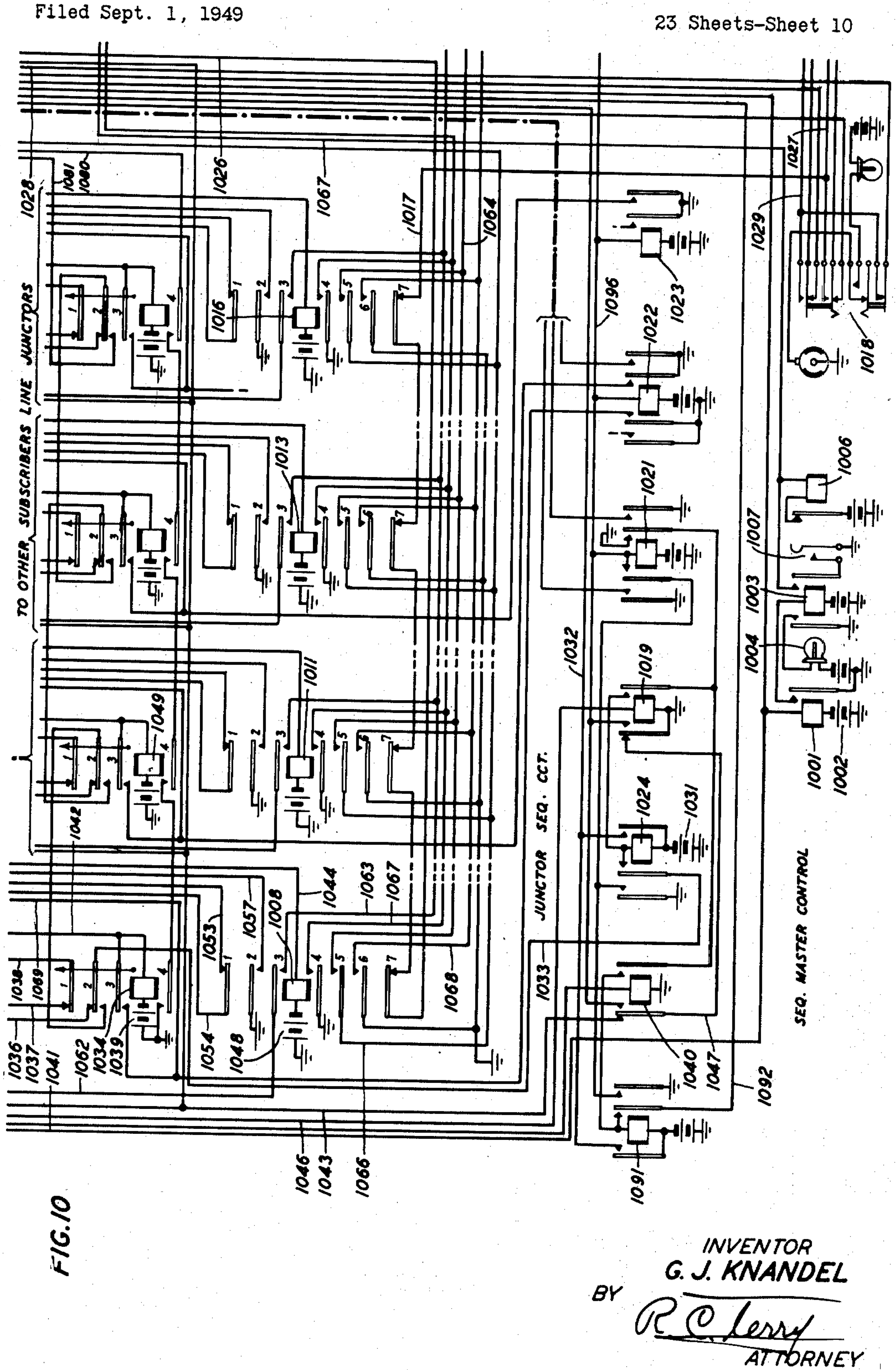
Fig. 10 shows a line junctor sequence circuit.
Figure 15:
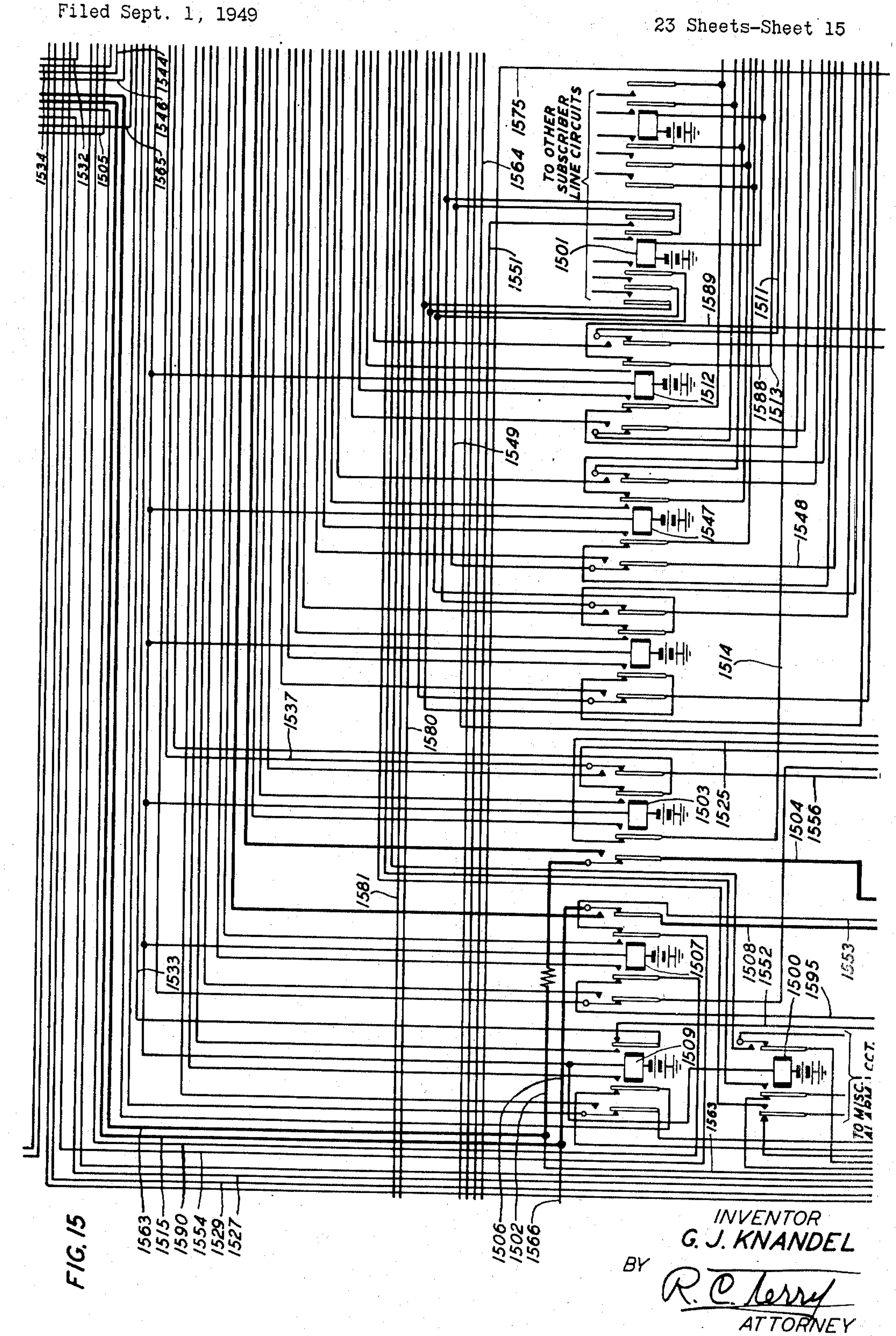
Figs. 15, 16, 17, 18 and 19 show a director circuit.
Figure 16:
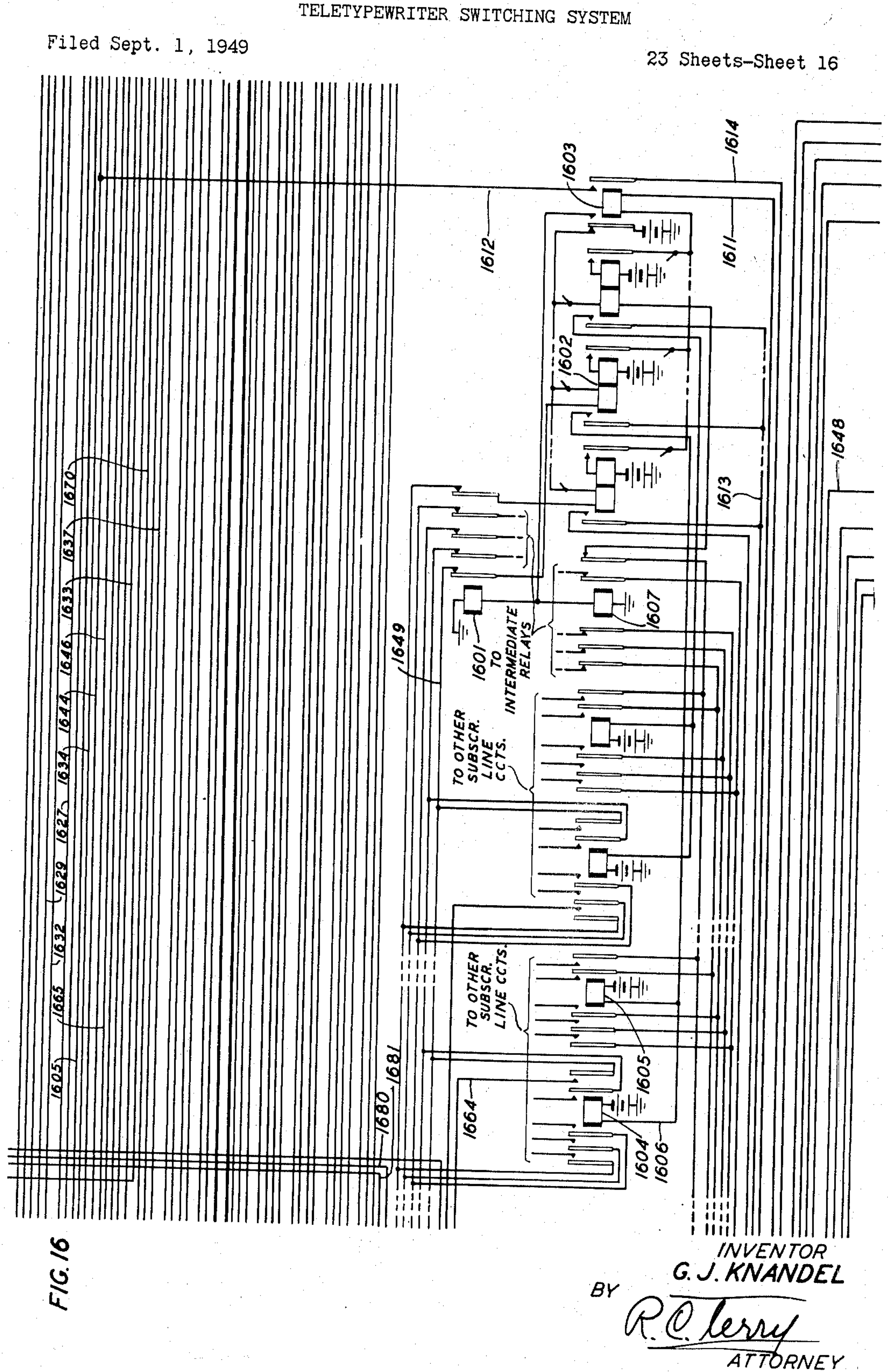
Figure 17:
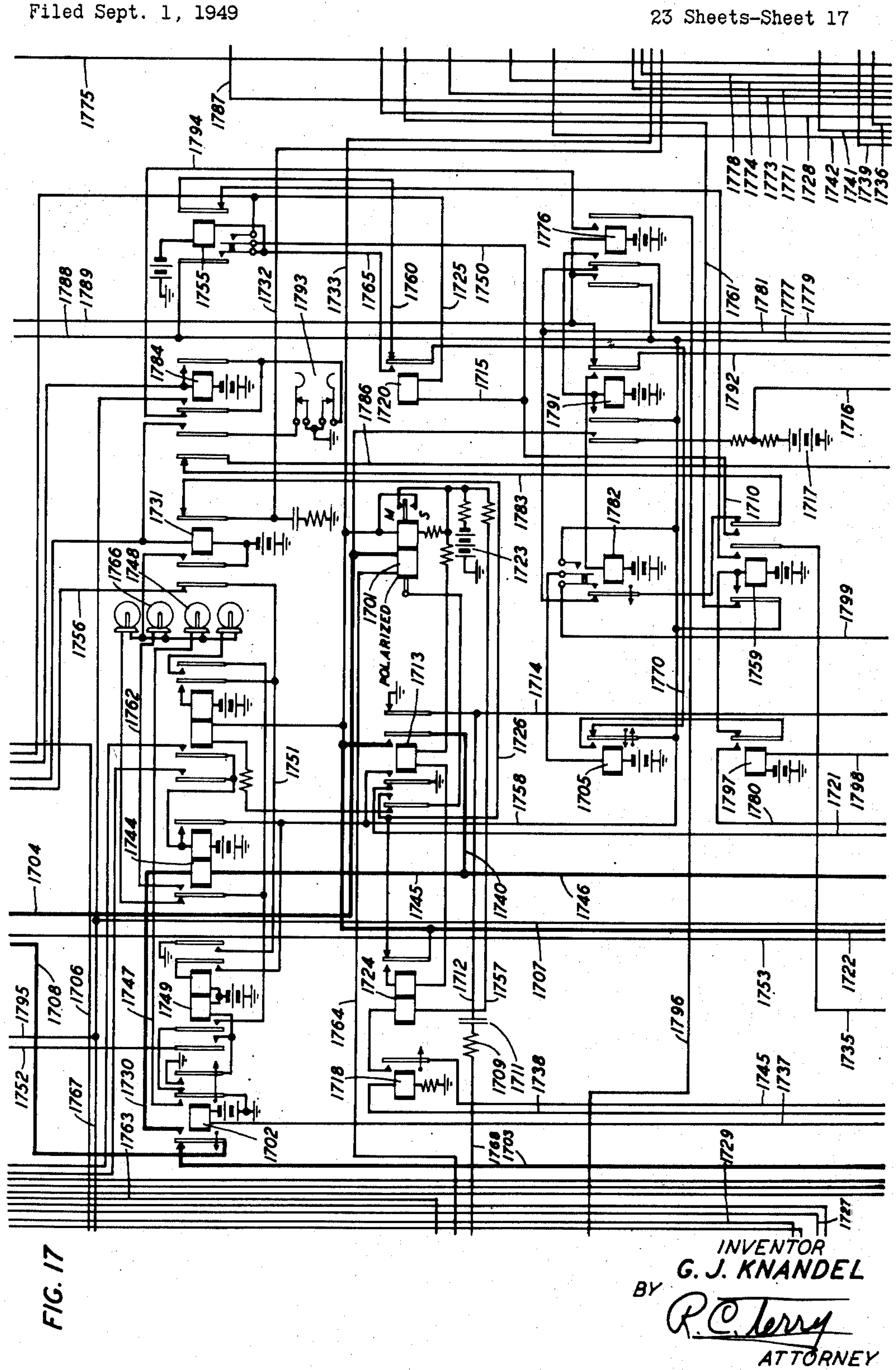
Figure 20:
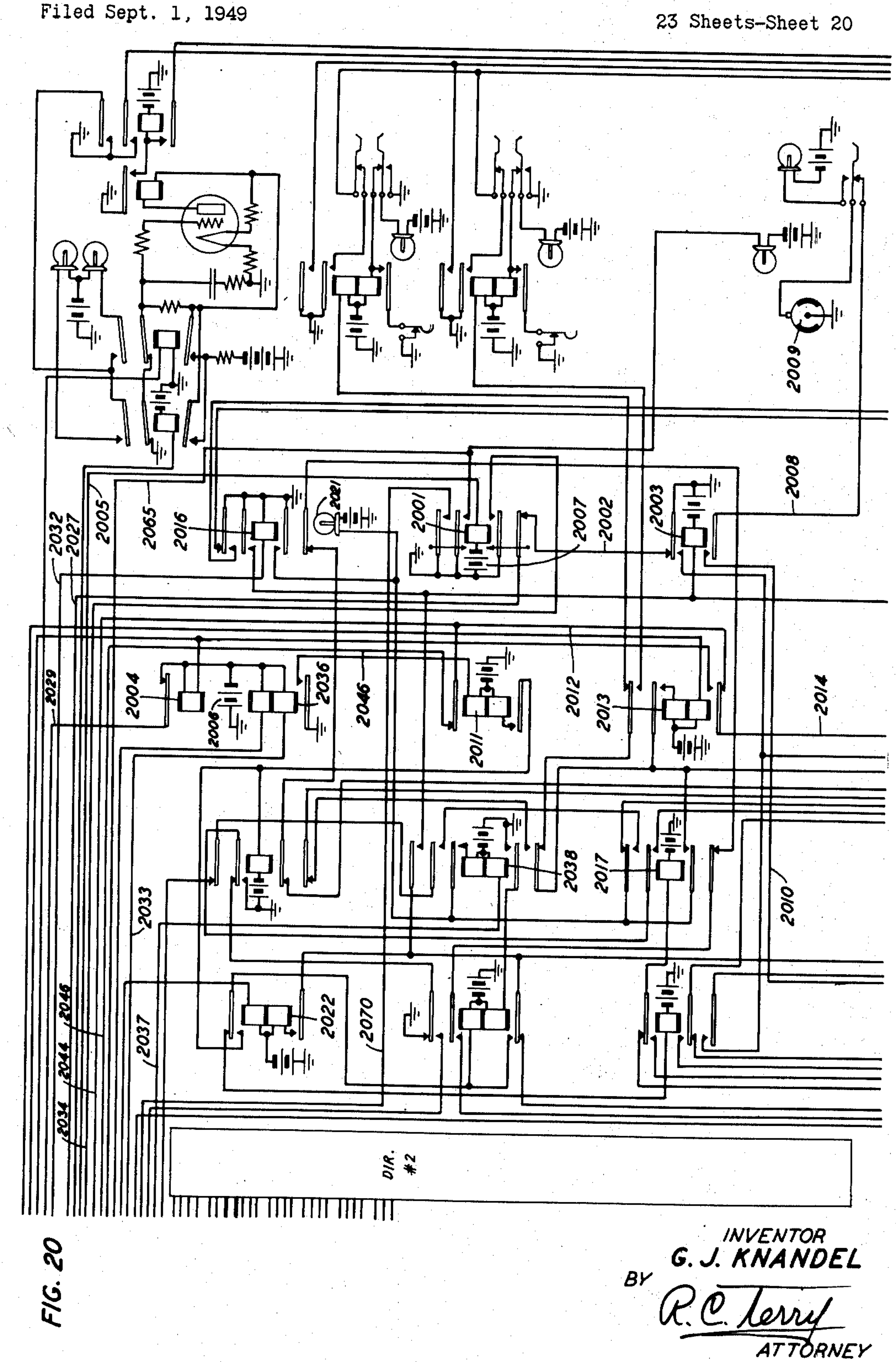
Figs. 20 and 21 show a miscellaneous alarm circuit.

Turning again to Fig. 6 a path is traced from the left-hand terminal of relay 618 over conductor 628 which extends through Fig. 8 as conductor 828, through Fig. 9 as conductor 928, into Fig. 10 as conductor 1028, lowermost pair of contacts of a key 1018, arranged as break contacts, conductor 1029 which extends through Fig. 17 as conductor 1729, through Fig. 15 as conductor 1529, through Fig. 16 as conductor 1629 and into the miscellaneous alarm circuit of Fig. 20 as conductor 2029, through the armature and back contact of a relay 2004, to battery 2006.

The two paths just traced, one terminating at ground and the other at battery, being interconnected through the lower armature and front contact of relay 614, and including the winding of relay 618 form an operating circuit for that relay and the relay operates. A holding circuit for relay 618 is completed from ground through the inner upper armature and front contact of relay 614 and the inner lower armature and front contact of relay 618 to the right-hand terminal of the latter relay.

At its outer lower armature and front contact relay 618 completes a circuit from battery 631 through the winding of relay 612 to ground through the break contacts operable by the upper armature of relay 617. Relay 612 operates over this circuit.

At the upper armature and front contact of relay 618 the battery connection available on conductor 628 from battery 2006 in Fig. 20, as previously described, is extended over conductor 633 and through the armature 5 and front contact of relay 604 and conductor 643, conductor 543 in Fig. 5, outer lower armature and back contact of relay 533 because this relay is not energized, conductor 546, which extends through Fig. 7 as conductor 746, through Fig. 8 as conductor 846, through Fig. 9 as conductor 946 and into Fig. 10 as conductor 1046, through the winding of relay 1019 to ground, thus operating this relay. The operations initiated by this relay will be described later.

With relay 612 operated the ground on its inner lower armature is disconnected from conductor 611. This ground was included in the energizing circuit for relay 604, but since the latter relay provided its own holding circuit to ground through its armature 3 and front contact, the energization of relay 612 has not resulted in the release of relay 604. From the inner upper armature of relay 612, a conductive path is traced through conductors 634, 834, 1234, 1534, 1634, and 2034 to the front contact associated with the inner lower armature of relay 2001. From the inner upper front contact of relay 612 a path is traced through conductor 636, armature 2 and front contact of relay 604, conductor 647 which extends into Fig. 5 as conductor 547 from which parallel branches extend. One branch includes conductor 549, conductor group 515 of Fig. 5, group 715 of Fig. 7, group 815 of Fig. 8, conductor 849, winding of hold magnet 801 to battery. The other branch extends through the break contacts of jacks 511 and 518, conductors 551, 751, 851, 951, and 1551 to the outer right-hand front contact of relay 1501. Accordingly, the path through this branch is incomplete and although the path through the other branch includes the winding of hold magnet 801 there is no closed circuit through the path because ground is withheld at the inner lower armature of relay 2001.

Figure 12:
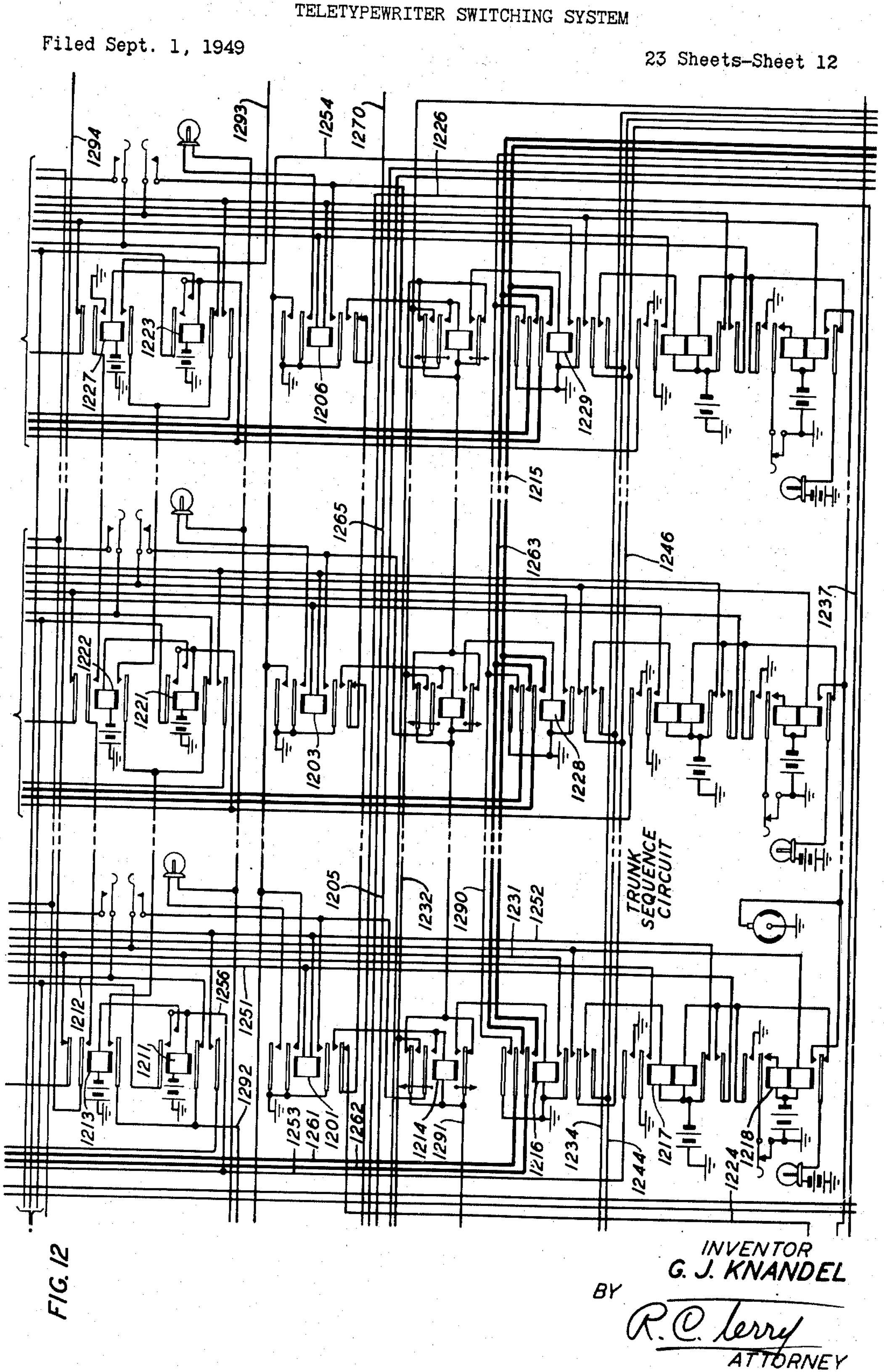
Fig. 12 shows a trunk sequence circuit.
Figure 14:
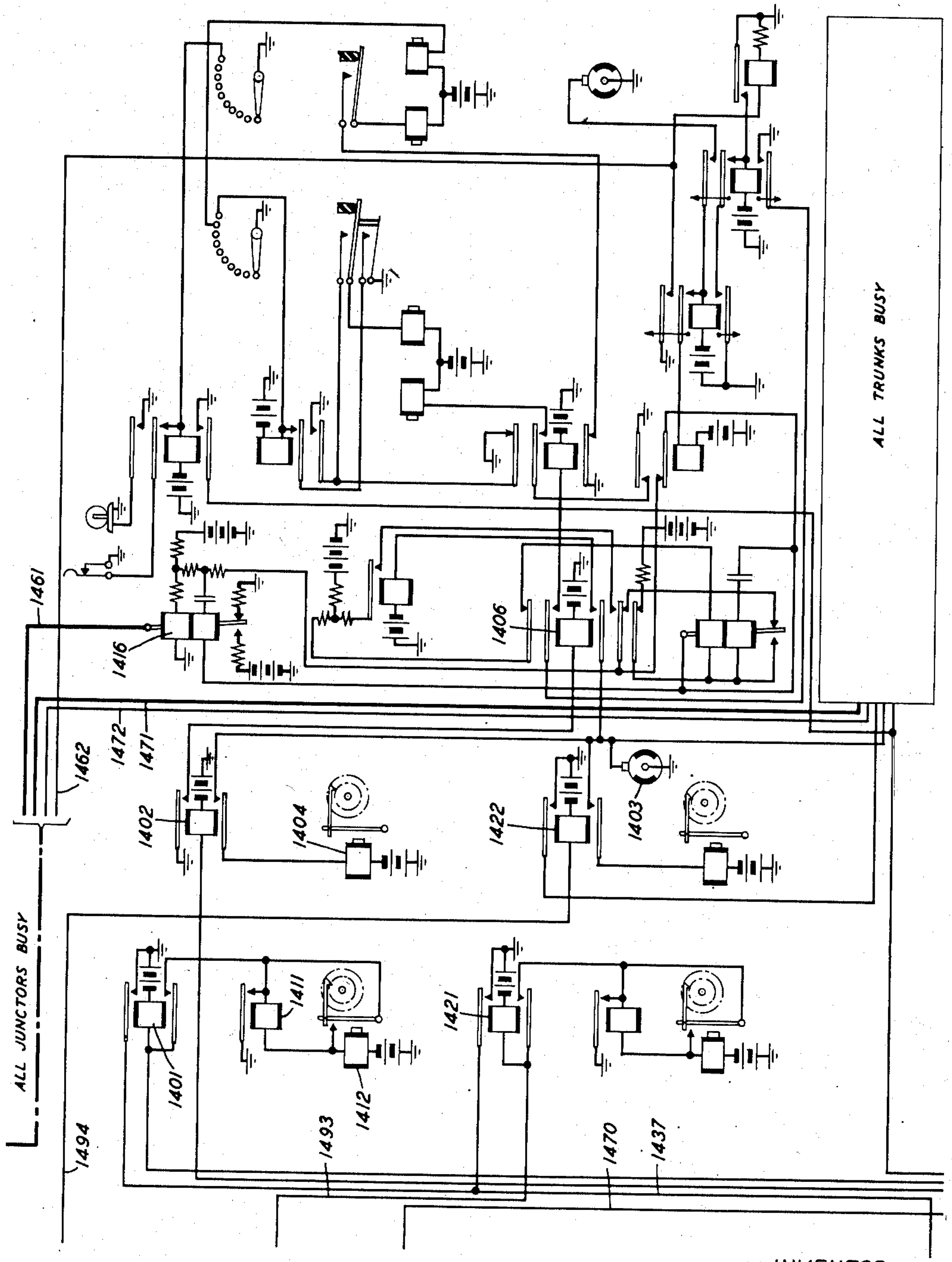
Fig. 14 shows an all-trunks busy and all-junctors busy circuit.
Figure 21:
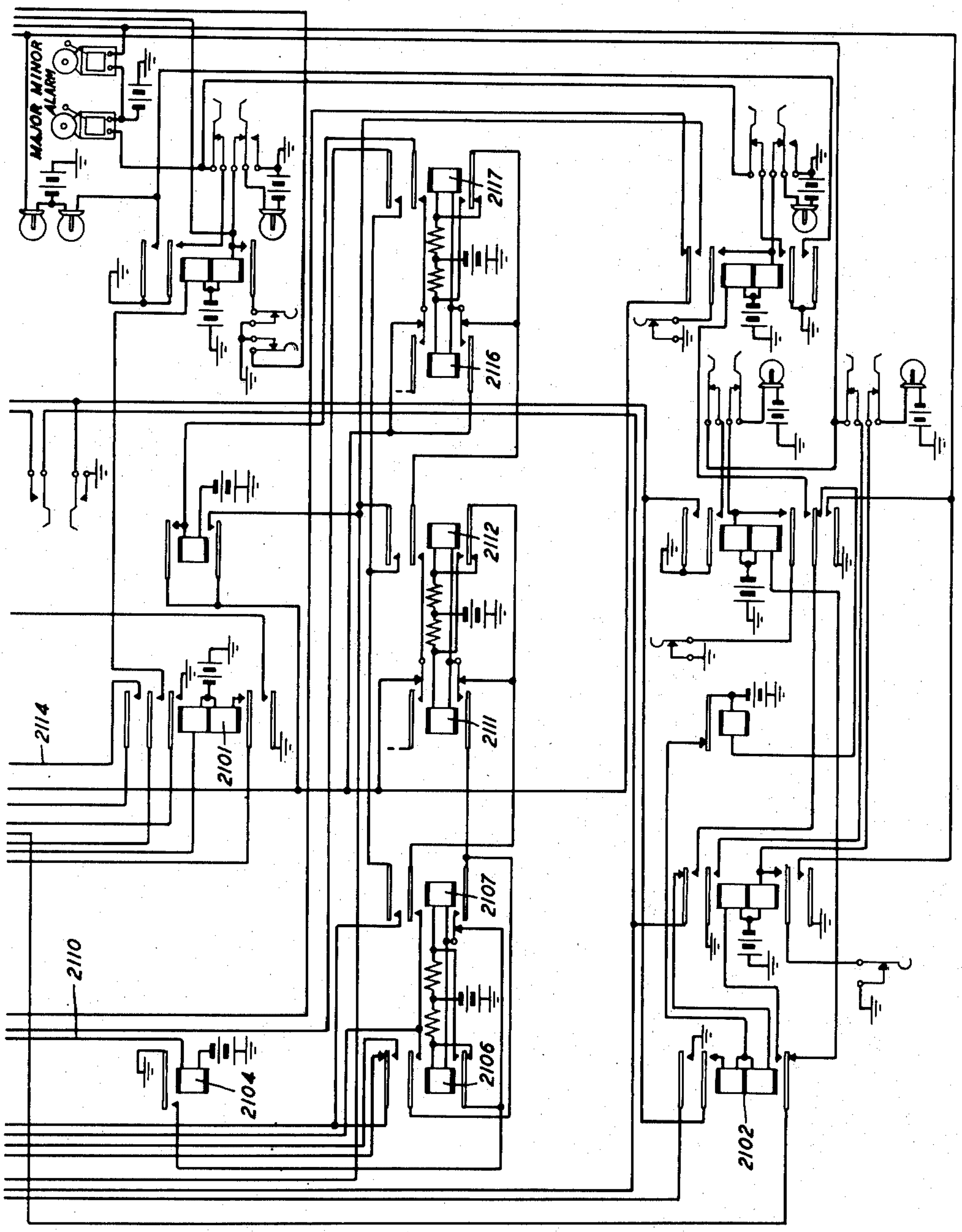

From the outer upper armature of relay 612 a conductive path is traced through conductors 637, 837, 1237 of Fig. 12, conductor 1437 of Fig. 14 to the upper armatures of relays 1401 and 1421. These armatures have no back contacts and the relays are assumed to be released at this time so that the path is not extended to the grounded front contact of either armature. From the outer upper front contact of relay 612 a conductive path is traced through conductor 638, armature 1 and front contact of relay 604, conductor 652, conductor 552 of Fig. 5 and winding of relay 516 to battery 509. Due to the fact that ground connection is withheld at the upper front contact of relays 1401 and 1402, the circuit of relay 516 is not completed. At its outer lower armature and front contact relay 612 completes a conductive path from battery 626 through the winding of relay 617, the specified armature and front contact of relay 612, conductors 644, 844, 1244, 1544, 1644, and 2044, upper armature and back contact of relay 2011, conductor 2046, conductor 1646 of Fig. 16, conductor 1546 of Fig. 15 and conductor 1246 of Fig. 12 to the middle lower armatures of relays 1216, 1228, and 1229 which, having no back contacts, and the relays being released, terminate the path. A branching path from conductor 2044 in Fig. 20 is traced through conductor 2012, the lower armature and back contact of relay 2013 and conductor 2014 which extends into Fig. 21 as conductor 2114 to the front contact associated with the outer upper armature of a relay 2101. As this relay is assumed to be deenergized the path terminates at this point, and, accordingly, the relay 617, through the winding of which the path was traced, does not become energized. All possible paths established by relay 612, when operated have now been traced and the only one which is found to have resulted in the completion of a circuit is the path traced through the winding of relay 1019.

At its left-hand armature relay 1019 completes the energizing circuits of relays 1021, 1022 and 1023. Relay 1021 through its front contact and inner right-hand armature and through the right-hand armature and front contact of relay 1019 completes the circuit of relay 1024 which operates. At its outer left-hand armature and front contact relay 1024 completes a holding circuit for relay 1021. At its right-hand armature relay 1024 completes a circuit from battery 1031 through the right-hand armature and front contact, conductors 1032, 932, 832, 1232, 1532, and 2032, and winding of relay 2016 to ground thus operating this relay. At its inner left-hand armature and front contact relay 1024 completes a circuit from ground through the front contact and inner right-hand armature of relay 1021, right-hand armature and front contact of relay 1019, front contact and inner left-hand armature of relay 1024, conductor 1033, middle armature and back contact of relay 1034, conductor 1036, conductor 936 of Fig. 9 and winding of relay 901 to battery 902, and relay 901 becomes operated.

Relay 901 completes a holding circuit for itself from ground through its inner upper armature and front contact, conductor 937, conductor 1037, armature 1 and back contact of relay 1034, conductors 1038 and 938, inner lower armature and front contact and winding of relay 901 to battery 902. At its outer lower armature the relay 901 prepares an energizing circuit for relay 1034 in a path traced from battery 1039, winding of relay 1034, conductor 1042, conductor 942, outer lower armature and front contact of relay 902, conductors 943 and 1043, back contact and left-hand armature of a relay 1040, conductor 1047 to the back contact associated with the left-hand armature of relay 1019. As this relay is energized at this time and its left-hand armature is engaging the front contact, the relay 1034 does not operate. The relay 901 also completes the energizing circuit for a relay 903 in a circuit traced from ground through the outer upper armature and front contact of relay 901, conductor 904, conductor 906, and winding of relay 903 to battery 907.

At its armature 6 and front contact the relay 903 completes the filament circuit of a vacuum tube 908 which has a condenser charging circuit associated with its control grid, but the condenser is at this time held discharged by a ground connection supplied through the inner lower armature and back contact of a relay 909, so that tube 908 does not yet become conductive. At its armature 1 and front contact relay 903 connects telegraph battery 911 to the marking contacts of repeating relays 912 and 913. This battery is also connected through the biasing winding of each of the repeating relays 912 and 913 and through the armature and spacing contact of the other to ground, thereby energizing the biasing windings. At its armature 2 and front contact relay 903 connects ground over conductor 925 and winding of sleeve relay 920 to sleeve conductor 914 which, together with tip conductor 916, ring conductor 917 and select magnet conductor 918, extend into Fig. 8 by way of dot-and-dash lines 922 and 822. In Fig. 8 this group of conductors is represented by sleeve conductor 814, tip conductor 816, ring conductor 817 and select magnet conductor 818 of a link circuit.

At its armature 3 and front contact relay 903 completes a circuit from ground over conductor 919, the outer armature and back contact of sleeve relay 920 and winding of select magnet control relay 921 to battery 923, and the relay 921 operates. With relay 921 operated, battery 923 is connected over conductors 918 and 818 and through the winding of select magnet 803 to ground and this magnet operates and in turn completes a circuit from ground through its armature and front contact and through conductor 804 common to the front contacts of all of the link circuit select magnets in Figs. 7 and 8, conductors 805, 1205, 1505, 1605, 2005 and winding of slow-operating relay 2001 to battery 2007, and relay 2001 operates after a delay, for a purpose which will be described later. With select magnet 803 operated a plurality of sets of cross bar switch contacts 842, 843, 893, 894, 895, and 847, are prepared for operation. The selection and operation of a particular set of cross bar switch contacts will depend upon the operation of one of several hold magnets, such as the magnet 801.

At its armature 4, the relay 903 extends a ground connection over conductor 924, winding of a sleeve relay 930 to a sleeve conductor 929 which is associated with tip conductor 931, ring conductor 910 and select magnet conductor 933 which, as a group are represented by dot-and-dash line 939 and in Fig. 8 by dot-and-dash line 839, the conductors appearing in Fig. 8 as 829, 831, 810 and 833, respectively.

At its armature 5 and front contact relay 903 completes a circuit from ground over conductor 927, the outer lower armature and back contact of relay 930, conductors 944, 1044, and winding of relay 1008 to battery 1048, and the relay 1008 operates.

At its armature 1 and back contact the relay 1008 interrupts a conductive path which is traced from ground on the spacing contact of repeating relay 913 through the armature of that relay and the operating winding of repeating relay 912, conductors 947, 948 and 949, inner upper armature and back contact of a relay 952, inner lower armature and back contact of relay 930, conductors 953 and 1053, back contact and armature 1 of relay 1008, conductors 1054 and 954 and resistor 956 to ground, this path representing a holding path for the junctor repeater comprising relays 912 and 913. Armature 2 of relay 1008 extends a ground connection over conductors 1057 and 957 to the outer armature of relay 921. As this armature has no front contact and relay 921 is energized at this time under the control of relay 903, the circuit extending from the back contact through conductor 958 and winding of relay 959 to battery 961 is not completed. At the armature 3 and front contact of relay 1008 a conductive path is extended from the operating winding of repeater relay 912 through conductors 947, 962, 1062, armature 3 and front contact of relay 1008, conductors 1063, 1763, 1563, and 1502, outer left-hand armature and back contact of relay 1503, conductors 1504 and 1704, operating winding of a relay 1701, conductors 1764 and 1064, armature 5 and front contact of relay 1008, conductors 1066, 966, 1566, 1506, back contact and outer right-hand armature of relay 1507, conductors 1508 and 1708, left-hand armature and back contact of relay 1702, conductors 1703 and 1903 to the armature of a relay 1901. Since the relay 1901 is not yet operated this circuit is only prepared through the armatures 3 and 5 of relay 1008 but is not completed. Armature 4 of relay 1008 connects ground over conductor 1067, conductors 1767, 1706, 1707 and 1907 and through the winding of relay 1902 to battery 1905 thus operating relay 1902. At armature 6 and front contact of relay 1008 ground is connected over conductor 1068, conductor 1768 and through resistor 1709 to one terminal of condenser 1711. The other terminal of condenser 1711 is connected by conductor 1712 to the outer right-hand armature of relay 1713. A conductive path is also traced from conductor 1712 and the outer right-hand armature of relay 1713 over conductors 1714 and 1914 to the grid of vacuum tube 1904 and also through resistor 1906 and conductors 1908, 1916 and 1716 to the positive terminal of battery 1717. This circuit is completed in preparation for the charging of condenser 1711, but the back contact which the outer right-hand armature of relay 1713 engages is connected to ground so that the condenser cannot charge until this relay becomes energized.

Before proceeding with the description of operations resulting from the energization of relay 1902 a further operation initiated by the relay 903 will be considered. This is the operation of slow operating relay 2001 resulting from energization of relay 921 by relay 903 and energization of select magnet 803 by relay 921. Relay 2001 attracts its armatures, and at its inner lower armature it connects ground over conductors 2034, 1634, 1534, 1234, 834, 634, inner upper armature and front contact of relay 612, conductor 636, armature 2 and front contact of relay 604, conductors 647, 547, 549, conductor groups 515, 715 and 815, conductor 849 and winding of link circuit hold magnet 801 to battery 802, operating magnet 801. The operation of the other armature of relay 2001 has no significance at this time, although it may be noted that the energizing circuit of relay 618 is interrupted at the outer lower armature of relay 2001, but relay 618 remains operated through its locking circuit.

At its inner armature, magnet 801 disconnects conductor 819 from conductor 821 and connects conductor 819 to cross bar switch conductor 836. At its outer armature it disconnects conductor 812 from conductor 813 and connects conductor 812 to cross bar switch conductor 873. Conductors 812 and 819 have previously been traced through the subscriber's line circuit (Fig. 5) to the subscriber's line conductors 501 and 502, respectively, and thus these line conductors have now been extended to cross bar switch conductors 836 and 873, respectively. Magnet 801 also closes cross bar switch contacts 894 prepared for closure by Select magnet 803, and thereby extends the paths from conductors 836, 873 and 848 over conductors 816, 817 and 814, respectively, and over conductors 916, 917 and 914, respectively, through the operating winding of repeating relay 913, to the armature of repeating relay 912, in the case of conductor 916, through the winding of relay 915 to ground in the case of conductor 917 and through the winding of sleeve relay 920, conductor 925 and armature 2 and front contact of relay 903 to ground in the case of conductor 914.

With Hold magnet 801 operated and conductors 513 and 521 disconnected from conductors 512 and 519 respectively, the previously traced circuit through the operating winding of relay 517 is interrupted, and this relay restores its armature to the right-hand contact. Also the relay 514 is released. These relays in turn release relay 528. The latter relay extinguishes lamp 536 and releases relay 601. Relay 601 releases relay 604 which releases relay 614. Relay 614 releases relay 618 which in turn releases relay 612. Thus the subscriber's line sequence circuit and subscriber's group sequence circuit are restored to normal.

With relays 604 and 618 released the original energizing circuit for Hold magnet 801 is interrupted. However, with cross bar switch contacts 894 closed, a holding circuit for magnet 801 is traced from the magnet through conductors 848, 814 and 914, winding of relay 920, conductor 925 and armature 2 and front contact of relay 903 to ground. As soon as relay 604 releases current flows in the circuit just traced to maintain Hold magnet 801 operated and to operate relay 920. Relay 920 prepares a holding path for relay 1034, traced from ground through the front contact and inner armature of relay 920, conductors 969 and 1069, to the front contact associated with armature 3 of relay 1034. Relay 920 also interrupts the energizing circuit for relay 921 which releases, and in turn releases Select magnet 803 of the cross bar switch. The Select magnet 803 need not remain energized after Hold magnet 801 operates, as the latter holds contacts 894 closed. Magnet 803 in turn releases relay 2001, which does not result in the release of Hold magnet 801 because this magnet is held by relay 903 as described above.

With relay 618 released as stated above relay 1019 releases. Relays 1021, 1022 and 1023 do not release at this time because they are held by relay 1024 which in turn is held by relay 901 through armatures and back contacts of relay 1034. At its left-hand armature and back contact the relay 1019 completes a circuit from ground over conductors 1047, left-hand armature and back contact of relay 1040, conductors 1043 and 943, front contact and outer lower armature of relay 901, conductors 942 and 1042 and winding of relay 1034 to battery 1039 and relay 1034 operates and locks through its armature 3 and over the circuit prepared as described in the preceding paragraph.

At the time of operation of cross bar switch contacts 894 the subscriber's line conductors were extended through those cross bar switch contacts to conductors 816 and 817 and thence to conductors 916 and 917, which extend through the operating winding of repeater relay 913 to the armature of repeater relay 912 which has battery on its marking contact and through the winding of relay 915 to ground, respectively. Since the line conductors became interconnected at the subscriber's station by the operation of relay 104 the circuit of relay 915 is completed and this relay operates and connects ground over conductor 906 to hold relay 903 operated when its original energizing circuit shall be interrupted.

When relay 1034 operates as hereinbefore mentioned it interrupts the holding circuit for relay 901 at its armature 1 and back contact. At its armature 2 it interrupts the original energizing circuit for relay 901 and transfers the path over which relay 901 was energized to the corresponding armature of relay 1049 of the next sequence circuit associated with another line junctor such as that represented by the rectangle 934 in Fig. 9. Relay 1034 does not change the condition of relay 1008 and this relay remains energized, but relay 901 releases, and relay 1024 also releases, in turn releasing relays 1021, 1022, 1023 and 2016.

With relay 921 released as hereinbefore mentioned a circuit is traced from ground on the armature 2 of relay 1008 through the front contact, conductors 1057 and 957, outer lower armature and back contact of relay 921, conductor 958 and winding of relay 959 to battery 961. Relay 959 operates and in turn connects battery over conductors 933 and 833 to Select magnet 856 which reoperates relay 2001 (which is slow to operate) and also prepares for selective operation the cross bar switch contacts 857, 858, 859, 860, 861 and 863. These operations occur in preparation for extending a connection through the link circuit to the called subscriber station under the control of the director.

*Director circuit prepares to route subscriber's call*

In the director circuit the relay 1902, operated by relay 1008, completes the circuit of the filament of vacuum tube 1904 from ground on the front contact of its outer right hand armature through resistors 1911 and 1912 and conductors 1913, 1908, 1916 and 1716 to battery 1717. At its inner left-hand armature it completes the circuit of relay 1917 from battery 1918 through the winding of relay 1917, conductor 1919, the noted armature and front contact of relay 1902, conductors 1921 and 1721 and back contact and inner left-hand armature of relay 1713 to ground. At its middle left-hand armature and front contact the relay 1902 connects ground over conductors 1922 and 1722 to several branching paths. One of these paths is traced through the biasing winding of relay 1701 to battery 1723 to bias the relay 1701 to spacing. Another of these paths is traced through the armature and back contact of relay 1724, conductor 1726, back contact and right-hand armature of relay 1731, conductors 1732 and 1832, normally closed contacts 1801 of director transmitter 1802 and winding of start magnet 1803 of the transmitter to battery 1804, thus completing the energizing circuit of this magnet. Another path is traced over conductors 1733 and 1833 and through a potential divider comprising resistors 1806, 1807 and 1808 to battery 1809. This provides the proper potentials for the operating and biasing windings of relay 1811 and by way of conductor 1810 for the operating windings of relays 1812, 1813, 1814, 1816 and 1817 which are controlled by the code contacts of transmitter 1802 as will be described later. Another path is traced through the operating winding of relay 1734, back contact and outer left-hand armature of relay 1713 to the armature of relay 1701. Relay 1734 operates only when relay 1701 completes its circuit to battery on the marking contact in advance of the operation of relay 1713. At this time the circuit of the operating winding of relay 1701 is not complete, its armature engages the spacing contact through the influence of the biasing winding and relay 1734 does not become operated.

Returning again to consideration of relay 1902 a circuit is completed from ground through its outer left-hand armature and the winding of relay 1923 to battery. Relay 1923 connects ground through its outer right-hand armature and front contact and through conductors 1928, 1728 and 1828 to the armatures of relays 1812, 1813, 1814, 1816 and 1817. It connects battery 1924 through its left-hand armature and front contact and through conductors 1936, 1736 and 1836, driving motor 1818 for transmitter 1802, and current limiting resistor 1819, which is short-circuited by governor contacts 1821 while motor 1818 is coming up to speed, to ground. At the inner right-hand armature of relay 1923 a holding circuit is traced through conductors 1953, 1753, 1553, inner right-hand armature and back contact of relay 1507, conductors 1554, 1254, 654, 654 and 602, and the outer upper armature and front contact of relay 601 to ground. The purpose of this holding path is to prevent the release of relay 1923 and the consequent deceleration or stopping of motor 1818 if it had been in operation in connection with the routing of another call at the time the subscriber's sequence circuit comprising relays 601 and 604 operated in preparation for the routing of a call from the subscriber's line circuit in Fig. 5. This description is proceeding upon the basis that the director was not in operation at the time the subscriber's line circuit in Fig. 5 responded to the placing of the call and, accordingly, the preparation at the outer upper armature and front contact of relay 601 of a holding circuit for relay 1923 had no effect upon that relay.

The operation of relay 1917 resulted from the operation of relay 1902 as previously set forth. The former relay at its outer left-hand armature completes a circuit from ground over conductors 1937 and 1737, and the winding of relay 1702 to battery thus operating relay 1702. At its inner left-hand armature and front contact relay 1917 connects the sensitive relay 1718 in parallel with the governor contacts 1821 of motor 1818 in a circuit traced from ground through the winding of relay 1718, conductors 1738 and 1938, the noted armature and front contact of relay 1917, conductors 1939, 1739 and 1839, and resistor 1822 to the junction of resistor 1819 and the battery path through the motor. Relay 1718 cannot operate until motor 1818 comes up to speed and opens the governor contacts, thereby removing the short-circuit across resistor 1819.

At its right-hand armature the relay 1917 interrupts a path traced from the upper spring of stop contacts 1823 over conductors 1841, 1741 and 1941, armature and back contact of relay 1917, conductors 1942, 1742 and 1842 and lower winding of relay 1811 to battery 1809, thus preventing stop contacts 1823 from operating relay 1811 to marking as distributor 1802 operates while motor 1818 is coming up to speed. At the same armature the relay 1917 extends a path from conductor 1941 through the front contact of the right-hand armature of relay 1917, conductors 1945 and 1745 to the armature of sensitive relay 1718.

With relay 1702 operated under the control of relay 1917, conductor 1708 is disconnected from conductor 1703 and is connected through conductor 1730, operating winding of relay 1744, conductors 1745 and 1740 to the inner right-hand armature of relay 1713 through which it will receive ground connection from conductor 1722 when relay 1713 operates. At its inner right-hand armature relay 1702 prepares a path from ground over conductor 1747 to lamp 1748. At its outer right-hand armature the relay completes the operating circuit for relay 1749 which operates.

Relay 1749 completes a circuit from ground through the outer right-hand armature and front contact of relay 1702 and through its own outer left-hand armature and front contact, conductors 1752 and 1552, back contact and right-hand armature of relay 1509, conductors 1533, 1633 and 2033, and winding of relay 2036 to battery 2006. Relay 1749 also completes a circuit from ground through its outer right-hand armature and front contact, conductor 1751, outer left-hand armature and back contact of relay 1731, conductors 1756 and 1556, outer right-hand armature and back contact of relay 1503, conductors 1537, 1637 2037, and winding of relay 2038 to battery. Relays 2036 and 2038 operate over these circuits and the function performed thereby will be described later. Relay 1749 also prepares a holding circuit which is traced through its inner right hand armature and front contact to the front contact for the inner right-hand armature of relay 1713.

When motor 1818 has come up to speed the governor controlled contacts 1821 open, removing the short-circuit around resistor 1819 and permitting sensitive relay 1718 to operate over a circuit previously traced. Relay 1718 completes a path which is traced from battery 1723 over conductor 1757, left-hand winding of relay 1724, armature and front contact of relay 1718, conductors 1745 and 1945, front contact and right-hand armature of relay 1917, conductors 1941, 1741 and 1841 to the upper contact spring of stop contacts 1823 of transmitter 1802. Due to the fact that the start magnet of the transmitter is energized, the transmitting cams are being driven and the contacts 1823 closed once per revolution, extending the path over conductors 1833, 1733, 1722 and 1922 and the middle left-hand armature and front contact of relay 1902 to ground and relay 1724 operates. This relay in turn interrupts at its armature and back contact the energizing circuit of the start magnet of transmitter 1802, permitting the transmitter to stop upon completion of the cycle then in progress, and completes the circuit of its holding winding, and of the operating winding of relay 1713, to battery 1723.

At its outer left-hand armature and back contact relay 1713 interrupts a path from the armature of relay 1701 to the operating winding of relay 1734 and at the front contact it connects the armature of relay 1701 to conductor 1726 which is included in a path extending over conductors 1732 and 1832 to the code contacts of transmitter 1802 and through contacts 1801 to start magnet 1803. At its inner left-hand armature the relay 1713 interrupts the energizing circuit of relay 1917, completes a holding circuit for relay 1749 and prepares a holding circuit for relay 1744. In addition, it extends a ground connection over conductor 1758 to a plurality of paths including one through the left-hand armature and back contact of relay 1759, conductors 1761 and 1861 to the armature of relay 1811. At its inner right-hand armature and front contact relay 1713 connects ground from conductor 1722 over conductors 1740 and 1745, operating winding of relay 1744, conductor 1730 to the left-hand front contact of relay 1702.

As previously mentioned relay 1713 releases relay 1917. The latter relay releases relays 1702 and 1718. However, relays 1917 and 1702 have slow-release characteristics, and before relay 1702 releases the ground connection traced to its left-hand front contact will have been extended through the armature, conductors 1708 and 1508, outer right-hand armature and back contact of relay 1507, conductors 1506, 1566, 966 and 1066, armature 5 and front contact of relay 1008, conductors 1064 and 1764, operating winding of relay 1701, conductors 1704 and 1504, outer left-hand armature and back contact of relay 1503, conductors 1502, 1563, 1763 and 1063, front contact and armature 3 of relay 1008, conductors 1062 and 962 and the operating winding of relay 912 to the armature of relay 913. The completion of the above circuit establishes a communication path between the director and the calling subscriber station through the junctor repeater comprising relays 912 and 913. In this path relay 1701 operates to marking and relay 1744 operates. The operation of relay 1701 to marking does not cause the completion of the circuit of relay 1734 because the energizing circuit of that relay is now interrupted at the outer left-hand armature and back contact of relay 1713. Finally the relay 1713 at its outer right-hand armature disconnects ground from conductors 1712 and 1714 to permit condenser 1711 to charge and raise the potential of the grid of tube 1904. The time required to render tube 1904 conductive is approximately 3½ seconds.

In addition to releasing relay 1702, relay 1917 also opens the operating circuit of relay 1724, which remains operated through its holding circuit. It releases relay 1718 through which relay 1724 was operated. In addition, relay 1917 requalifies, at its right-hand armature and back contact, a circuit through conductors 1942, 1742 and 1842 which was previously disabled, for the operating winding of relay 1811.

Relay 1702 upon releasing interrupts the communication path to the junctor circuit (Fig. 9) thereby causing the junctor repeater to transmit a spacing signal of about three seconds duration to the calling subscriber station and causing relay 1701 to operate to spacing. The path entering the director from the junctor is extended through the left-hand armature and back contact of relay 1702 and through conductors 1703 and 1903 to the armature of relay 1901. At its inner right-hand armature the relay 1702 interrupts a previously prepared circuit for lamp 1748 and completes a circuit through armatures and front contacts of relays 1749 and 1744 and over conductor 1762 for lamp 1766. This path is traced through a front contact of relay 1744 because this relay became operated in series with relay 1701 prior to the release of relay 1702 and locked through its right-hand armature and front contact and the inner left-hand armature and front contact of relay 1713. Relay 1702 also interrupts the operating circuit of relay 1749 which remains operated by a holding circuit in parallel with that of relay 1744.

*Director ready signal is transmitted*

The spacing signal transmitted to the calling subscriber station (Fig. 1) causes relay 103 to release, whereupon the slow operate relay 128 operates and completes the circuit of lamp 132. The lighting of the lamp is a signal to the subscriber that the director is ready to respond to call directing signals, which are the signals identifying the called station.

In the director, when condenser 1711 has charged sufficiently (timed out), tube 1904 becomes conductive and operates relay 1901. This relay replaces the spacing signal transmitted to the subscriber station by a marking signal, the reestablished circuit, in so far as the director is concerned, being traced from ground through the middle left-hand armature and front contact of relay 1902, conductors 1922 and 1722, front contact and inner right-hand armature of relay 1713, conductors 1740, 1746 and 1946, break contacts of relay 1909, conductor 1931, front contact and armature of relay 1901, and conductors 1903 and 1703 to the back contact and armature of relay 1702. The transmission of the marking signal will result in the reenergization of relay 103 at the calling subscriber station and extinguishment of lamp 132, and in the reoperation of relay 1701 to marking in the director.

During the time in which motor 1818 was coming up to speed and distributor 1802 was being operated due to the energized condition of start magnet 1803, the five code contacts of the distributor were closed in succession and connected ground from conductor 1722 through the armature and back contact of relay 1724, conductor 1726, the right-hand armature and back contact of relay 1731, conductors 1732 and 1832 and the code contacts of the distributor to the lower or operating windings of relays 1812, 1813, 1814, 1816 and 1817. This represents a spacing condition and operates the armatures of the five relays to their spacing contacts where they lock in a path traced from ground through the outer right-hand armature and front contact of relay 1923, conductors 1928, 1728 and 1828, the armatures, spacing contacts and upper windings of the relays, conductor 1824 and winding of relay 1826 to battery 1827. This operates the armature of relay 1826 away from its single contact. It should be noted that relay 1814 is connected differently to relay 1826 than are the relays 1812, 1813, 1816 and 1817, in that the middle or marking locking winding is connected to conductor 1824 which extends to relay 1826, the upper or spacing winding being connected directly to battery. Thus the circuit controlled by relay 1826 which will be described hereinafter will be opened at the armature and single contact thereof while the distributor is operated by the motor as it comes up to speed. With relay 1713 operated, and when relay 1701 has been restored to the marking condition at the end of the director ready signal, the circuit including conductor 1832 is extended to the armature of relay 1701 which in the marking condition connects battery 1723 over the path, and this battery being in opposition to battery 1894 connected to the start magnet 1803 of the distributor causes the start magnet to be deenergized and the distributor to be stopped. Relays 1812, 1813, 1814, 1816 and 1817, however, remain locked in their spacing condition and relay 1826 remains operated away from its left-hand contact.

*Director receives call directing signals*

The director now awaits reception of the call directing codes from the calling subscriber's station. The calling subscriber transmits these codes by operating transmitter 111. In order for the director to recognize the received codes as being call directing codes, it is necessary that the calling codes of the called station be preceded by the figure shift code. This code comprises a series of five impulses of which the first two are marking, the third is spacing and the last two are marking. The significant impulses of the code are, of course, preceded by a start impulse of spacing nature and are followed by a stop impulse of marking nature. The junctor repeater relay 913 receives the signals from the calling subscriber station and repeats them to the director where they are received by receiving relay 1701. In response to the start impulse of spacing nature the armature of relay 1701 operates to spacing which is connected to ground, and thus completes the energizing circuit for start magnet 1803 of the distributor through contacts 1801. Accordingly, the distributor cams are set in operation through their driving clutch. The motor speed and the code contacts of distributor 1802 are so adjusted that the cams close the contacts in succession as the impulses are received by relay 1701. In response to the first significant impulse of marking nature, relay 1701 connects battery 1723 through the path including conductor 1832 and through the first pair of code contacts of distributor 1802 and the operating winding of relay 1812 to the junction of resistors 1806 and 1807 comprising a potentiometer associated with battery 1809 and relay 1812 operates to the marking condition, connecting ground from conductor 1828 through its armature and marking contact and conductor 1829 and through relay 1831 to battery and in parallel with relay 1831 through relay 1834 to battery. Relay 1812 locks in the marking condition through its middle winding and relays 1831 and 1834 operate. In response to the second impulse which is also of marking nature relay 1813 is operated to marking from the marking contact of relay 1701 through the second pair of code contacts of the distributor, locking to marking through the middle winding and completing the circuit of relay 1838 over conductor 1837 and in parallel with relay 1838 the circuit of relay 1859. The third impulse of the code is of spacing nature so that relay 1814 remains in its spacing condition and does not operate relay 1844 to which its marking contact is connected by conductor 1846. The fourth and fifth impulses are of marking nature and accordingly relays 1816 and 1817 operate to marking, completing the circuits of relays 1857 and 1858, respectively, over conductors 1849 and 1851, respectively.

As the armature of relay 1817 leaves its spacing contact ground is disconnected from conductor 1824 and thus from the winding of relay 1826. The interruption of current through relay 1826 permits its biasing spring to operate the armature to the left-hand contact, preparing a circuit for relay 1933 traced from battery through the winding of that relay, conductors 1974, 1774, 1874, contact and armature of relay 1826, conductors 1873, 1773, 1973, back contact and left-hand armature of relay 1932, conductors 1971, 1771 and 1871 to the marking contact of relay 1811. The five code impulses having been received, relays 1812, 1813, 1816 and 1817 are in a marking condition, relay 1814 is in the spacing condition, relays 1831, 1834, 1838, 1859, 1857 and 1858 are operated.

During the reception of the stop impulse stop contacts 1823 close momentarily and complete a circuit from battery 1809 through resistor 1808, the operating or lower winding of relay 1811, conductors 1842, 1742 and 1942, back contact and right-hand armature of relay 1917, conductors 1941, 1741 and 1841, contacts 1823 and conductors 1833, 1733 and 1722 and 1922 to ground. Relay 1811 operates its armature to the marking contact and completes a circuit from ground through the inner left-hand armature and front contact of relay 1713, conductor 1758, left-hand armature and back contact of relay 1759, conductors 1761 and 1861, armature and marking contact of relay 1811, and over the path traced in the preceding paragraph through the winding of relay 1933, which operates. A condenser 1847 having one terminal connected to conductor 1842 and the other terminal connected through a resistor to ground delays the release of the armature of relay 1811 to its spacing contact when stop contact 1823 opens.

Relays 1831, 1834, 1838, 1859, 1844, 1857 and 1858 represent a fan circuit the apex of which is the armature of relay 1858. The fan circuit is so wired that it does not complete a path from the apex point to a selectable conductor in response to the figures shift code combination and accordingly no selection is made.

Relay 1933, operated by relay 1811 through the armature and contact of relay 1826, establishes a holding circuit through its front contact and left-hand armature, conductors 1977, 1777 and 1758, and the front contact and inner left-hand armature of relay 1713 to ground. When condenser 1847 becomes charged and the current in the operating winding of relay 1811 decreases, permitting the current in the biasing winding to operate the armature to spacing, a circuit is completed from ground over a path previously traced including conductor 1861 and thence through the armature and spacing contact of relay 1811 and conductors 1878, 1778 and 1978, right-hand armature and front contact of relay 1933, right-hand armature and back contact of relay 1934 and winding of relay 1932 to battery, whereby relay 1932 operates. Relay 1932 establishes a holding circuit in parallel with that of relay 1933. At its left-hand armature and back contact it transfers the path extending from the marking contact of relay 1811 from the original energizing circuit of relay 1933 to a path extending from the front contact through conductors 1979 and 1779, inner left-hand armature and back contact of relay 1776 and thence through branching paths, one extending through conductors 1781 and 1981 to the operating winding of relay 1934 and the other extending through the armature and back contact of relay 1782, outer right-hand armature and back contact of relay 1759, conductor 1783, back contact and outer left-hand armature of relay 1784, conductors 1786 and 1986, break contacts of relay 1940 and conductors 1987, 1787 and 1887 to the armature of relay 1858, this armature being the apex of the fan circuit. Relay 1934 does not operate at this time because the armature of relay 1811 has returned to the spacing contact.

After transmitting the figures shift code combination, the calling subscriber transmits the code combination for the first digit of the called subscriber's number. The code combinations for the ten digits, the letters which these code combinations also represent and the conditions which they impart to relays 1812, 1813, 1814, 1816 and 1817 are indicated in the following table in which the letter M represents marking and the letter S represents spacing.

| Character | | Relay Condition | | | | |
|---|---|---|---|---|---|---|
| Lower Case | Upper Case | R1812 | R1813 | R1814 | R1816 | R1817 |
| P | 0 | S | M | M | S | M |
| Q | 1 | M | M | M | S | M |
| W | 2 | M | M | S | S | M |
| E | 3 | M | S | S | S | S |
| R | 4 | S | M | S | M | S |
| T | 5 | S | S | S | S | M |
| Y | 6 | M | S | M | S | M |
| U | 7 | M | M | M | S | S |
| I | 8 | S | M | M | S | S |
| O | 9 | S | S | S | M | M |

Let it be assumed that the station called is the station in Fig. 2 and that the number of this station is 44. The first digit will accordingly be represented by the code combination SMSMS as indicated in the table. Relay 1812 will be operated from marking to spacing, relay 1813 will remain in the marking condition, relay 1814 will remain in the spacing condition, relay 1816 will remain in the marking condition and relay 1817 will be operated to spacing. With the code responsive relays set in accordance with the code combination for the digit 4 the fan circuit relays which will be operated will be the relays 1838, 1859 and 1857. As soon as the first code impulse of spacing nature is received and registered, which in case of the particular code combination under consideration in the first significant impulse, relay 1826 will be operated away from its left-hand contact because relay 1826 is so connected to the relays 1812, 1813, 1814, 1816 and 1817 that the only code combination which permits the armature of relay 1826 to be released to its left-hand contact is the figure shift code combination. After the reception of the last significant impulse of the code combination a stop impulse is received, contacts 1823 close momentarily and operate relay 1811 to its marking contact. A circuit is accordingly traced from ground over the path including conductor 1861, armature and marking contact of relay 1811, conductors 1871, 1771 and 1971, left-hand armature and front contact of relay 1932, conductors 1979, 1779, inner left-hand armature and back contact of relay 1776 where the path branches, one extending through conductors 1781 and 1981 to the operating winding of relay 1934 which operates and locks through its holding winding and left-hand front contact and armature in parallel with the relays 1932 and 1933. The other path is traced through the armature and back contact of relay 1782, back contact and outer right-hand armature of relay 1759, conductor 1783, back contact and outer left-hand armature of relay 1784, conductors 1786 and 1986, break contacts of relay 1940, conductors 1987, 1787, and 1887 to the armature of relay 1858. Relay 1858 is not energized and the path is extended through its back contact to the left-hand armature of relay 1857. This relay is operated so the path is extended through its left-hand front contact to the inner right-hand armature of relay 1844. This relay is unoperated so the path is extended through its back contact to the inner left-hand armature of relay 1838. Relay 1838 is operated so the path is extended through its front contact to the outer right-hand armature of relay 1834. This relay is unoperated so the path is extended through conductors 1848, 1648 and 1548, outer left-hand armature and back contact of relay 1547, conductors 1549 and 1649, back contact and innermost armature of relay 1601, winding of relay 1602 and back contact and right-hand armature of relay 1603 to battery. Relay 1602 operates and locks in a circuit from battery through its holding winding, right-hand armature and front contact, winding of relay 1603, conductors 1611 and 1511, outer right-hand armature and back contact of relay 1512 and conductors 1588, 1788 and 1758, and inner left-hand front contact and armature of relay 1713 to ground. Thus as the immediate result of reception of the code combination representing the digit 4, relay 1602 has been selected and operated, relay 1603 has been operated under the control of selected relay 1602 and relay 1934 has been operated as a result of reception of the stop impulses of the code combination.

Relay 1602 completes a circuit traced from battery through the windings of relay 1604 and 1605 in parallel, conductor 1606, front contact and left-hand armature of relay 1602, conductors 1613 and 1513, inner right-hand armature and back contact of relay 1512, conductors 1589 and 1789, back contact and right-hand armature of relay 1791, conductors 1792 and 1992, front contact and right-hand armature of relay 1934, now operated under the control of relay 1811, front contact and right-hand armature of relay 1933 and conductors 1978, 1778 and 1878 to the spacing contact of relay 1811. Upon the operation of the armature of relay 1811 to its marking contact due to closure of contacts 1823, followed by release of the armature due to the charging of condenser 1847, the path just traced is completed over conductor 1861 to ground, and relays 1604 and 1605 operate. A branching path is traced from conductor 1789 through the winding of relay 1776 to battery and this relay operates along with relays 1604 and 1605.

Relay 1603, at its left-hand armature, interrupts the original energizing circuit for relay 1602 and completes the energizing circuits of relays 1601 and 1607. Relay 1601 disconnects relay 1602 and other similar relays from the fan circuit paths representing the digits 0, 1, 2, 3 and 4, of which conductor 1649 is the end of the fan circuit path representing the digit 4, and relay 1607 disconnects the fan circuit conductors representing the digits 5, 6, 7, 8 and 9 from relays corresponding to the relay 1602. At its right-hand armature the relay 1603 prepares a circuit which will be described later.

Relay 1776, having operated, locks to ground in a circuit through its front contact and outer left-hand armature, conductor 1758 and the front contact and inner left-hand armature of relay 1713. At its inner left-hand armature it transfers the path of the marking contact of relay 1811 from the operating winding of relay 1934 and from the apex of the fan circuit represented by conductor 1887 to the winding of relay 1791. At its right-hand armature it completes a circuit from ground through the lower break contacts of key 1793, inner left-hand armature and back contact of relay 1784, conductor 1794, the noted armature and contact of relay 1776 and conductors 1796 and 1096 which causes the immediate reoperation of relays 1021, 1022 and 1023, to assure that relay 1034 remains operated even though relay 910 should release.

The code combination for the second digit of the called subscriber's number is the same as the first since the number has been assumed to be 44. Accordingly, no change occurs in the condition of code responsive relays 1812, 1813, 1814, 1816 and 1817 and no change occurs in the fan circuit relays, the relays 1838, 1859 and 1857, remaining energized. When the stop impulse following the code combination is received and stop contacts 1823 close, the armature of relay 1811 is again operated to marking, connecting ground on its armature over conductors 1871, 1771, 1971, the left-hand armature and front contact of relay 1932, conductors 1979, 1779 and the inner left-hand armature and front contact of relay 1776 and winding of relay 1791 to battery. Relay 1791 operates and locks through its inner left-hand armature and front contact, conductor 1758 and the inner left-hand armature and front contact of relay 1713 to ground. At its outer left-hand armature and front contact, the relay 1791 connects battery 1717 to the right-hand terminal of the operating winding of receiving relay 1701. This terminal is the one which is connected through to the operating winding of relay 912 in the junctor repeater and accordingly relay 1701 will be held in the marking condition and unresponsive to any further signals transmitted from the calling subscriber. At its right-hand armature the relay 1791 transfers the path of the spacing contact of relay 1811 from the energizing circuit of relays 1776 and 1604 and 1605, which are now held through the outer left-hand armature and back contact of relay 1776, to the winding of relay 1782.

When the armature of relay 1811 releases to its spacing contact it completes the circuit of relay 1782, over conductors 1878, 1778, 1978, make contacts of relays 1933 and 1934 operated, conductor 1992, 1792, make contacts of relay 1791 operated, to the relay 1782, which operates. At its single armature the relay 1782 completes a path from battery through the winding of relay 1797, conductors 1798 and 1998, winding of marginal relay 1943, conductors 1999 and 1799, the front contact and armature of relay 1782, back contact and outer right-hand armature of relay 1759, conductor 1783, back contact and outer left-hand armature of relay 1784, conductors 1786 and 1986, break contacts of relay 1940, conductors 1987, 1787 and 1887 through the fan circuit path which is the same as that previously traced because the fan circuit relays are assumed to remain unchanged, conductors 1848, 1648, 1548, outer left-hand armature and back contact of relay 1547, conductors 1549 and 1649, outer right-hand armature and front contact of relay 1604 because this relay is locked in the operated condition, conductors 1664, 1564, 964, 864, 764 and 564 which extends into the line terminating circuit 507 for the subscriber station in Fig. 2 and corresponds to conductor 551. The connection of battery through the relays 1797 and 1943 to the conductor extending to the called subscriber's line circuit is made for the purpose of determining by means of the two relays whether the called subscriber's line is busy or out of order. If the called subscriber's line is busy there will be a direct ground on conductor 564 and both of the relays 1797 and 1943 will operate. If the line is out of order there will be a ground on the conductor through a resistance of the order of 1900 ohms and relay 1797 will operate but relay 1943 will not operate. It will be assumed for the present that neither of these conditions exists and that neither of the relays 1797 and 1943 operates.

Relay 1782 also completes a circuit from grounded conductor 1758 through the auxiliary make contacts of relay 1782 and winding of relay 1705 to battery. Relay 1705 has slow-operate and slow-release characteristics and is in the process of being operated while the busy and out-of-order tests are being made. When relay 1705 operates it connects ground from conductor 1758 through its armature and front contact and through the armature and back contact of relay 1797 and winding of relay 1759 to battery, and the relay 1759 operates. At the left-hand armature of relay 1759 ground is disconnected from conductors 1761 and 1861 extending to the armature of relay 1811 and a holding circuit for relay 1759 is established. At the outer right-hand armature of relay 1759 the apex of the fan circuit is disconnected from the windings of relays 1797 and 1943 and is connected instead through conductors 1710 and 1715, winding of relay 1720, conductors 1725 and 1525, back contact and inner left-hand armature of relay 1503, conductors 1514 and 1614, right-hand armature and front contact of relay 1603 to conductor 1612, which is connected to conductor 1634. From this point a path is traced into Fig. 20 through conductors 1634 and 2034 to the inner lower front contact of relay 2001 and through the associated armature of that relay to ground, relay 2001 being operated because Select magnet 856 of the link circuit is operated. At the opposite end of the fan circuit conductor 564 is connected to conductor 553 in the same manner that conductor 551 is connected to conductor 549 and a path is traced through conductor 553, conductor groups 520, 720 and 820, conductor 825 and winding of Hold magnet 862 to battery. A circuit is thus completed through relay 1720 and Hold magnet 862 to ground on the inner lower armature of relay 2001. Relay 1720 has a high resistance winding and passes insufficient current to operate Hold magnet 862 so that for the time being this magnet remains unoperated.

When the ground connection was removed from the armature of relay 1811 by the left-hand armature of relay 1759 the circuit of relay 1782 was interrupted. This relay has a slow-release characteristic and when it does release it interrupts the energizing circuit for relay 1705 which also has a slow-release characteristic. The initial effect of the release of relay 1705 is to interrupt the original energizing circuit for the relay 1759, but as this relay had established a holding circuit it remains operated. One other operation performed by the relay 1759 when it operated was the preparation of an energizing circuit for the relay 1944 traced from battery through the winding of the relay, conductors 1935 and 1735, the inner right-hand armature and front contact of relay 1759, conductor 1750, back contact and right-hand armature of relay 1755, conductor 1760 to the back contact of relay 1720. The circuit of relay 1944 is not completed because relay 1720 operates in the path previously traced through the fan circuit and including the winding of Hold magnet 862 which did not operate due to the high resistance of the winding of relay 1720. Relay 1720 prepares a path for the operation of relay 1755 traced from battery through the winding of the relay, conductor 1765, the front contact and armature of relay 1720, conductor 1770 to the back contact of relay 1705. Upon the release of relay 1705 by relay 1782 the circuit of relay 1755 is completed and this relay operates. At its right-hand armature it interrupts the circuit prepared by relay 1759 for relay 1944. At its left-hand armature it completes a holding circuit from grounded conductor 1758 through conductor 1788. At its make contacts controlled by the left-hand armature the relay 1755 short-circuits the winding of relay 1720, causing this relay to release and permitting Hold magnet 862 of the link circuit to operate.

*Connection to called subscriber is established*

Magnet 862 operates prepared contacts 861 to connect conductors 829, 831 and 810 to conductors 879, 866 and 867, respectively. Magnet 862 also operates its armatures to connect conductor 866 to conductor 868 and to connect conductor 867 to conductor 869, at the same time disconnecting conductor 868 from conductor 871 and conductor 869 from conductor 872. Conductors 868 and 869 extend through conductor group 820–720–520 to conductors 568 and 569 that are connected in subscriber's line termination circuit 507 to line conductors 503 and 504 in the same manner that conductors 512 and 519 are connected to line conductors 501 and 502. In this way paths have been extended from conductors 931 and 910 in the junctor circuit through the link circuit and through the suscriber's line circuit and line conductors 503 and 504 to the line conductors 203 and 204 at the station in Fig. 2. The conductors 203 and 204 are connected for alternating current through condenser 211 and alternating current relay 212 but will not pass direct current. Accordingly, relay 952 in Fig. 9 which is connected to conductor 910 does not operate at this time. With conductor 879 connected to conductor 829 a holding circuit for Hold magnet 862 is completed through these conductors and conductor 929, winding of relay 930 and conductor 924 to ground on the inner lower armature of relay 903. Relay 930 operates and completes a circuit from ground through its upper armature and front contact, lower armature and back contact of relay 952, conductor 967, winding of relay 909 and armature and back contact of relay 968 to battery. Relay 909 operates and connects source 973 of alternating ringing current to conductor 931 which extends to the called subscriber's station of Fig. 2, and connects ground through its outer lower armature and front contact and conductor 974 to the other conductor 910 which extends to the called subscriber's station. At its inner lower armature and back contact the relay 909 disconnects ground from the grid of tube 908 and permits condenser 976 to charge from battery 977 through resistor 978.

In addition to completing the operating circuit for relay 909 the relay 926 at its inner lower armature completes a circuit from ground through resistor 956, the noted armature and front contact of relay 926, the inner upper armature and back contact of relay 952, and conductors 949, 948 and 947 to the operating winding of repeating relay 912 for holding that relay in the marking condition, and at its outer lower armature and back contact interrupts the energizing circuit for relay 1008, thus releasing that relay. The operations resulting from the release of relay 1008 will be described hereinafter but is should be noted at this point that the relay 1008 in releasing its armature 3 disconnects the ground supplied over conductor 1063 from the director circuit to the front contact associated with that armature and extended over conductors 1062, 962 and 947 to the operating winding of relay 912. In view of this the necessity for supplying a holding connection for relay 912 through the inner lower armature and front contact of relay 926 will be apparent.

Ringing current is supplied continuously over the line conductor until condenser 976 has become sufficiently charged to render tube 908 conducting. When this occurs relay 968 included in the plate circuit of tube 908 operates and interrupts the circuit of relay 909 which releases, reconnecting conductor 931 to conductor 948, grounding the grid of tube 908 and disconnecting ground from conductor 974 which represented a short-circuit around relay 952.

*Called subscriber station responds to ringing*

Before tube 908 has timed out and operated relay 968 alternating current relay 212 in Fig. 2 should have operated in response to the ringing current. This relay completes a circuit from ground through its armature and front contact, conductors 297 and 298, winding of relay 267, conductor 299 and battery 228 thus operating relay 267. Relay 267, which is slow-to-operate because of its dash-pot, connects ground through its make contact and through the outer lower armature and back contact of relay 208, conductor 268 and winding of relay 224 to battery, thus operating the relay 224. Relay 224 locks in a circuit from battery 228, winding and upper front contact and armature of relay 224, conductor 229, key 231, contacts 232, conductor 234, outer upper armature and back contact of relay 236 and middle lower armature and back contact of relay 237 to ground. Relay 224 starts motor 200 and operates relay 208 over circuits traced in the detailed description of Fig. 2. With relay 208 operated the line conductors are interconnected directly and alternating current relay 212 is cut out. The alternating ringing current flows in the line conductors interconnected at the called subscriber's station until relay 968 associated with the junctor circuit (Fig. 9) operates and releases relay 909. Thereupon conductor 931 is reconnected to conductor 948, ground is disconnected from conductor 974 and line current flows to energize relay 952. The holding ground connection is still applied through resistor 956 and conductor 949 to conductor 948 but since this holding ground is not a direct ground connection but includes resistor 956 the potential applied over the line conductor to relay 952 is sufficient to operate this relay.

At its outer upper armature and front contact relay 952 applies a supplemental ground connection in parallel with that supplied by relay 915 for holding relay 903 operated. At its inner upper armature and back contact the relay 952 disconnects the holding ground from conductor 948, thereby placing the junctor repeater solely under the control of the subscriber stations which have been interconnected through the junctor and the link circuit. At its lower armature the relay 952 disconnects ground from conductor 967 thereby preventing the reenergization of relay 909 which remains released and holds tube 908 nonconducting.

Concurrently with the final conditioning of the junctor circuit for intercommunication between the two subscriber stations as described in the foregoing paragraph, motor 200 in Fig. 2 is coming up to speed. When the motor reaches operating speed its centrifugally operated contacts 256 close and complete the circuit of relay 206 from battery 258 over conductor 254, the inner upper armature and back contact of relay 236, conductor 253, the winding of relay 206, conductor 252, and the back contact and upper armature of relay 251 to ground. Relay 206 operates and opens the line circuit at its upper armature and back contact, thus causing the transmission of a spacing signal to the calling subscriber through the junctor repeater. At its lower armature the relay 206 interrupts a conductive path from negative battery 210 through the back contact and outer lower armature of relay 237, back contact and lower armature of relay 206, conductor 215 to the grid of vacuum tube 220. Thereupon condenser 225 connected in series with resistor 230 between the negative terminal of battery 282 and the grid of tube 220 begins to charge through resistors 230 and 235 to ground. An interval of three seconds is required for raising the potential of the grid of tube 220 sufficiently to render the tube conductive and operate relay 240 included in the plate circuit. Relay 240 upon being operated completes a circuit from ground through its upper armature and front contact, conductor 226, the middle lower armature and back contact of relay 236, the winding of relay 251 and conductor 249 to battery 228. Relay 251 operates and locks to ground supplied through the upper armature and front contact of relay 224. Relay 251 interrupts the energizing circuit of relay 206 at its upper armature and back contact, thereby releasing that relay which recloses the line and terminates the transmission of the spacing signal to the calling station. Relay 206 also reconnects battery 210 to the grid of tube 220 which cuts off that tube and thereby releases relay 240. The spacing signal of three seconds duration transmitted under the control of relay 206 represents an answer-back signal to signify to the calling station that the called station is in operation and ready to receive and transmit from and to the calling station over the circuit which has been established through the junctor repeater.

*Director circuit is released for use on another call*

There remains for consideration in connection with the establishment of the call the restoration of the director circuit to normal. Mention has been made previously of the fact that relay 926 associated with the junctor circuit releases relay 1008 of the junctor sequence circuit. At its armature 2 and front contact relay 1008 interrupts the energizing circuit of relay 959. Relay 959 releases Select magnet 856 which is not required to remain energized after Hold magnet 862 operates because, as previously stated, the Hold magnet maintains closed the contacts which it found prepared for closure and closed, in the case of magnet 862 the contacts 861. Relay 856 releases relay 2001 which is no longer required for holding magnet 862 energized because that magnet is held in series with relay 926. At the armature 3 and front contact of relay 1008 battery 911 of the junctor repeater has been disconnected from conductor 1063 and therefore, from the operating winding of receiving relay 1701 of the director so that the armature of this relay is operated by the biasing winding to spacing. This circuit is further interrupted at the armature 5 and front contact of relay 1008. At the armature 4 and front contact of relay 1008 ground is disconnected from the operating circuit of relay 1902 which releases. Relay 1902 in turn interrupts the filament circuit of tube 1904, and relay 1901 releases. Relay 1902 also releases relay 1923 and relays 1724 and 1713. Relay 1713 releases relays 1744, 1749, 1759, 1791, 1776, 1755, 1603 and 1602. Relay 1713 also releases relays 1932, 1933 and 1934. Relay 1776 releases relays 1021, 1022 and 1023. Relay 1603 releases relays 1601 and 1607. Relay 1602 releases relays 1604 and 1605. Relay 1923 releases those of the fan circuit relays that were operated, and opens the circuit of motor 1818. Of the relays at the switching station heretofore described as having been operated, all have been released except the relays 2036, 2038, 903, 910, 915, 926, 952 and 1034. Hold magnets 801 and 862 are also held operated. The function of relays 2036 and 2038 will be described hereinafter. The others hold the established connection between the two subscriber stations until a disconnect signal is received.

*Operation of miscellaneous alarm circuit*

As stated in the description of operation of the sequence master control circuit shown in the lower portion of Fig. 10 the operation of relay 1024 causes the operation of relay 2016. At its outer upper armature the relay 2016 prepares a holding circuit for relay 2102. At its inner upper armature it completes the circuit of common start relay 2003. At its inner lower armature it completes the circuit of lamp 2021, which lights.

Relay 2003, at its upper armature, removes ground from a circuit traced through conductor 2002, back contacts of relay 2001, conductors 2027, 1627, 1527, 1727, 1027, 1017, chain circuit through back contacts and armatures 7 of relays 1008, 1011, 1013 and 1016, conductors 1026, 926, 826, 1226, chain circuit through back contacts and outer lower armatures of relays 1206, 1203 and 1201 in the trunk sequence circuit, conductors 1224, 824, 624 and the chain circuit through the back contacts and armatures of relays 623 and 621 to the armatures of relay 614. The path just traced is part of the circuit over which relay 618 became energized, and the removal of the ground connection prevents other subscribers' sequence circuits in Fig. 6 from attempting to complete another call.

At its lower armature the relay 2003 completes a path from a ground supply interrupter 2009, which supplies impulses at the rate of one impulse per second, over conductor 2008, the make contacts of relay 2003, conductors 2010 and 2110 to relay 2104, which operates and releases once per second. Relay 2104 operates three sets of counting relays 2106 and 2107, 2111 and 2112, and 2116 and 2117. The counting relays time the intervals during which the subscriber sequence circuit and the sequence master control circuit operate to cause the seizure of a junctor circuit, and as the operation of the miscellaneous alarm circuit in this respect is fully described in Patents 2,228,279 and 2,340,599, it will not be repeated here. Upon the release of relay 1024 by relay 1034, as hereinbefore described, the former releases relay 2016. Relay 2003, which was energized by relay 2016, may not release, because, in the operation of that part of the timing circuit comprising relays 2106, 2107, 2111 and 2112, the relay 2017 operates, and in turn operates relay 2101, which provides a ground connection that will hold relay 2003 operated after relay 2016 releases.

In the description of the preparation of the director circuit to route the call, it was stated that among the operations performed by relay 1749 are the energization of relay 2038 and relay 2036. These relays cause the miscellaneous alarm circuit to time the interval during which the director circuit performs its functions, and if the director circuit fails to function properly, the director locks in a "stuck" condition and an alarm is given. The operation is described in the patents referred to in the preceding paragraph.

*Called subscriber line tests busy*

The operation of the system under the circumstance that a called subscriber's line is busy will now be described. As previously described a busy condition at the station shown in Fig. 2 is represented by a direct ground connection at the subscriber's line circuit 507 on the conductor 564, and this ground is extended over a circuit previously traced to cause the operation of relays 1797 and 1943. With relay 1943 operated ground on its inner right-hand front contact is extended through the inner right-hand armature, conductor 1947 and winding of busy relay 1940 to battery, and relay 1940 operates over this circuit. At its outer right-hand armature the relay 1943 completes a path from ground to the inner armature of relay 1948, which is unoperated, preparing a circuit for lamp 1951. At its inner left-hand armature the relay 1943 disconnects conductors extending to the operating winding of relay 1909, to the front contact associated with the inner right-hand armature of relay 1944, and to one of the front contacts of relay 1949, from the conductor 1980 which extends into Fig. 17 as conductor 1780 and terminates at the front contact of relay 1797. The front contact with which the inner left-hand armature of relay 1943 is engageable is connected to the outer armature of relay 1948 which has its contact connected to conductor 1980, so that if and when relay 1948 operates, as will be described hereinafter, the elements including the operating winding of relay 1909, the front contact of the inner armature of relay 1944, and the noted contact of relay 1949 will be reconnected to conductor 1980. The relays 1909, 1944, and 1949 are part of a system for generating busy signals and out-of-order signals as will be described hereinafter. The outer left-hand armature of relay 1943 is arranged to remove a short-circuit from a resistor associated with the busy signal generator. Relay 1797 which is operated in series with relay 1943 removes relay 1759 from control by relay 1705 and extends a conductive path from the front contact of relay 1705 over conductor 1780 to conductor 1980.

With relay 1940 operated it establishes a holding circuit from ground through the front contact and inner right-hand armature of relay 1902, which is energized, and through its own inner right-hand armature and front contact. The same ground connection is extended through the outer right-hand armature and front contact of relay 1940 and through the winding of relay 1948 to battery thus completing the energizing circuit of the latter relay. Relay 1948 has a slow operate characteristic and does not at once operate. At its left-hand armature, front contact and break contact operable in make before break manner the relay 1940 disconnects the previously traced busy and out-of-order test circuit, including the windings of relays 1797 and 1943, from conductor 1987 which represents the apex of the director fan circuit path established to select the called subscriber's line circuit, found to be busy, and connects the busy test circuit to conductor 1975 from which a path is traced through conductors 1775, 1575, 975, 875, 775, into Fig. 22 through conductor 2275 to the inner lower armature of a relay 2201.

Figure 22:
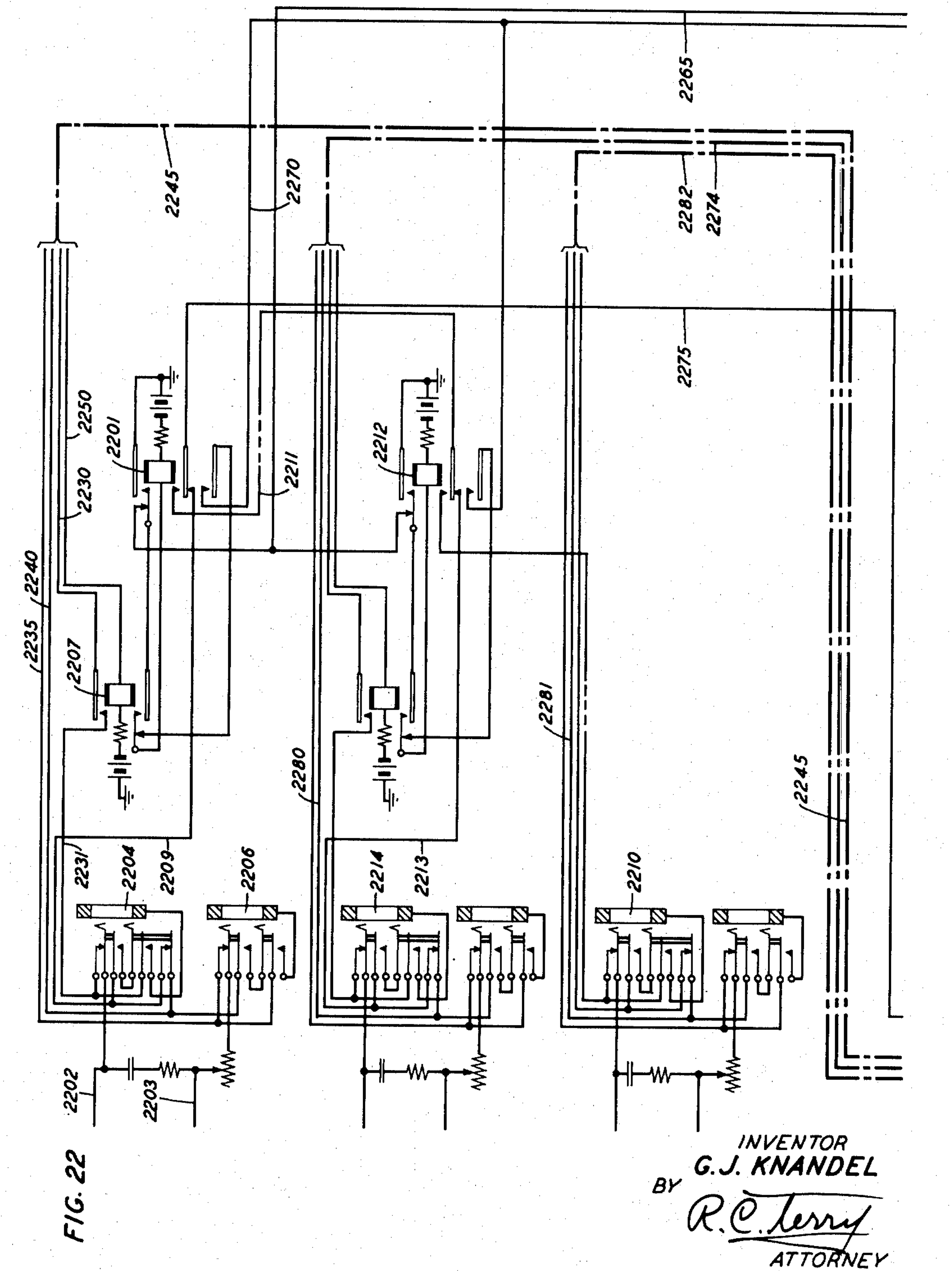
Fig. 22 shows line circuits for an overflow line system.

Fig. 22 represents the line terminating circuits of a plurality of overflow or busy intercept lines local to the automatic switching center. The purpose of these overflow lines is to receive and store, in the form of perforated tape, messages directed to subscriber stations which are busy at the time the director seeks to establish connection to them. The messages thus stored are retransmitted by means of the perforated tape to the proper called subscriber station when that station becomes idle. The overflow lines are in the nature of unattended receiving only telegraph stations comprising a printing reperforator as the receiving element, adapted to be started automatically in response to ringing current transmitted by the director in a manner similar to the starting of an unattended subscriber station and provided with control relay circuits for seizure by the director on a line hunting basis.

The line over which signals are transmitted to the first reperforator comprises conductors designated by the reference numerals 2202 and 2203 which terminate at the tip springs of jacks 2204 and 2206 respectively. The normal or break contact for the tip spring of jack 2204 is connected by conductor 2231 to the upper front contact of a relay 2207. A conductor 2230 is connected to the upper armature of relay 2207. The break contact associated with the tip spring of jack 2206 is connected to a conductor 2235. One of a pair of break contacts controlled by the ring contact spring of jack 2204 is connected to a conductor 2240 and the other contact of the pair is connected by conductor 2209 to the back contact associated with the inner lower armature of relay 2201. One terminal of relay 2207 is connected to battery and the other terminal is connected to a conductor 2250.

The conductors 2230, 2235, 2240 and 2250 have been brought together into a group and the group is indicated by dot and dash line 2245 which extends through Fig. 7 and into Fig. 8 and is identified by the reference numerals 745 and 845. The group is expanded in Fig. 8 into the four conductors 830, 835, 840 and 850 which correspond to the conductors 2230, 2235, 2240 and 2250. Conductor 830 is one of the vertical conductors of the cross-bar switch or link circuit. Conductor 835 is connected to the outer front contact of Hold magnet 852 and the associated armature of the Hold magnet is connected to vertical conductor 853 of the cross-bar switch. One terminal of Hold magnet 852 is connected to grounded battery and the other terminal is connected to vertical cross-bar switch conductor 855 to which conductor 840 is also connected. Conductor 850 is connected to the inner front contact of Hold magnet 852, and the inner armature is grounded.

Upon the assumption that the first overflow line is idle neither of the relays 2201 and 2207 is operated, and when the circuit of the out-of-order and busy relays 1797 and 1943 is transferred by relay 1940 from fan circuit apex conductor 1987 to conductor 1975 the circuit is extended over a path previously traced to the inner lower armature of relay 2201 and through its back contact, conductor 2209, break contacts controlled by the ring contact spring of jack 2204 and conductors 2240 and 840 to conductor 855 which has only a battery connection through the winding of Hold magnet 852 because none of the cross-bar switch contacts controlled by this Hold magnet is as yet operated. There being no circuit to ground to hold the relays 1797 and 1943 operated these relays release. The connection of the calling subscriber to the overflow line follows the previously described procedure of connecting the calling subscriber to the called subscriber's line when that line is idle. Relay 1705 operates, and the relay 1797, having been released or upon releasing, completes the circuit of relay 1759 which operates. This relay disconnects the path including conductors 1783 and 1786 from the circuit of relays 1797 and 1943 and connects it instead through the winding of relay 1720, the back contact and inner left-hand armature of relay 1503 and the right-hand armature and front contact of relay 1603 from which the path is traced through conductors 1612, 1634, 2034 to the inner lower front contact of relay 2001 and through the armature of the relay to ground, relay 2001 being operated because the Select magnet 856 of the link circuit is operated as previously described for the purpose of extending a connection to the called subscriber station primarily or to an idle overflow line circuit secondarily. A circuit has thus been completed from battery through to Hold magnet 852 and the winding of relay 1720 to ground. Because relay 1720 has a high resistance winding as previously stated, it passes insufficient current to operate the Hold magnet, this magnet remains unoperated but relay 1720 operates.

There follows the release of relay 1782 by relay 1759, the release of relay 1705 by relay 1782, the operation of relay 1755 in a circuit prepared by relay 1720 and the short-circuiting of the operating winding of relay 1720 by relay 1755 thus permitting sufficient current to flow to operate Hold magnet 852. All of the cross-bar switch contacts that are engageable with conductors 829, 810 and 831 having been prepared for operation by Select magnet 856 the contacts 857 are among those prepared and are operated by Hold magnet 852, thereby connecting conductors 829, 810 and 831 to conductors 855, 853 and 830 respectively. The ground connection supplied from the junctor circuit in Fig. 9 through the winding of relay 930 to conductor 829 is extended to conductor 855 to hold the magnet 852 operated after the original operating ground connection supplied by the director over a previously traced path including conductors 2034, 1634 and 1612 shall be removed.

The outer armature of Hold magnet 852 connects conductor 853 to conductor 835, thereby extending one side of the communication path through conductor 835, conductor 2235 and closed contacts of jack 2206 to conductor 2203. At the inner armature of Hold magnet 852 ground is extended over conductors 850 and 2250 to operate relay 2207. This relay operates and at its upper armature it extends the other side of the communication path, represented by conductors 830, 2230, and 2231 and closed contacts of jack 2204 to conductor 2202.

With relay 2207 operated a circuit is traced from grounded battery through the winding of relay 2201, front contact and lower armature of relay 2207, the front contact now being disengaged from the fixed contact, front contact and break contact associated with the upper armature of relay 2201 and conductors 2265, 765, 865, 1265, 1565, 1665 and 2065, inner upper armature and front contact of relay 2001 to ground. Relay 2001 is operated because Select magnet 856 is operated and relay 2201 operates. Relay 2201 establishes its holding circuit to ground through its upper armature and front contact and the lower armature and front contact of relay 2207, this ground connection being supplied in make-before-break manner in substitution for the ground connection supplied over conductor 2265. At its inner lower armature relay 2201 transfers conductor 2275, over which the first overflow line was seized by the director, from conductor 2209 over which a circuit has previously been traced to the Hold magnet 852 of the first overflow line, to conductor 2211 which extends to the inner lower armature of relay 2212, which corresponds to relay 2201 and is associated with another overflow line. The back contact associated with the inner lower armature of relay 2212 is connected by conductor 2213 through the break contacts associated with the ring contact spring of jack 2214 and conductor 2280 which corresponds to conductor 2249 and is one of the group represented by the dot and dash lines 2274, 774, and 874, and is connected to conductor 880 which is connected to Hold magnet 890 and vertical cross-bar switch conductor 876 corresponding to conductor 855. Conductor 2211 has a dotted section indicating that other sequential connections for other overflow lines may intervene between the relays 2201 and 2212, in each case the sequence connection extending from the front contact associated with the inner lower armature of the relay corresponding to the relays 2201 and 2212 to the inner lower armature of the corresponding relay associated with the next overflow line in the sequence. From this it will be apparent that as each overflow line becomes busy it transfers the control circuit from the director to the next overflow line in the sequence and, disregarding the dotted section of conductor 2211, that the control would have been extended from the director over conductor 2275 to Hold magnet 890 had the first overflow line been busy.

The front contact associated with the outer lower armature of relay 2201 is connected by conductors 2270, 770, 870, 1270, 1570, 1670 and 2070 to the outer upper front contact of relay 2001, the armature of which is grounded, and the outer lower armature of relay 2201 is connected to the break contact associated with the lower front contact of relay 2207. The purpose of this connection will be described later in connection with the disconnection of the calling subscriber from the overflow line.

Upon the operation of Hold magnet 852 the junctor circuit of Fig. 9 operates to transmit ringing current to the overflow line in the same manner as that described under the circumstance that the called subscriber's line was idle and the desired connection was established to that line. From the standpoint of operation of the system the junctor circuit and the director circuit do not distinguish between establishment of the connection to a called subscriber and establishment of a connection to an overflow line, and the overflow line is rung in the same manner.

*Overflow line responds to ringing current*

Figure 23:
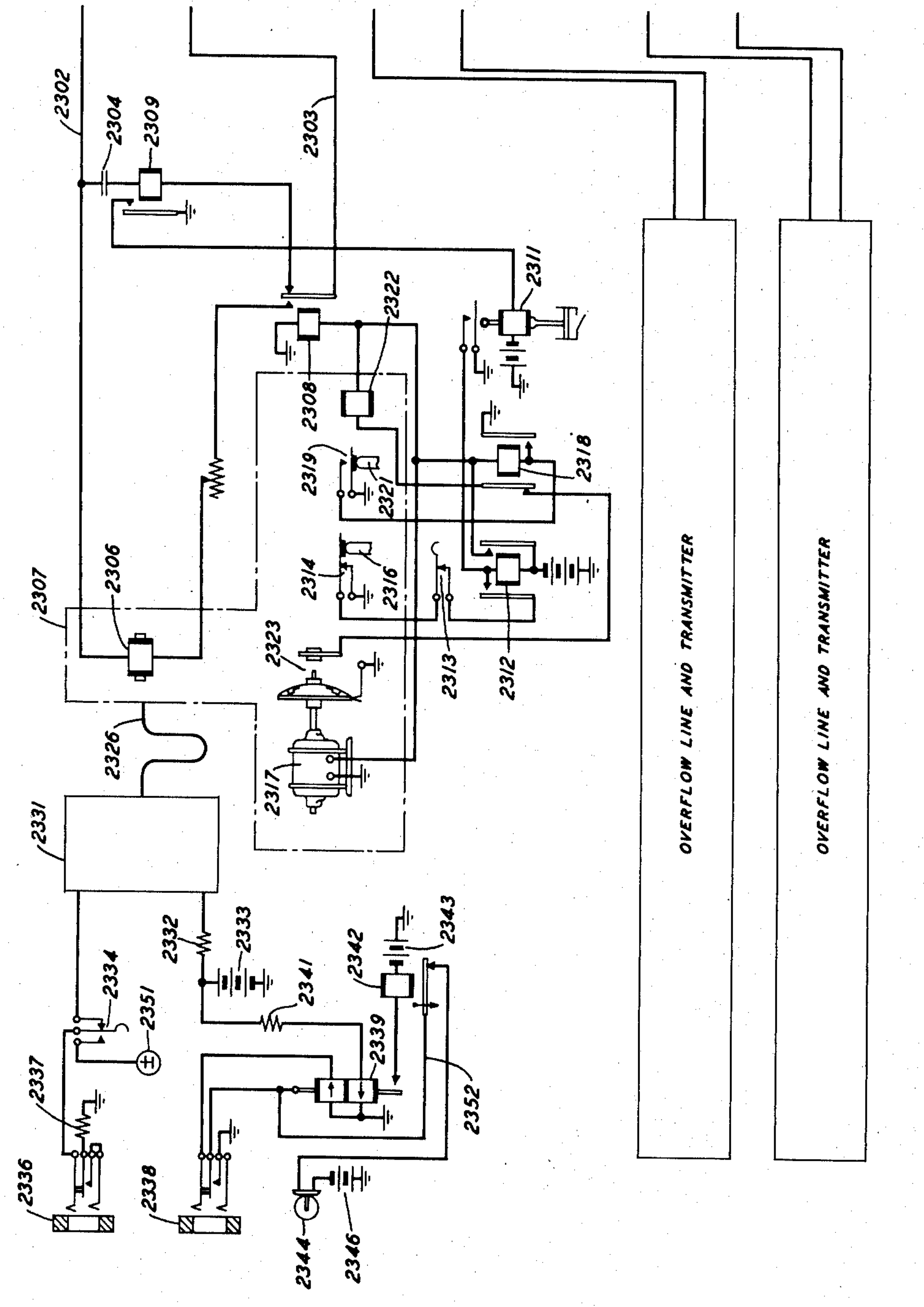
Fig. 23 shows overflow line terminations and transmitters for retransmitting messages received in storage.

Overflow line terminating circuits are shown in Fig. 23, one being shown in detail and the other two being merely indicated. Line conductors 2202 and 2203 extend into Fig. 23 as conductors 2302 and 2303, conductor 2302 being connected to one terminal of a condenser 2304 and to one terminal of the selector magnet 2306 of a printing reperforator represented by the dotted line rectangle 2307 within which certain elements of the printing reperforator have been shown schematically, among them the selector magnet 2306. Conductor 2303 terminates at the armature of a relay 2308. The terminating apparatus for line conductors 2302 and 2303 may be considered as a telegraph station somewhat comparable with a subscriber station, which receives messages routed through the automatic switching apparatus of the system and which is provided with a transmitter arranged to retransmit received messages, but not on a basis of routing of the retransmitted message through the automatic switching apparatus.

Printing reperforator 2307 may be of the type shown in Patent 2,255,794 granted September 16, 1941 to R. A. Lake. In accordance with the disclosure of that patent the reperforator is arranged to receive telegraph signals and record them in the form of perforations in a tape suitable for controlling a tape transmitter, and concurrently with the recording of each code combination to print on the tape the character represented by that code combination so that the tape contains in addition to the message in the form of perforated code combinations, the same message in legible form. The disclosure of the Lake patent is incorporated herein by reference as part of the present specification.

An alternating current relay 2309 is connected in series with condenser 2304 to the back contact of relay 2308. In the idle condition of the overflow line, relay 2308 is deenergized so that direct current cannot flow in the line conductors 2302 and 2303 but alternating current will flow through condenser 2304 and relay 2309. The ringing current is alternating in character, whether of sinusoidal or square wave form and it operates relay 2309 which, through its single armature and front contact, completes the circuit of relay 2311. Relay 2311 is a retarded relay requiring an interval of the order of two seconds to become operated and upon operating it completes the circuit of relay 2312 which operates. At its left-hand armature the relay 2312 establishes a locking circuit to ground through an emergency stop key 2313 and through normally closed contacts 2314. Contacts 2314 are operable by a selectable element 2316 of printing reperforator 2307 when the code combination is received to which that selectable element is responsive. At its right-hand armature and front contact the relay 2312 completes the energizing circuit for relay 2308, completes the circuit of driving motor 2317 for the printing reperforator, and prepares an operating circuit for relay 2318, which circuit is open at contacts 2319 operable by selectable element 2321 of the printing reperforator 2307. Relay 2312, through its right-hand armature also prepares an energizing circuit for answer back magnet 2322, which circuit opens at the centrifugally operated contacts 2323 of motor 2317.

With relay 2308 operated the alternating current relay 2309 is disconnected from line conductor 2303 and conductors 2302 and 2303 are connected in a closed loop which includes the selector magnet 2306 of printing reperforator 2307. During the transmission of the ringing current the vacuum tube 908 in Fig. 9 is timing out as previously described and upon operating it cuts off the ringing current, and with a loop established at the overflow station the relay 952 operates and as previously described causes the director circuit to be restored to normal condition and the junctor sequence circuit in Fig. 10 to be released for use in completing another call. The junctor circuit is conditioned for message transmission over the path established from calling subscriber to the overflow station.

Concurrently with the conditioning of the junctor circuit and the release of the other apparatus the motor 2317 is coming up to speed and upon the closure of centrifugally operated contacts 2323 the circuit of answer back magnet 2322 is completed. This magnet actuates a transmitting mechanism associated with the reperforator 2307 to transmit a code combination indicative of or identifying the overflow line. This code combination is transmitted to the calling subscriber station and informs the attendant at that station, by the recording of a character which the code combination represents, that the called subscriber station is busy but that the overflow line is prepared to receive a message for subsequent retransmission to the called subscriber.

The selectable element 2321 associated with contacts 2319 is responsive to the code combination which is transmitted under the control of answer back magnet 2322 and operates momentarily in response to this code combination to close the contacts 2319 for a short interval. Contacts 2319 complete the prepared circuit for relay 2318 which operates, interrupting, at its left-hand armature and back contact, the energizing circuit for answer back magnet 2322, which releases, and completing at its armature and right-hand contact a holding circuit to maintain relay 2318 operated.

The overflow station is now prepared to receive the message intended for the called subscriber, and awaits that message. If the calling subscriber desires to interchange information on a two-way basis with the called subscriber in the manner of a telephone conversation, it may not be satisfactory to him to be connected to an overflow line and merely transmit his message into that line for storage and subsequent retransmission. If this is the case he may transmit a disconnect signal which will, in a manner to be described hereinafter, restore his station equipment, his line circuit and line sequence circuit, the junctor circuit and junctor sequence circuit and the overflow line circuit and station to normal. If on the other hand the calling subscriber is satisfied to transmit his message for storage and subsequent retransmission he may proceed to do so. In this event he should precede the message by the calling code identifying the called subscriber station. It will be remembered that he has already transmitted this code but it has been absorbed in operating the director circuit and is not recorded anywhere at the switching center. In order that the attendant at the switching center may subsequently initiate the transmission of the message to the called subscriber station when that station becomes idle it is necessary for the called subscriber station identification to appear on the tape 2326 which reperforator 2307 perforates and prints. The required called subscriber station identification will appear on the tape if the calling subscriber transmits it after he has learned through the answer back signal that he is connected to an overflow line and preceding the transmission of his message.

The previous description of the release of the director circuit related to a call completed to a called subscriber and under this circumstance the operations that result from a busy indication did not occur. As previously described, the release of relay 1902 occurs as one of the steps in the release of the director circuit. Since the holding circuit for the relay 1940 is completed through an armature and front contact of relay 1902 the relay 1940 releases when relay 1902 releases. Relay 1940, upon releasing, re-establishes the connection from the apex of the fan circuit to the outer right-hand armature of relay 1769 in preparation for the busy test on the next call, and also prevents the operation of slow operate relay 1948.

*Operation when called subscriber's line and all overflow lines test busy*

The operation of the system will now be described upon the premise that the called subscriber line is busy and the last overflow line, which has no relays corresponding to the relays 2201 and 2207 is also busy. The conductor extending from the inner lower front contact of the sequence relay corresponding to relays 2201 and 2212, associated with the penultimate overflow line is connected directly to the break contacts associated with the ring contact spring of the jack 2216 associated with the last overflow line, and a conductive path is extended through the break contacts, conductor 2281, conductor groups 2282, 782, and 882, and conductor 881 to the Hold magnet 883 of the link circuit allocated to the last overflow line. If all of the overflow lines are busy, as assumed, the overflow line seizing conductor of the director, which is identified by the reference numeral 1975 and which enters Fig. 22 as conductor 2275 will be extended directly to the link circuit Hold magnet 883 for the last overflow line and the link circuit vertical conductor. Due to the fact that the last overflow line is also assumed to be busy, there will be a direct ground connection on the last-mentioned vertical conductor of the link circuit and this ground connection will prevent the release of relays 1797 and 1943 when relay 1940 makes the transfer from the testing of the called subscriber line circuit to the testing of the overflow lines for an idle one of those lines. Accordingly, relay 1759 will not operate and when relay 1795 operates a ground connection on its armature will be extended through the armature and front contact of relay 1797 and through conductors 1780 and 1980 to the outer front contact of relay 1948. The operating characteristics of relay 1948, which is operated through relay 1940 from ground on the inner right hand front contact of relay 1902, are such that it cannot operate within the interval of time required for an idle overflow line, if there is one, to be seized, a connection established thereto from the calling subscriber, and relays 1902 and 1940 released, but it does operate if no such connection is established. At its inner armature and front contact, relay 1948 completes a circuit from ground through the outer right-hand armature and contact of relay 1943 for an alarm device which has been indicated as a lamp designated by reference numeral 1951 but which might be a buzzer or gong to indicate to an attendant the unavailability of an overflow line to serve a calling subscriber. At its outer armature, the relay 1948 reestablishes a path from conductor 1980 through the noted armature and front contact of relay 1948 and through the front contact and inner left-hand armature of relay 1943 and conductor 1952 for operating relay 1909 to start the transmission of busy signals to the calling subscriber.

At its right-hand armature and front contact, relay 1909 completes a circuit from ground on the armature of biased polar relay 1956 through the marking contact, conductor 1957, back contact and inner left-hand armature of relay 1958, conductor 1959, right-hand armature and front contact of relay 1909 which interrupts the circuit through the break contacts in make-before-break manner, conductor 1931, front contact and armature of relay 1901, which was operated by vacuum tube 1904 as described in the section entitled "Director Ready Signal Is Transmitted," from which a path has previously been traced to the operating winding of repeater relay 912 in the junctor circuit of Fig. 9. Since the calling subscriber station is connected to the other side of the junctor repeater, relay 1956 is enabled to transmit signals to the calling subscriber station. At the inner left-hand armature of relay 1909, ground is connected to the operating winding of relay 1956 and to the armature of relay 1961 and also through resistor 1962 and the inner right-hand armature and back contact of relay 1958 to battery. The circuit of the operating winding of relay 1956 is completed through resistor 1965 and in parallel therewith through the back contact and left-hand armature of relay 1944 and resistor 1963 to battery. The circuit of the biasing winding of relay 1956 extends from ground through that winding, condenser 1966 and resistor 1967 to battery with a connection from the junction of condenser 1966 and resistor 1967 through the outer left-hand armature and back contact of relay 1958 to the right hand contact of relay 1961 for discharging the condenser to ground through the armature of relay 1961. The circuit of the operating winding of relay 1961 extends from battery through that winding, resistor 1968, conductor 1969, resistor 1972, now having the short-circuit comprising the outer left-hand armature and back contact of relay 1943 removed because this relay is energized, conductor 1982, back contact and outer right-hand armature of relay 1944 short-circuiting resistor 1983, outer right-hand armature and back contact of relay 1958 short-circuiting resistor 1984, resistors 1986 and 1962 to the armature of relay 1961, so that the circuit is completed to ground when relay 1909 is energized. The biasing circuit of relay 1961 extends from ground through condenser 1988 and resistor 1989 to battery, with a connection from the battery side of the relay winding to the left-hand contact of the relay so that the condenser will be discharged to ground when the armature of relay 1961 moves to its left-hand contact. As part of the potential divider network associated with the circuit of the operating winding of relay 1961, there is a connection from battery through the inner right-hand armature and back contact of relay 1958 to the junction of resistors 1962 and 1986, a connection from battery through the outer right-hand armature of relay 1958 to the outer right-hand armature of relay 1944, and a permanent connection from battery to the junction of resistors 1984 and 1896.

The relays 1956 and 1961 comprise an oscillatory system for transmitting signals to the calling subscriber and relay 1956 is the transmitting relay. With the grounded armature of relay 1956 on the marking contact, a marking signal is transmitted. With the armature of relay 1961 engaging its right-hand contact, as shown and prior to the connection of ground to its armature by relay 1909, condenser 1988 is charged. With the connection of ground to the left-hand terminal of resistor 1962, due to the operation of relay 109, a change of potential in the potential divider network occurs, causing the armature of relay 1961 to move to its left-hand contact. The same ground connection applied to the operating winding of relay 1956 operates the armature to the marking contact if it is not already engaging that contact.

With the armature of relay 1961 moved to its left-hand contact, the current through the operating winding is reversed, tending to return the armature to the right-hand contact. The return of the armature is delayed by the discharging of condenser 1988 to ground through the biasing winding, and the return of the armature is delayed for an interval of about 55 milliseconds. As soon as the armature reaches its right-hand contact, current through the operating winding is again reversed, and a charging circuit for condenser 1988 is established. Condenser 1988 delays the reoperation of the armature to the left-hand contact for an interval of about 55 milliseconds. In this way the armature of relay 1961 is moved back and forth between its contacts at intervals of approximately 55 milliseconds. When relay 1961 operates its armature to the right-hand contact the first time, it provides a circuit for discharging condenser 1966 associated with the biasing winding of relay 1956, the path being traced from the junction of condenser 1966 and resistor 1967 through the outer left-hand armature and back contact of relay 1958 and the armature and right-hand contact of relay 1961 to ground. The discharging current causes the armature of relay 1956 to move away from its marking contact for an interval of about 22 milliseconds. Accordingly, a spacing signal of this duration is transmitted to the calling subscriber station, after which a marking signal is transmitted when the armature of relay 1956 is restored to the marking contact by its operating winding. The receiving teletypewriter at the calling subscriber station interprets the spacing signal as the start impulse of a telegraph signal combination.

The armature of relay 1961 remains on its right-hand contact for 33 milliseconds after the end of the spacing signal transmitted by relay 1956 and operates to its left-hand contact where it remains for 55 milliseconds before returning to the right-hand contact and again causing relay 1956 to transmit another spacing signal of 22 milliseconds duration. The interval between the end of the first spacing signal and the beginning of the second totals 88 milliseconds, which is equal to 4 telegraph signal impulses at a commonly used transmitting speed of sixty words per minute. Thus the teletypewriter at the calling subscriber's station receives, following the signal interpreted as a start impulse, four successive marking impulses and a spacing impulse. Following the second spacing signal, the marking condition is maintained for another interval of 88 milliseconds which the receiving teletypewriter interprets as a prolonged stop or rest signal. Thereafter the sequence is repeated. The telegraph code combination comprising four successive marking impulses followed by a spacing impulse represents the letter "K" and accordingly this letter is printed repetitiously as a signal to the calling subscriber that the called subscriber station and all overflow lines are busy. The calling subscriber should then disconnect, in a manner which will be described hereinafter, and again place the call after an interval.

Another condition that may exist to prevent a calling subscriber from reaching a called subscribed is that the station or line of the latter may be out of order. When a line has been reported out of order, an attendant at the switching station connects ground through a resistance of the order of 1900 ohms to the conductor of the line termination circuit over which the busy and out-of-order tests are made by the director. Accordingly when the relays 1943 and 1797 are connected to the line termination circuit of the called subscriber to make this test, relay 1943, being marginal, does not operate. Thus the resistor 1972 remains short-circuited. This changes the timing of relay 1961 so that it pulses at about 11 cycles per second, its armature engaging the right and left-hand contacts alternately for intervals of about 44 milliseconds. The operation of relays 1956 and 1961 is the same as that previously described except that intervals of about 66 milliseconds intervene the end of each spacing signal and the beginning of the next spacing signal transmitted by the relay 1956. The receiving teletypewriter at the calling subscriber station thus receives spacing for about 22 milliseconds, which it interprets as a start signal, marking for about 66 milliseconds which it interprets as impulses 1, 2 and 3 of a code combination, spacing for about 22 milliseconds which it interprets as impulse 4 of a code combination and marking for about 66 milliseconds which it interprets as impulse 5 of a code combination of about 22 milliseconds duration followed by a stop impulse of about 44 milliseconds. Thereafter the receiving teletypewriter repeats this interpretation as relay 1961 continues to oscillate and to control relay 1956. This combination represents the letter "Q" and the teletypewriter records this letter repetitiously, which is the out-of-order signal to the calling subscriber and should cause him to disconnect. It is to be noted that because relay 1943 is not operated when the out-of-order condition is detected, relay 1940 is not brought into operation to route the call to an overflow line. It is considered preferable to notify the calling subscriber of the out-of-order condition of the called subscriber's line in this manner and to prevent the storing of the message in an overflow line, because the calling subscriber thus does not receive the false impression that the message will be retransmitted promptly to the called subscriber, which the calling subscriber might assume were the message permitted to go into storage in an overflow line without notification to the calling subscriber of the out-of-order condition of the called subscriber's line. Still another condition that may prevent the completion of a call is that the calling subscriber may transmit an unassigned or non-numerical code. When this occurs the circuit system does not complete, in cooperation with relay 1782, an energizing circuit for busy and out-of-order test relays 1943 and 1797 because there is no subscriber's line termination circuit corresponding to the unassigned number, from which busy test ground or out-of-order ground connection could be obtained. Similarly when relay 1759 operates, it seeks to connect relay 1720 in a previously traced circuit from ground on an armature of relay 2001 through to a Hold magnet battery in the link circuit. This path remains incomplete because there is no Hold magnet connection corresponding to the unassigned or non-numerical code. Accordingly, relay 1720 does not operate. Thereafter when relay 1705 releases, it completes a circuit, prepared by relay 1759, for energizing relay 1944 instead of the circuit for relay 1755.

At its left-hand armature, relay 1944 removes resistor 1963 from parallel connection to resistor 1965. This changes the timing of relay 1956 so that upon operation of the armature of this relay away from its marking contact, an interval of about 44 milliseconds, equal to two telegraph signal impulses, will elapse before the armature returns to its marking contact. At its inner right-hand armature and front contact, the relay 1944 completes the energizing circuit of relay 1909, which in turn initiates vibratory operation of relay 1961. At its outer right-hand armature the relay 1944 removes a short circuit from resistor 1983 thereby reducing the vibratory frequency of relay 1961 to about 6 cycles per second. At this frequency the armature of relay 1961 will engage its two contacts alternately for an interval of the order of 88 milliseconds, which is equal to four telegraph impulses at the speed of sixty words per minute. In one complete cycle of relay 1961, occupying an interval of about 176 milliseconds, relay 1956 will operate to spacing for about 44 milliseconds and return to marking where it will remain for the balance of the cycle of relay 1961, approximately 132 milliseconds. The teletypewriter at a calling station interprets this operation as a start impulse of spacing nature of about 22 milliseconds duration, a first code impulse of spacing nature of about 22 milliseconds duration, second, third, fourth and fifth code impulses of marking nature, each of 22 milliseconds duration totaling 88 milliseconds and a stop impulse of 44 milliseconds duration. This code combination represents the letter V and the teletypewriter will repetitiously print this letter. The calling subscriber is informed by the printing of the letter "V" that he has transmitted an unassigned or non-numerical code and he should disconnect, ascertain the correct number and again place the call, transmitting the correct code.

Additional relays 1949, 1970, 1976 and 1980, cooperate through relay 1500 with the alarm circuit in the performance of certain timing and alarm functions in connection with the production of busy, out-of-order and unassigned code signals. For a description of these functions reference may be had to Patent 2,489,916 granted November 29, 1949 to C. W. Lucek, and the description is omitted from the present specification.

Referring now to Fig. 1, and with reference to the transmission to the calling subscriber station of signals representing the letter "K" indicative of the busy condition of the called subscriber station and all overflow lines, it will be noted that the calling subscriber station is provided with contacts 151 which are closable momentarily by the selectable element 152 that is selectable in response to the code combination representing the letter "K." Thus, in addition to printing this letter the teletypewriter will also close contacts 151 momentarily for each busy code combination received. Contacts 151 close a circuit from battery 119 through the upper armature and front contact of relay 118, conductor 133, contacts 151, conductor 153, back contact and upper armature of relay 154, conductor 156 and winding of relay 157 to ground. Relay 157 operates and locks through its upper armature and front contact independently of contacts 151. At its lower armature the relay 157 completes the circuit of lamp 158 which lights to provide a visual indication of reception of the busy signal. In order that relay 157 shall not be operated in response to the signal for the letter "K" received as part of a message, and thereby avoid operation of lamp 158 under those circumstances, contacts 159 operable by the selectable element 161 responsive to the carriage return signal are provided. Upon the momentary closure of contacts 159 battery 119 is connected over conductor 133, the contacts 159 and conductor 162 and the winding of relay 154 to ground thereby causing the operation of this relay. At its lower armature and front contact relay 154 locks to battery 119 independently of contacts 159 and at its upper armature and back contact the circuit of relay 157 is interrupted so that that relay cannot be operated in response to "K" signals.

*Calling subscriber disconnects*

Upon the reception of "K" denoting that the called subscriber's line and all over-flow lines are busy, or upon the reception of "Q" denoting that the called subscriber's line is out of order or upon the reception of "V" denoting unassigned or non-numerical code transmitted as a station call, or at the conclusion of message transmission the calling subscriber, assumed to have been the station in Fig. 1, disconnects by transmitting the upper case or figure shift code combination followed by the code combination for the letter H. This sequence of codes represents the message end or disconnect signal, and results in the selection of selectable element 124 of the teletypewriter, which momentarily opens contacts 123. These contacts interrupt the holding circuit for relay 118 thereby releasing that relay. Relay 118 disconnects battery 119 from conductor 133, thereby releasing relay 157, if that relay has been operated, releasing relay 154 if that relay has been operated, and releasing relay 137. Battery 119 is also disconnected from conductor 126 thereby opening the circuit of motor 127 and releasing relay 104. With relay 104 released the direct current loop at the subscriber station is interrupted and the alternating current loop through condenser 107 and relay 108 is reestablished, thus rendering the station again responsive to ringing current. With the direct current loop interrupted relay 103 releases and thus the station is restored to the initial condition.

At the called subscriber station, assumed to have been the station in Fig. 2, the reception of the stop or disconnect code combinations, comprising the upper case code and the letter "H" code, results in the operation of selectable element 233 to open the contacts 232 momentarily. Contacts 232 interrupt the holding circuit for relay 224 which releases, thereby opening the circuit of motors 241 and 200 and relay 208. The locking circuit of relay 251 also extends through contacts 232 so that relay 251 is released along with relay 224 when contacts 232 are opened momentarily. Relay 208 in releasing interrupts the direct current loop through the station shown in Fig. 2 and reestablishes the alternating current loop through relay 212 and condenser 211 to render the station responsive only to ringing current. In this way the called subscriber station is restored to normal.

With the calling and called subscriber stations restored to normal and the direct current loops at both stations interrupted, current through the operating windings of repeater relays 912 and 913 in Fig. 9 and through the relays 915 and 952 to ground is interrupted and the relays 915 and 952 release. These two relays in turn release relay 903. Relay 903 releases relays 920 and 930 and also the Hold magnets 801 and 862 which were held energized in series with the relays 920 and 930, respectively. Relay 920 releases relay 1034 in the junctor sequence circuit thus restoring the junctor sequence circuit to normal. The release of Hold magnet 801 in the link circuit causes conductors 812 and 813 to be reconnected and conductors 819 and 821 to be reconnected whereby the line conductors 501 and 502 of the calling subscriber are reconnected to their proper terminating points in the line termination circuit of Fig. 5, the conductor 501 being connected through the operating windings of relays 514 and 517 to ground, the conductor 502 being reconnected to battery 524. Similarly the release of Hold magnet 862 results in the reestablishment of the proper idle line termination for the line conductors 503 and 504 of the subscriber station shown in Fig. 2. In this way the apparatus at the switching station has been restored to normal condition awaiting further calls.

In the case of a disconnect involving an overflow line, the selectable element 2316 responds to the disconnect signal transmitted by the subscriber and momentarily opens contacts 2314 interrupting the holding circuit for relay 2312, which releases. Relay 2312 shuts down motor 2317 and releases relays 2318 and 2308, the former preparing the circuit of answer-back magnet 2322 and the latter opening the line conductor loop and reconnecting condenser 2304 and relay 2309 across the line conductors 2302 and 2303. With the line conductors open circuited at the condenser, relay 952 releases, in turn releasing relay 903 which releases relay 930, the latter relay releasing Hold magnet 852. The hold magnet disconnects ground from the path including conductors 850 and 2250, thereby releasing relay 2207. Relay 2207 interrupts the holding circuit for relay 2201, which releases, providing there is no ground connection on a path previously traced from the outer upper front contact of relay 2001, beginning with conductor 2070 and ending with conductor 2270, from which an extension of the path is traced through the front contact and outer lower armature of relay 2201 to the break contact of relay 2207. If relay 2001 is in the operated condition at the time of release of relay 2207, the holding circuit of relay 2201 will be extended, by reclosure of the break contacts of relay 2207, to ground on the outer upper armature of relay 2001 before the holding ground connection supplied through the upper armature of relay 2201 is interrupted at the lower armature of relay 2207.

By way of explanation of the transfer of the holding circuit for relay 2201, it should be remembered that relay 2201 is operated whenever one of the Select magnets is in the energized condition in preparation for the operation of a Hold magnet. It may happen that a Select magnet is energized as a step toward establishing a connection to one of the overflow lines. An overflow line is seized over a series of conductors including conductor 2275, which is connected to a path through break contacts of jack 2204 when relay 2201 is released, and which is connected instead to a path through conductor 2211 and break contacts of jack 2214 when relay 2201 is operated. In order to prevent interference with the seizure of an overflow line, relay 2201 is prevented from releasing until relay 2001 releases, which occurs upon the release of any Select magnet that was operated, such release resulting from operation of a Hold magnet or abandonment of the call by a calling subscriber.

*Answer-back by a station responding to a call on an unattended basis*

A station circuit of the type shown in Fig. 1 is provided with an answer-back feature the function of which is to transmit signals identifying the station when it responds to a call on an unattended basis. Assuming that another station associated with the switching center placed a call to be routed to the station shown in Fig. 1 and that the director has connected the calling station to the station shown in Fig. 1 and is transmitting ringing current, the relay 108 will operate in response to the alternating ringing current and complete the circuit of slow-operating relay 128. Relay 128 operates about two seconds after the operation of relay 108 and completes the circuit of relay 118 through the outer lower armature and back contact of relay 104 and conductor 131. Relay 118 operates relay 104 to complete the direct current loop termination for the lines 101 and 102 and starts motor 127. Because of the fact that the operation of key 116 was not involved in the energization of relay 118 relay 137 does not operate as a result of the operation of relay 118. Accordingly when motor 127 comes up to speed and closes its centrifugal contacts 139 the circuit of an answer-back magnet 141 is completed from ground through the upper armature and back contact of relay 137, the winding of magnet 141 and conductors 134, 133 and front contact and upper armature of relay 118 to battery 119. The identifying code of the called station is transmitted in the same manner as that of the overflow line as previously described, and upon being received by the calling station the code serves to inform the calling subscriber that the connection has been completed to the desired station, and that the station is prepared to receive a message.

*Transmission of message from overflow line*

The message transmitted over the overflow line comprising conductors 2302 and 2303 to reperforator 2307 is perforated in tape 2326. Reperforator 2307 has associated therewith a tape transmitter 2331 which may be similar to the tape transmitter 219 in Fig. 2. One terminal of the tape transmitter 2331 is connected through resistor 2332 to battery 2333 and the other terminal is connected through break contacts of key 2334 to the tip contact spring of jack 2336. The ring contact spring of jack 2336 is connectable through make contacts of the jack and resistor 2337 to ground when a plug is inserted into jack 2336. A companion jack 2338 has its tip contact spring connected through the upper winding of relay 2339 to ground, and ground is connectable through make contacts of jack 2338 to the armature of relay 2339 when a plug is inserted into the jack. The lower or biasing winding of relay 2339 has one terminal connected to ground and the other terminal connected through a resistor 2341 to battery 2333. The make contact of relay 2339 is connected through the winding of a slow release relay 2342 to battery 2343. The back contact of relay 2342 is connected through disconnect lamp 2344 to battery 2343 and the armature of the relay is connected to the armature of the relay 2339.

The line termination circuit for each subscriber's line is provided with a lamp for indicating when the subscriber's line and the subscriber station associated therewith are busy. In the case of the line termination circuit shown in detail in Fig. 5, the busy lamp is designated by the reference numeral 556 and has one terminal connected to battery 557 and the other terminal connected to conductor 558 which extends into Fig. 7 as conductor 758 and connects to conductor 709 extending into Fig. 8 as conductor 809 and grouped with conductors 836, 873 and 848 which serve the subscriber's line termination circuit shown in detail in Fig. 5. Conductors 709 and 809 have connected thereto one cross bar switch contact for each of the sets of contacts such as those designated 894 and 860 arranged vertically above Hold magnet 801 serving the subscriber line termination shown in the upper part of Fig. 5. Associated with each group of horizontal cross bar switch conductors is a grounded conductor such as the conductors 877 and 878. When Hold magnet 801 operates any set of contacts under its control and prepared by one of the Select magnets, ground is connected over the conductors 758 and 558 to light lamp 556 and indicate visually that the subscriber's line termination circuit is busy.

An attendant at the switching station, seeing the tape 2326 accumulating between reperforator 2307 and transmitter 2331 ascertains the identity of the called subscriber station from the tape 2326 and waits for the busy lamp associated with the line circuit of the called subscriber station to be extinguished. It will be assumed that the message is intended for the subscriber station in Fig. 1, which has the line termination circuit shown in detail in the upper portion of Fig. 5, and that the station becomes idle, which will be indicated by extinguishment of lamp 556. The attendant then connects a patching cord from jack 2336 to jack 518 and another patching cord from jack 2338 to jack 511. Having done this, the attendant operates key 2334 to the left to connect a source of ringing current 2351 through the tip contact spring of jack 2336, the patching cord, the tip contact spring of jack 518, line conductors 502, 402, and 102, alternating-current relay 108 and returning through line conductors 101, 201, 401, 501, tip contact spring of jack 511, patching cord, tip contact spring of jack 2338 and winding of relay 2339 to ground. It should be noted that upon connection of the patching cord between jack 2336 and jack 518, a connection was established from ground through resistor 2337, the make contacts and ring contact spring of jack 2336, the patching cord, and the ring contact spring of jack 518 to conductor 551. Conductor 551 is included in a previously traced path including conductors 751, 851, 951 and 1551 and terminating at the front contact associated with the outer right-hand armature of relay 1501. The ground connection supplied through resistor 2337, which has a low value, is a busy-indicating ground and will cause the registration of a busy signal if the director attempts to seize the line extending to the subscriber station in Fig. 1 while the patching cord is up. The manner in which the busy test is made by the director was hereinbefore described with respect to the busy test path comprising conductors 564, 764, 864, 964, 1564 and 1664. It should also be noted that with the insertion of a patching plug into jack 2338 ground was connected through the make contacts, conductor 2352, the armature and back contact of relay 2342 and lamp 2344 to battery 2346, thereby lighting the lamp 2344.

Relay 108 in Fig. 1 responds to the ringing current and sets the station in operation to receive the message, in the manner hereinbefore described. This includes the interconnection of the line conductors at the station in Fig. 1 to establish a closed loop and the transmission from the called subscriber station of an answer back signal to indicate, as previously described, the identity of the station to which connection has been made, and that the station is in condition to receive.

Prior to the establishment of the closed loop at the called subscriber station, a circuit from battery 2333 through resistor 2341 and the lower winding of relay 2339 to ground holds the armature of the relay away from its make contacts. Upon the establishment of the closed loop at the called subscriber station a circuit is established from battery 2333 through resistor 2332, through transmitter 2331 which is at rest, right-hand contact and swinger of key 2334, tip contact spring of jack 2336, patching cord, line conductors outgoing to and returning from the called subscriber station in Fig. 1, patching cord, tip contact spring of jack 2338 and upper winding of relay 2339 to ground. The upper winding of relay 2339 dominates the armature and operates it to its make contacts, thereby completing the circuit of relay 2342 from ground through the make contacts of jack 2338 and the armature of relay 2339 to battery 2343. Relay 2342 operates and opens the circuit of lamp 2344 which becomes extinguished. This indicates to the attendant that the line circuit loop at the called station has been closed, and after waiting a few seconds for the motor at the called station to come up to speed and for the answer-back signal to be transmitted, the only indication of which will be the chattering of relay 2339, the attendant starts transmitter 2331 by closing a manually operable switch to complete the circuit of its start magnet (not shown).

The transmission of the message contained in tape 2326 then proceeds automatically. Transmitter 2331 may be provided with the well-known taut-tape mechanism for suspending operation of the transmitter if tape 2326 becomes taut. At the end of the message the disconnect code combinations, namely the upper case code and letter "H" code combination, which were transmitted by the calling subscriber and perforated in tape 2326 are transmitted to the called subscriber station. This station responds to the disconnect code in the manner previously described to shut down the station, open the closed line conductor loop thereat and reconnect in the line circuit condenser 211 and alternating-current relay 212. Thus the circuit of the upper winding of relay 2339 is interrupted and the lower winding of the relay operates the armature to the left to open the circuit of relay 2342. Relay 2342 is of the slow release type, since its circuit is controlled by relay 2339 which is included in the transmission circuit and will therefore follow signals, and it is desirable that relay 2342 shall not follow signals. Relay 2342 is sufficiently slow that it will not release on response of relay 2339 to any continuous spacing condition normally occurring in code signal transmission but will release in response to a continuous spacing condition exceeding a predetermined interval such as, for example, the interval of two or three code combinations. This relay releases after its delay interval and reestablishes the circuit of lamp 2344 which lights and remains lighted. This is a signal to the attendant that the transmission of the message to the called subscriber station has been completed, whereupon the attendant removes the patching cords from jacks 2336 and 2338, thereby disconnecting transmitter 2331 from the line extending to the called subscriber station, and extinguishing lamp 2344.

*Signaling called subscriber that line junctors are busy*

As previously stated the relay 1034 operates as a part of the seizure of a line junctor by a calling subscriber, and remains operated until the subscriber disconnects. Through its armature 4 and front contact it extends a ground connection to the front contact associated with the armature 4 of relay 1049. Also with relays 1021, 1019 and 1024 operated and relay 1034 also operated a path is traced from ground through the front contact and inner right-hand armature of relay 1021, right-hand armature and front contact of relay 1019, front contact and inner left-hand armature of relay 1024, conductor 1033, armature 2 and front contact of relay 1034 to the armature 2 of relay 1049. If the line junctor 934 should be seized, relay 1049 will be operated and locked, and these ground connections will be transferred to the lower front contact and the armature 2 of the next relay corresponding to relays 1034 and 1049 and if all the line junctors are in use all such relays will be operated and these ground connections will be extended to conductors 1080 and 1081. These ground connections are extended over conductors 980 and 981, respectively, 1580 and 1581, 1680 and 1681 to conductors 1480 and 1481, respectively, the former being connected to the operating winding of relay 1401 and the latter being connected to the operating winding of relay 1402. Relay 1402 operates and at its lower armature it connects interrupter 1403, which supplies ground connection at the rate of one impulse per second, to a register 1404 which registers the number of seconds that all of the line junctor circuits are busy. The relay 1402 also connects ground to the winding of relay 1406, causing the operation of that relay. The circuits controlled by relay 1406 and the operations performed thereby are similar to circuits and operations described in Patent 2,340,599 under the heading "All-Trunks-Busy-Circuit" and the detailed description will not be repeated in the present specification. The function of the circuit is to generate and transmit "letters" signals as an indication that all of the line junctors are busy and these will be transmitted when and as long as any calling subscriber establishes a closed line circuit loop at his station. Whenever a line junctor becomes idle the circuit is arranged to suspend the transmission of "letters" signals and to transmit instead to the waiting subscriber a signal indicating that at least one junctor circuit has become idle.

In Patent 2,340,599 the signal which replaces the all-trunks-busy signal and indicates the availability of a trunk is disclosed as being the signal for the letter "K," and as a junctor-available signal to follow the all-junctors-busy signal in the present disclosure the signal for the letter "K" or for some other letter may be used. It will be remembered that when, as hereinbefore described, a called subscriber's line is busy and all overflow lines are busy, the director circuit generates "K" signals and transmits them to the calling subscriber. The junctor-available signal and the all-overflow-lines-busy signal are readily distinguishable by the calling subscriber, although the same signal may be used. When a subscriber places a call, and all junctors are busy, the first and only response of the switching office, as far as the subscriber is aware, is the all-junctors-busy signal (letters) which will change to the junctor-available signal ("K") when a junctor becomes available. On the other hand, a calling subscriber receives "K" signals denoting that all overflow lines are busy only after the seizure of a line junctor and director, the transmission to him of a director-ready signal and the transmission by him of the calling codes for the called subscriber's station.

The ground connection on conductor 1480 causes relay 1401 to operate. This ground connection is extended through the lower armature and front contact of relay 1401 and through the windings of relay 1411 and register magnet 1412. Relay 1411 in operating supplements this ground connection by the ground through its own armature and front contact, thus assuring the operation of register magnet 1412. The register magnet 1412 locks to the ground supplied through the lower armature of relay 1401 and short-circuits relay 1411 which releases. Register magnet 1412 will remain operated until relay 1401 is released by removal of the ground connection from conductor 1480, thus assuring that the register will operate but once for each grounding of that conductor. In this manner the number of attempts to seize a line junctor during an interval in which they are all busy will be counted. This arrangement is more fully described in Patent 2,340,599 under the heading "Counting Subscribers' Calls During an All-Trunks-busy Period".

At its upper armature the relay 1401 connects ground over a path traced during the description of operation of the subscriber sequence circuit, comprising conductors 1437, 1237, 837, 637, the outer upper armature and front contact of relay 612, conductor 638, armature 1 and front contact of relay 604, conductors 652 and 552, and winding of relay 516 to battery 509. Relay 516 operates. At its inner lower armature and front contact the relay 516 short-circuits the upper winding of relay 517 which disengages its armature from its left-hand contact thereby disconnecting ground from the energizing circuit of relay 528, traced through the armature and front contact of relay 514, but as its outer lower armature and front contact the relay 516 supplies a ground connection to hold relay 528 operated. At its inner upper armature and front contact the relay 516 completes the energizing circuit of relay 522, which operates, and both relays lock to ground supplied through the inner upper armature and front contact of relay 528. At its outer upper armature and front contact the relay 516 completes a circuit from battery through the lower winding of relay 514, the noted armature and front contact of relay 516, the middle upper armature and back contact of relay 533 to conductor 562 from which a connection is indicated to conductor 1462. The lower winding of relay 514 is energized over this circuit to hold the relay operated independently of the upper winding.

The relay 522, at its lower armature substitutes, for the line terminating battery 524, a line terminating circuit comprising conductor 563, 561 and 1461 to the armature of relay 1416 which is operable to produce letters signals as previously described. These signals, when produced, will be transmitted over conductors 1461, 561, inner lower armature and back contact of relay 533, conductor 563, the lower armature and front contact of relay 522, conductors 521, 821, break contacts of hold magnet 801 in Fig. 8, which is unoperated because there is no idle junctor to which the subscriber can be connected, conductors 819, 519 and out to the subscriber station over conductor 501, the return path being over conductor 502, conductors 512 and 812, break contacts of hold magnet 801, conductors 813 and 513, upper winding of relay 514 and front contact and inner lower armature of relay 516 to ground. It should be noted that when relay 522 was operated by relay 516 it interrupted, at its upper armature and back contact, the energizing circuit for relay 601, which restores the sequence circuit to normal, so that it may respond to a call by another subscriber. The all-junctors-busy signal will be transmitted to any calling subscriber who seeks to obtain the services of a junctor, but the switching center also has trunks extending to a manual switching office, as will be described hereinafter, and the release of the sequence circuit permits the same or other subscribers to seek access to a trunk circuit. If the calling subscriber, upon receiving the all-junctors-busy signal, disconnects, he will open the closed loop interconnecting the line conductors at his station, thereby interrupting the circuit through the upper winding of relay 514. In the operation of the all-junctors-busy circuit shown in Fig. 14 there are intervals during which a direct ground connection is applied over conductors 1462 and 562 to energize the lower winding of relay 514 and other intervals during which ground connection is applied to this circuit through a high resistance path which passes insufficient current to hold relay 514 operated. When the direct ground connection is removed relay 514 releases and interrupts the energizing circuit of relay 528, which releases, in turn releasing relays 522 and 516 which it has been holding operated, thereby restoring the circuit shown in Fig. 5 to normal. From this it follows that when a calling subscriber encounters an all-junctors-busy condition, his line circuit becomes locked up in a condition in which he has lost access to the sequence circuit. The subsequent transmission to that subscriber of the signal indicating that a junctor has become available does not change the locked up condition nor automatically give the subscriber access to the available junctor circuit. He must disconnect by restoring his own station circuit and his line terminating circuit (Fig. 5) to normal, such as by operating switch 122 in Fig. 1, or switch 231 in Fig. 2, or switch 322 in Fig. 3, or by sending, by means of his keyboard transmitter, the end-of-message code combinations which will cause the operation of selectable member 124 in Fig. 1, or member 233 in Fig. 2, or member 350 in Fig. 3.

As previously described the station shown in Fig. 2 is equipped with a tape transmitter 219 in addition to the keyboard transmitter 216. The station is so arranged that a perforated tape containing one or more messages directed to different stations may be placed in the transmitter, whereupon the station may be set in operation by the momentary closure of key 222 and with the calling codes for the station to which the messages are to be transmitted preceding the messages in the tape, the hereinbefore described switching mechanism at the switching center will be operated in response to these calling codes to connect the station shown in Fig. 2 to the several called stations without manual transmission of the calling codes and without further attention to the tape transmitter. As previously stated the operation of key 222 results in the operation and locking of relays 224 and 236, the energization of relay 208 and the starting of motors 241 and 200. Switch 276 should be closed because signals are to be transmitted by tape transmitter 219. With relay 208 operated the line is terminated in a direct current loop through relay 207 which operates on line current from the subscriber's line termination circuit 507 in the manner previously described with respect to the station shown in Fig. 1 and the line termination circuit shown in detail in Fig. 5. The apparatus at the switching station operates in the manner previously described to connect the line conductors from the station shown in Fig. 2 to a line junctor such as that shown in Fig. 9 through the link circuit shown in Fig. 8, and starts the director. The director returns a spacing signal of three seconds duration as a director ready signal which causes the release of relay 207. This relay upon releasing completes a circuit from battery 228 through conductor 299 the winding of dashpot-controlled slow-operate relay 267, conductor 298, the inner lower armature and front contact of relay 208, the armature and back contact of relay 207, conductor 268, the upper armature and front contact of relay 224, conductor 229, closed contacts 231 and 232, conductor 234 and outer upper armature and front contact of relay 236 to ground. Relay 267 operates after about two seconds of the spacing signal received from the director and completes a circuit from ground through its make contact, the outer lower armature and front contact of relay 208, conductor 263, the outer lower armature and front contact of relay 236, conductor 262, and winding of relay 261 to conductor 239 which is receiving connection from battery 228 through the lower armature and front contact of relay 224. Relay 261 operates over this circuit and locks through its lower armature and front contact and the back contact and lower armature of relay 271, conductor 272 and the inner lower armature and back contact of relay 237 to ground. At its upper armature the relay 261 completes a circuit from ground over conductor 273, the front contact and armature of relay 261, switch 276, conductor 277, clutch magnet 278 of tape transmitter 219, conductor 279, and conductor 281 to battery 282. Clutch magnet 78 becomes energized over this circuit and starts tape transmitter distributor 219. The releasing time of slow-release relay 207 plus the operating time of relay 267 should be such that relay 267 closes its make contacts just before the end of the director ready signal so that the director will have completed the transmission of the director ready signal and restored the communication circuit to marking condition before tape transmitter 219 is started.

The first code combination perforated in the tape should be the upper case or figures combination since, as previously described, the director must receive this code combination before the station identification codes in order to place it in condition to select the called subscriber's line termination circuit. The teletypewriter 214 at the station shown in Fig. 2 has a selectable member 296 selectable in response to the upper case or figures code combination for momentarily closing contacts 294. Upon the closure of these contacts in response to the transmission of this code combination a circuit is completed from battery through the winding of relay 250, conductor 255, contacts 294, conductor 260, back contact and lower armature of relay 292, conductor 274, front contact and upper armature of relay 261 and conductor 273 to ground and relay 250 operates. At its upper armature and front contact the relay 250 locks to the same ground through the back contact and lower armature of relay 292. At its lower armature the relay 250 prepares an energizing circuit for relay 287.

Tape transmitter-distributor 219 is provided with contacts 289 closable momentarily once in each revolution of shaft 244 by cam 291 carried by the shaft. One of the contacts 289 is connected by conductor 288 to the lower front contact of relay 250 and the other is connected by conductor 265 to the inner lower armature of relay 284. Since relay 250 did not become energized until after the transmission of the figures or upper case code combination the momentary closure of contacts 289 during the transmission of that code combination completed no circuits because the circuit was open at the lower armature of relay 250. Transmitter-distributor 219 next transmits the code combination representing the first digit of the number identifying the called subscriber's station and during the transmission of this code combination contacts 289 close momentarily completing a circuit from battery through the winding of relay 287, back contact and upper armature of relay 284, lower armature and front contact of relay 250, conductor 288, contacts 289, conductor 265, inner lower armature and back contact of relay 284, conductors 286 and 274, upper armature and front contact of relay 261, conductor 273 to ground and relay 287 operates over this circuit. At its lower armature and front contact relay 287 extends a path from the ground terminal of its winding through the winding of relay 284 to conductor 286 from which relay 287 is receiving a direct ground connection through contacts 289. As soon as these contacts open, the direct ground connection to the ground terminal of the winding of relay 287 is interrupted but relay 287 remains held through its lower armature and front contact and the winding of relay 284 to conductor 286, relay 284 becoming energized in this circuit.

At its inner lower armature relay 284 disconnects conductor 265 from conductor 286 which is receiving ground through the upper armature and front contact of relay 261 and connects conductor 265 instead to battery. At its outer lower armature relay 284 connects the back contact associated with the upper armature of relay 287, which is now disengaged from its back contact, through conductor 283 and the winding of relay 271 to the upper armature of relay 261 which is receiving ground connection through its front contact and conductor 273. Thus the relay 284 prepares an energizing circuit for relay 271 but this circuit is interrupted at the upper armature and back contact of relay 287. At its inner lower armature and front contact and at its upper armature and front contact the relay 284 prepares for itself an alternate holding circuit which is closable through the contacts 289 and is in short-circuiting relation to the winding of relay 287.

Upon the closure of contacts 289 momentarily during the transmission of the code combination representing the second digit of the calling code of the called station the alternate holding circuit for relay 284 is completed from battery through the front contact and inner lower armature of relay 284, conductor 265, contacts 289, conductor 288, front contact and lower armature of relay 250, upper armature, front contact and winding of relay 284, conductors 286 and 274, upper armature and front contact of relay 261 and conductor 273 to ground. From the front contact associated with the upper armature of relay 284 the battery connection is also supplied through the front contact and lower armature of relay 287 to the lower or ground terminal of the winding of relay 287 and this connection opposes the battery connected to the upper terminal of the winding of relay 287 and stops the flow of current through this winding so that relay 287 releases. With relay 287 released the prepared circuit for relay 271 is completed and this relay operates. Relay 271, through its upper armature and front contact completes the energizing circuit of relay 292 which locks through its upper armature and front contact and the middle upper armature and back contact of relay 237. At its lower armature and back contact relay 292 interrupts the holding circuit for relay 250 which releases and also interrupts the energizing circuit for relay 250 so that this circuit cannot be re-established by the operation of contacts 294 in response to the upper case or figures code combination transmitted as part of a message. At its lower armature and back contact the relay 271 interrupts the holding circuit for relay 261, and the latter relay releases, disconnecting ground from conductors 274 and 277, thereby interrupting the circuit of magnet 278 of tape transmitter-distributor 219 so that the transmitter will stop after the transmission of the second digit of the calling code, and also releasing relay 284 which in turn releases relay 271. The relay 267 released following the reenergization of relay 207 at the end of the three-second spacing signal representing the director ready condition so that at the conclusion of transmission of the station calling codes only the relays 208, 224, 236 and 292 remain energized.

Only a station equipped with the equivalent of relay 206 and its timing circuit comprising electron tube 220 and relay 240 is capable of responding on an unattended start basis to a call from a tape transmitting station. The reason for this is that the tape transmitter at the calling station, having been stopped at the end of transmission of the calling code of the called station, is to be restarted for transmission of the message under the control of a spacing signal of three-seconds duration transmitted from the called station as an indication that this station has been started and is ready to receive the message. In the preceding description of the establishment of a call from the station shown in Fig. 1 to the station shown in Fig. 2 the manner in which the station shown in Fig. 2 returns a three-second spacing signal as an indication of the proper starting of the station in response to its calling code has been described. It will be assumed that the station called from the tape transmitter 219 is so equipped and returns a three-second spacing signal to the station shown in Fig. 2. In response to the spacing signal of three-seconds duration relay 207 releases and completes the operating circuit for relay 267 in the same manner that it released in response to the director ready signal which was also a spacing signal of three-seconds duration. Relay 267 again completes the circuit of relay 261 which locks through the back contact and lower armature of relay 271 because this relay has been released and the back contact and inner lower armature of relay 237 to ground. Relay 261 again completes the circuit of the clutch magnet 278 from ground through conductor 273, the front contact and upper armature of relay 261, switch 276, conductor 277, the winding of clutch magnet 278, conductor 279, and conductor 281 to battery 282. Tape transmitter 219 starts and proceeds to transmit the message contained in the perforated tape. Relay 207 has become reenergized at the end of the three-second spacing signal and releases relay 267. The relays which remain energized during the transmission of the message are relays 224, 236, 208, 207, 261 and 292. Relay 207, being slow release, does not release during the spacing signals normally encountered in message transmission. With relay 292 locked the energizing circuit of relay 250 is interrupted and this relay does not respond to operation of contacts 294 responsive to the figures or shift code combination transmitted as part of the message. Therefore the circuit controlled by cam operated contacts 289 associated with the transmitter remain open at the lower front contact of relay 250 and these cam controlled contacts do not complete a circuit during the transmission of the message.

If it should happen that the called subscriber's line is busy when the director seeks to complete the call initiated by transmitter 219 the call will be routed to an overflow line in the manner previously described. Since the overflow lines are provided with means previously described for returning to the calling station the three-second spacing signal indicative of the readiness of the line to receive the message, tape transmitter 219 will be restarted in response to reception of this signal and will proceed to transmit the message just as it would if the called line had not been busy and the called station had responded.

When the perforated tape contains message directed to various stations each message should be terminated by the figures or upper case combination followed by the code combination for the letter "J" with the exception of the final message in the tape which should be terminated by the previously described disconnect combination comprising the figures or shift signal and the signal for the letter "H." Assume that the tape contains more than one message and that at the end of the first message the shift code combination is transmitted followed by the code combination for the letter "J." In response to the shift signal teletypewriter 214 conditions selectable member 270 to be operated and in response to the "J" code combination the selectable member 270 is selected and operated and momentarily closes contacts 275. Contacts 275 complete a circuit from battery 228 through conductor 227, the lower armature and front contact of relay 224, conductors 238, 239, 245 and 246, contacts 275, conductor 280 and winding of relay 237 to ground and relay 237 operates. At its outer upper armature and back contact the relay 237 interrupts the energizing circuit of relay 208 which releases and interrupts the direct current loop through the station, thereby transmitting a disconnect signal of spacing nature into the switching center. At its upper middle armature the relay 237 interrupts the holding circuit for relay 292 which releases. At its inner upper armature relay 237 locks in a circuit including the lower armature and back contact of relay 240. At its inner lower armature the relay 237 interrupts the holding circuit for relay 261 which releases, thereby opening the circuit of clutch magnet 278 for tape transmitter 219 which stops. The disengagement of the middle lower armature of relay 237 from its back contact produces no useful result at this time because the conductive path extending from that back contact is open at the back contact and outer upper armature of relay 236. At its outer lower armature relay 237 disconnects negative battery 210 from the grid of tube 220 and this grid begins to charge through resistor 235 to ground which is positive with respect to the polarity applied to the other terminal of condenser 225 from battery 282. When the grid of tube 220 has become sufficiently positive to render the tube conductive current flows from ground through the winding of relay 240, the anode-cathode discharge path of tube 220 to battery 282. Relay 240 operates and at its lower armature and back contact releases the relay 237 which restores to their previous conditions the circuits controlled by its several armatures. No operation is performed as the result of the engagement of the upper armature of relay 240 with its grounded front contact because the path extending from the armature is open at the back contact associated with the middle lower armature of relay 236 which has remained energized. With relay 237 released relay 208 is reoperated to reestablish the closed direct current loop between the line conductors at the station and the switching office recognizes this as the placing of another call and causes a line junctor and the director to be seized and to return a director ready signal to the calling station shown in Fig. 2. As a further result of the release of relay 237 condenser 225 discharges and relay 240 releases. In response to the director ready signal relay 207 is again released and operates the relay 267 which in turn operates relay 261 and tape transmitter 219 is restarted to transmit the figures code combination and the numerical codes identifying the station to which the next message is addressed.

At the station which received the message, assuming that it was a station identical with the station shown in Fig. 2, only the relays corresponding to relays 208 and 224 are in the energized condition during the reception of the message. Upon reception of the shift and letter code "J" signals at the end of the message the contacts corresponding to the contacts 275 close momentarily and operate a relay corresponding to the relay 237. At its outer upper armature it releases the relay corresponding to the relay 208 thereby opening the direct current loop at the station and transmitting its own disconnect signal to the switching center. Since the relay corresponding to relay 292 is not operated no useful operation is performed by the middle upper armature. The inner upper armature seeks to complete a holding circuit through the lower armature and back contact of the relay corresponding to relay 240 as in the case of the calling station. However, the completion of this holding circuit is an idle operation because such holding circuit requires a battery connection supplied by the relay corresponding to 224, the holding circuit of which is interrupted at the middle lower armature and back contact of the relay corresponding to relay 237. Since the relay corresponding to relay 236 did not become operated, the holding circuit for the relay corresponding to relay 224 was not transferred to the ground on the front contact associated with the outer upper armature of relay 236, but remained extended to ground through the middle lower armature and back contact of the relay corresponding to relay 237. With the latter relay operated the holding circuit for the relay corresponding to relay 224 is interrupated and this relay releases, thereby disconnecting battery from the teletypewriter operating motor corresponding to motor 200 and from the prepared holding circuit for the relay corresponding to relay 237 so that this relay releases upon the reopening of the contacts corresponding to contacts 275. In this way the called station has been restored to normal and has transmitted its own disconnect signal which, in cooperation with the disconnect signal transmitted from the calling station, releases the junctor circuit in the manner hereinbefore described.

At the end of the last message in the tape the upper case and letter "H" code combination are transmitted as the disconnect signal and at the calling station this code combination results in the release of relays 224, 208, 236, 261 and 292 and the stopping of motors 241 and 200, thereby restoring the station to normal and at the called station will result in the release of the relays corresponding to relays 208 and 224 thereby restoring that station to normal.

In the initiation of a call from any one subscriber's station served by the switching center to any other subscriber's station served by that center the complete calling code of the called station comprising the shift code and the station call numerical codes should be transmitted twice. In the case of the transmission of the calling code by keyboard transmitter the second transmission of the station calling code should await reception of the three-second spacing signal indicating readiness of the called station or in case that station is busy, of an overflow line to receive the message. In the case of transmission by tape the two sets of station calling codes should be perforated in the tape one following the other. Under these circumstances the second occurrence of the calling code in the tape is transmitted following reception of the three-second spacing signal as a result of the automatic restarting of the tape transmitter. The reason for the dual transmission of the station calling code is that the first set of station calling codes is used by the director for establishing a connection between the calling subscriber and the called subscriber through a junctor circuit and the link circuit. In the event that the called subscriber's line is busy the director makes connection instead to an idle overflow line but in either case the first set of calling codes is used by the director and no record of these codes is made. The second set of station calling codes, being transmitted after the connection has been made either to the called subscriber's station or to an idle overflow line, is transmitted through the established connection in the same manner as the following message and is recorded by the teletypewriter at the called subscriber station or is recorded in the form of perforations in a storage tape by the reperforator which is the receiving instrumentality of the overflow line, and if a printing reperforator is used for this purpose not only are the signals corresponding to the calling codes perforated in the tape but the digits represented by those codes are printed upon the tape. Accordingly the message stored in the overflow line in the form of perforated tape includes the added information enabling the attendant to transmit the message to the subscriber for whom it is intended when that subscriber's line becomes idle. Under the circumstance that the message is routed into an overflow line by the director, failure of the calling subscriber to transmit the second set of station calling codes will result in the storing of a message lacking the necessary directions to the attendant to enable him to effect the retransmission of the message to the intended subscriber.

In the event that, at the time of operation of relay 208 as a result of the momentary operation of key 222 and consequent operation of relay 224, or at the time of reoperation of relay 208 as a result of the sequence of operations comprising closure of contacts 275, operation and locking of relay 237, operation of relay 240 and release of relay 237, no line junctor is available at the switching office, the all-junctors-busy circuit will generate and transmit to the subscriber station the all-junctors-busy signal. When a junctor becomes available the signal will be supplanted by the junctor-available signal which, as stated before, may be the "K" signal or some other signal. These signals will cause the teletypewriter to operate under the control of selector magnet 214, and distributor 219 will not be started because no director-ready signal will be received. The attendant will note the reception of the signals and the failure of the distributor to start, and will disconnect and restart, which may be accomplished by operating key 231 and then operating key 222.

*Transmission of break signals*

As previously stated break key 113 in Fig. 1 forms a short-circuit around resistor 112 and break key 218 in Fig. 2 forms a short-circuit around resistor 217. When either break key is operated it does not open the direct current loop at the station as does the release of relay 104 or relay 208 but merely inserts its associated resistor into that loop, thereby decreasing the line current. This current is insufficient to hold a receiving relay, such as the repeater relays 912 and 913, on its marking contact, so that the response of a line relay to operation of the break key is the same as the response to a normal spacing condition of no current.

Resistors 112 and 217 serve two purposes. They permit sufficient current to flow when their associated break keys are open to hold relays 915 and 952 in the junctor circuit operated, thereby preventing release of these relays which would result in release of the junctor and link circuits, thereby effecting a disconnect. In this way mark, break, space and disconnect signals are represented by full-current, low-current and no-current conditions, the normal space and the disconnect signals differing in duration, and the relays 915 and 952 are slow-release relays so that they will not release on no-current spacing signals normally occurring in message transmission and will not release on the three-second spacing signal used as the director ready and go-ahead signals but will release on a steady spacing condition exceeding three seconds.

*Subscriber initiates a call to be transmitted over a trunk*

The second function of resistors 112 and 217 is to enable the subscriber stations served by the switching center to become connected to a trunk circuit extending to a manual central office instead of to a junctor for connection to another subscriber station served by the automatic switching center. In the Lucek Patent 2,228,279, the Kinkead-Lucek Patent 2,340,599 and the Krecek Patent 2,368,666 hereinbefore identified, a feature is disclosed which is described as first and second choice of outlet for a subscriber station. In accordance with this feature trunks extend from the switching center to two different manual central office stations. A subscriber, upon placing a call by starting his station into operation, may start it in two different ways which will result in the connection of his station on a selective basis to a trunk in one or the other of two groups extending to the two manual central offices.

In the present system there is but a single set of trunks extending to one manual central office and there are in addition the junctor circuits by means of which one subscriber station may communicate directly with another subscriber station. The feature of first and second choice is included in the present system and enables a subscriber to choose to be connected to a trunk extending to the manual central office or to choose to be connected to a junctor for ultimate connection to another subscriber station served by the switching station.

The starting of the stations shown in Figs. 1 and 2 for the purpose of seizing a junctor circuit has been described previously as involving merely the momentary operation of keys 116 and 222 at the respective stations. It has been set forth that the closure of the direct current loops at the subscriber stations resulting from this operation causes marginal relay 514 in the subscriber's line termination circuit of Fig. 5 to operate along with relay 517 and that with relays 514 and 517 operated relay 528 will be operated. The procedure to be followed at the subscriber stations in Figs. 1 and 2 for the purpose of seizing a trunk circuit extending to the manual central office is to operate break keys 113 and 218 at the respective stations and to hold them operated during and for a short interval after the momentary operation of keys 116 and 222 at the respective stations. The operation of keys 116 and 222 causes the closure of the direct current loops at the stations as previously described but with the break keys operated the short-circuits around resistors 112 and 217 are removed and these resistors are included in the loop circuits, so that reduced line current flows, as in the case of a break signal. This reduced current is insufficient to operate marginal relay 514 in the line termination circuit but is sufficient to operate relay 517. Accordingly with relay 514 unoperated relay 517 completes a circuit from ground through its armature and left-hand contact, conductor 526, the lower armature and back contact of relay 514 and the winding of relay 533 which operates.

The situation is somewhat different in the case of a call made from the toll subscriber station shown in Fig. 3. The break key 361 has no resistor associated with it, as is the case in the local subscriber station. However, in order to seize a trunk for connecting the toll subscriber station to the manual central office, break key 361 is operated in conjunction with start key 316 in conformity with the practice at local stations. Due to the fact that the transmission between the toll subscriber station and the switching center is polar the closure of the station circuit to the flow of direct current resulting from the operation of start key 316 with break key 361 operated results in the transmission of a signal of the same current characteristic as ordinary spacing signals. At the toll subscriber's line circuit in Fig. 4, the spacing signal causes the armature of relay 414 to operate to its left-hand contact whereas the armature of relay 414 remains on its right-hand contact when the station in Fig. 3 is started in the marking condition. With relay 414 thus operated, the relay 417, upon being operated by relay 412, completes the circuit of relay 434 instead of the circuit of relay 413. Since relay 413 does not operate relay 428 does not operate. Whereas in accordance with the previously described operation of the circuit shown in Fig. 4 the relay 428, upon operating, connects battery 423 to line conductor 439 through resistors 422 and 441, the relay 434, operating in lieu of relay 428, connects battery 423 to line conductor 439 through resistors 422, 441 and 462. The added resistor 462 limits the current which will flow in line conductors 439 and 539 to a value such that the relay in the line termination circuit 508 corresponding to the relay 514 will not operate. With the relay corresponding to the relay 514 unoperated, the relay corresponding to relay 528 will not be operated but the relay corresponding to relay 533 will be operated. From this it will be apparent that the operation of the subscriber's line termination circuit in Fig. 5 for selective junctor or trunk seizure is the same for local and toll subscriber stations. Upon the release of the break key in Fig. 3 the spacing condition transmitted to the switching center is changed to a marking condition and the armature of relay 414 is reoperated to its right-hand contact thereby releasing relay 434 and operating relay 413 which in turn operates relay 428. In this way the subscriber's line circuit is placed in condition for the transmission of signals between the toll subscriber station and the switching center. Relay 434 has a slow-release characteristic so that it will not cut off the current in line conductors 439 and 539 before relay 428 operates and raises the current to the full marking value.

Figure 11:
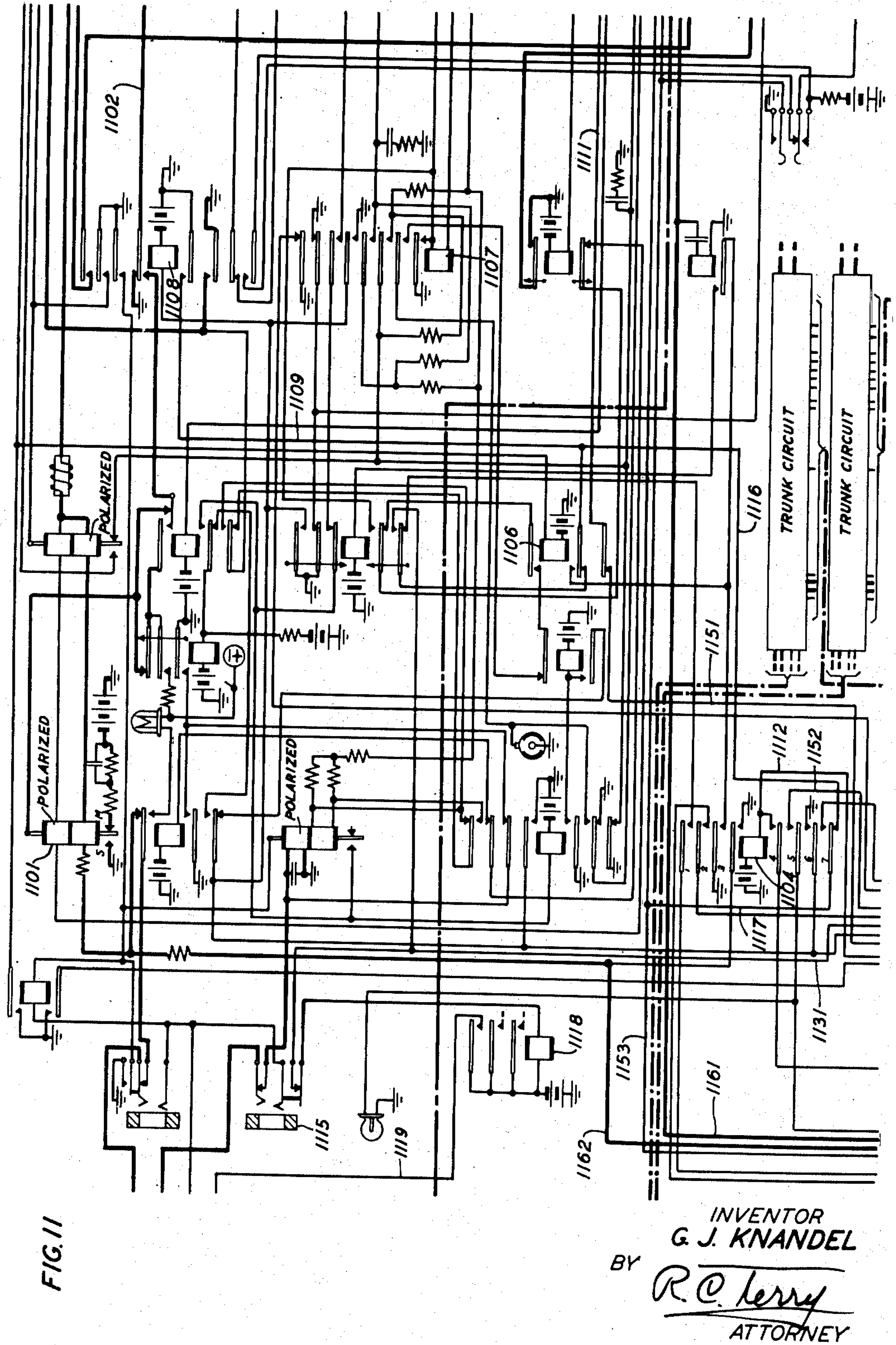
Figs. 11 and 13 show the automatic switching station termination of an automatic signaling operator office trunk circuit extending to a distant central office.
Figure 13:
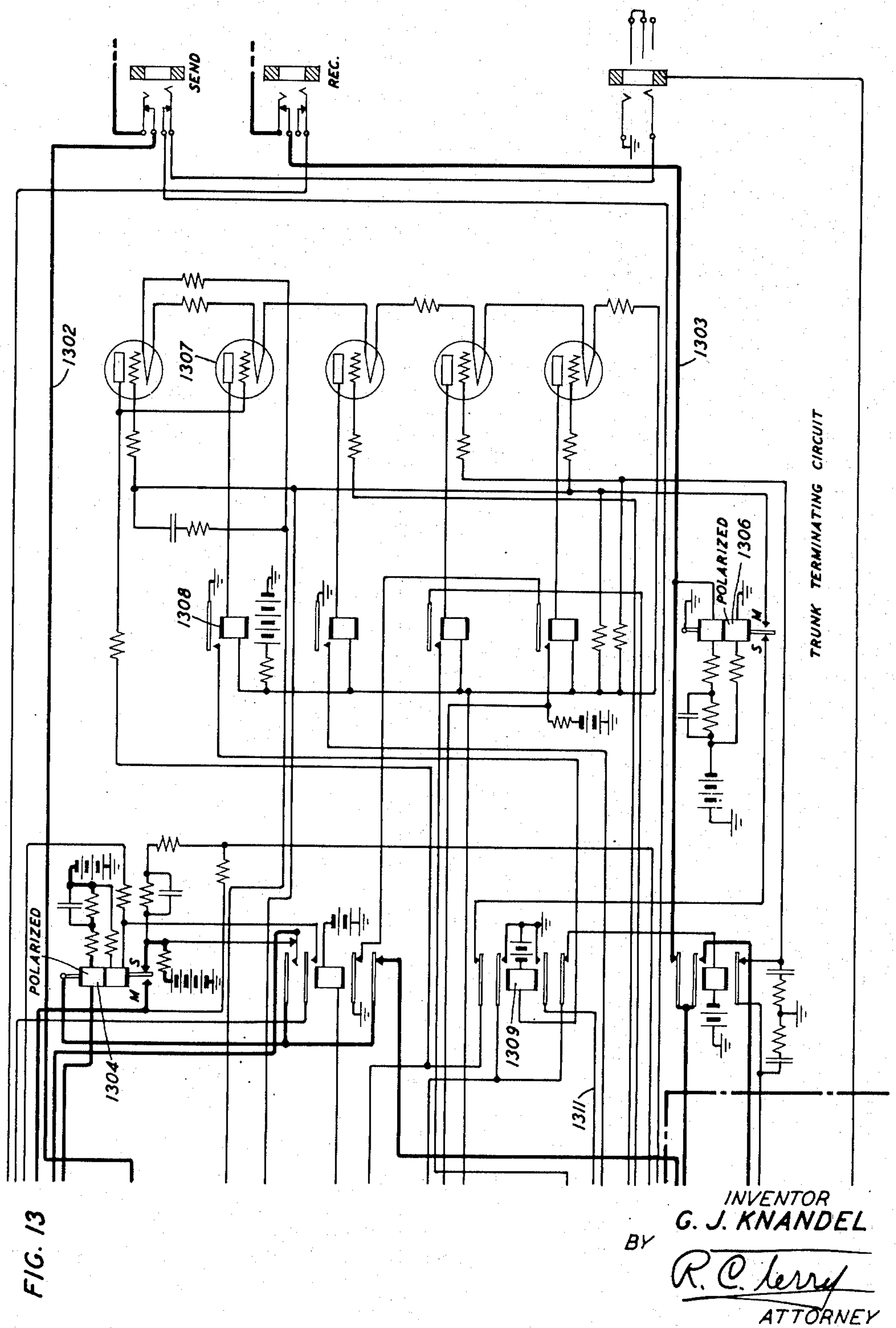

Relay 533 operates to cause the seizure of a trunk circuit instead of a line junctor circuit. At its armature 1 it completes a circuit from ground supplied through interrupter 564, conductor 534, lamp 536, conductor 537 and thence over a path previously traced, including conductors 541, 741, 841, 941 and 1041 and winding of relay 1001 to battery 1002. This causes lamp 536 to flash, indicating that the seizure of a trunk circuit is in progress, and also causes buzzer 1006 to be operated intermittently under the control of relay 1001. At its armature 2 the relay 533 transfers the energizing circuit for the lower winding of relay 514 from conductor 562 and conductor 1462 to conductors 572 and 1472, the latter corresponding to conductor 1462 and being associated with an all-trunks-busy circuit represented diagrammatically in the lower part of Fig. 14 and being identical with that portion of the detailed circuits of Fig. 14 lying to the right of the dot-and-dash line. At its armature 3 and front contact the relay 533 establishes a holding circuit for itself from ground supplied through the armature and left-hand contact of relay 517. At its armature 4 the conductive path extending to the lower armature of relay 522 is transferred from conductors 561 and 1461 of the all-junctors-busy circuit to conductors 571 and 1471 of the all-trunks-busy circuit. At its armature 5 the relay 533 disconnects, from the circuit completed through the upper armature and front contact of relay 618, the winding of relay 1019 and substitutes the winding of relay 1040. As soon as the subscriber at the calling station recloses the break key, full line current flows, causing the operation of relay 514. This does not disturb relay 533 because it remains locked to the ground supplied through the armature and left-hand contact of relay 517. As in the previous description of the operation of the circuit in Fig. 5 the relay 514, at its armature and front contact completes the circuit of relay 528 which operates and in turn operates relay 601 which operates. Upon the operation of relay 618 the relay 1040 operates. It completes a circuit from ground through the left-hand armature of relay 1019 and its own left-hand armature and front contact to conductor 1096, causing the operation of relays 1021, 1022 and 1023. Relay 1021 at its inner right-hand armature and front contact connects a ground through the right-hand armature and front contact and through the winding of relay 1091 which operates. Relay 1091 provides a ground connection for locking relays 1021, 1022 and 1023. At its left-hand armature and front contact the relay 1091 completes a circuit traced over conductors 1032, 932, 832, 1232, 1532, 1632 and 2032 to operate relay 2016. At its inner right-hand armature the relay 1091 completes a circuit from the ground which was supplied to energize the relay, the circuit being extended over conductors 1092, 992, 892 and 1292, the inner lower armature and back contact of relay 1211, conductors 1212 and 1112 and winding of relay 1104 to battery. Figs. 11 and 13 comprise the termination at the switching office of a two-way trunk to a manual switching office. The relay 1104 is a start relay and corresponds with the relay 901 in the line junctor circuit shown in Fig. 9. Its function is to initiate a series of operations which will result in the connection of the calling subscriber's line termination circuit in Fig. 5 through the vertical link circuit conductors 836, 873 and 848 in Fig. 8 and their extensions 736, 773 and 748 in Fig. 7, through the uppermost set of contacts associated with those conductors and the uppermost horizontal conductors of the link circuit to the trunk circuit shown in Figs. 11 and 13. In addition to relay 1211 the relays 1213, 1201, 1214, 1216, 1217 and 1218 comprise a set of relays allocated to the trunk circuit shown in Figs. 11 and 13 and contained in a trunk sequence circuit shown in Fig. 12. The function of the trunk sequence circuit is similar to that of the junctor sequence circuit in Fig. 10, namely to permit the establishment of connections to trunks one at a time. The establishment of a connection from a calling subscriber to a trunk circuit is fully described in the hereinbefore identified Patents 2,340,599 and 2,368,666 and will not be repeated here.

When the connection of a calling subscriber to a trunk circuit has been completed, the relays 1021, 1022, 1023, 1044 and 1091 are released and are available for participation in the establishment of another connection. Relays 1211 and 1213 remain operated for the duration of the connection and it will be noted that relay 1211, at its inner lower armature, disconnects conductor 1292, over which a ground connection was supplied for the operation of relay 1104, from conductor 1212, and the lower armature and front contact of relay 1213 extend a connection from conductor 1292 to the inner lower armature of relay 1221 and to the lower armature of relay 1222, which relays are contained in the sequence circuit for the next trunk and have functions corresponding to those of relays 1211 and 1213 respectively. Similarly the relays 1221 and 1222, when operated, extend the path of conductor 1292 to the inner lower armature of relay 1223 and the lower armature of relay 1227. When these relays are operated the path of conductor 1292 is extended over conductors 1293 and 1493 and winding of relay 1421 to battery. When all of the trunks are busy the relays 1211, 1213, 1221, 1222, 1223 and 1227 will be operated, and upon the operation of relay 1091 in response to an effort by a calling subscriber to seize a trunk circuit the ground applied to conductor 1092 will be extended over conductor 1493 to operate relay 1421. Relay 1421 has the same function with reference to an all-trunks-busy condition that relay 1401 has with reference to an all-junctors-busy condition, namely to register the number of times that attempted trunk seizure occurs during an all-trunks-busy condition. With relays 1213, 1222 and 1227 operated a chain circuit is established from ground through their front contacts and inner upper armatures and through conductors 1294 and 1494 to operate relay 1422. Relay 1422 has the same function with respect to the all-trunks-busy circuit that relay 1402 has with reference to the all-junctors-busy circuit, namely it initiates the generation of letters signals to represent an all-trunks-busy condition and these signals are transmitted over conductors 1471 and 571 to any calling subscriber seeking to seize a trunk when the trunks are busy. A ground connection is supplied over conductors 1472, 572, the front contact and armature 3 of relay 533 and the front contact and outer upper armature of relay 516 to energize the lower winding of relay 514, when the relay 516 has been operated from ground supplied through the front contact and upper armature of relay 1421 to operate relay 516, which in turn operates relay 522, in preparation for the transmission of the all-trunks-busy signal.

Signals transmitted by the subscriber toward the manual switching office are received and repeated by relay 1101 and are retransmitted over conductors 1102 and 1302, certain control relays in Fig. 11 having operated to connect conductor 1102 to the armature of relay 1101. Signals transmitted from the manual switching office toward the subscriber are received over conductor 1303 and are applied through the contacts of certain control relays to the upper winding of repeating relay 1304 the armature of which impresses the received signals on a path including the lower winding of relay 1101, which is the path over which signals are received from the subscriber. From this it will be apparent that transmission through the repeating relay circuits of the switching center terminal of the trunk, in Figs. 11 and 13, is on a half duplex basis.

A call incoming from the manual switching office is evidenced by a steady marking condition on the receiving trunk conductor 1303. This causes the realy 1306 to operate to its marking (right-hand) contact which, after approximately one-half second, causes tube 1307 to operate. Tube 1307 operates relay 1308 which in turn operates relay 1309. Relay 1309 completes a circuit from ground through its inner lower armature, conductors 1311 and 1111, outer lower armature and back contact of relay 1106, conductors 1151 and 1251, winding of relay 1201, conductor 1252, back contact and inner lower armature of relay 1217 to battery and the relay 1201 operates. Relay 1309 also completes the energizing circuit for relay 1107 which operates and locks to ground on its innermost armature. One of the operations performed by relay 1107 is the energization of relay 1108. Relay 1108 completes a circuit from ground through its inner lower armature and front contact, conductors 1109 and 1116, back contact and armature 7 of relay 1104, conductors 1117, 1153, 1253 and 1256 and winding of relay 1211 to battery. Relay 1211 operates over this circuit and extends the ground connection to the winding of relay 1213 which also operates. With relays 1211 and 1213 operated the trunk will test busy to calling subscribers.

With relay 1201 operated as previously mentioned, a circuit is traced beginning in Fig. 20 at a ground on the upper armature of relay 2003 through the back contact, conductor 2002, outer lower armature and back contact of relay 2001, conductor 2027, 1627, 1527, 1727, 1027 and 1017, a chain or continuity circuit comprising back contacts and armatures 7 of relays 1016, 1013, 1011 and 1008, provided these relays are released, which is the condition when none of the junctor sequence circuits is in use for the establishment of a connection through a junctor circuit, conductors 1026, 926, 826, 1226, outer lower armature and back contact of relay 1206, outer lower armature and back contact of relay 1203, outer lower armature and front contact of relay 1201, winding of relay 1214, conductors 1291, 891, 691, chain circuit through the back contacts and upper armatures of relays 651, 652 and 618, provided each of these relays is released, indicative of the fact that the subscriber sequence circuits are not then being used in the completion of a call, and thence over a path traced early in this specification comprising conductors 628, 828, 928, 1028, 1029, 1729, 1529, 1629, 2029 and the upper armature and back contact of relay 2004 to battery 2006. Relay 1214 operates over the circuit just traced and locks to ground supplied through the inner lower armature and front contact of relay 1214. The battery connection supplied over conductor 1291 is extended through the lower armature and front contact of relay 1214 and the winding of relay 1216 to ground and that relay operates.

Relay 1216 completes a circuit from ground through its outer upper armature and front contact, conductors 1290, 1590, left-hand armature and back contact of relay 1507, conductors 1595, 1795, 1706, 1707, 1907 and winding of relay 1902 to battery 1904 and relay 1902 operates. Relay 1216 also extends connections from the armature of receiving relay 1304, which repeats signals received from the manual switching office, and from the lower winding of relay 1101 which repeats signals toward the manual switching office over transmission conductors 1161 and 1162 respectively, 1261 and 1262 respectively, armatures and front contacts of relay 1216, conductors 1263 and 1264 respectively and 1563 and 1564 respectively to conductors 1502 and 1506 respectively, a path being traced from the former through the outer left-hand armature and back contact of relay 1503, conductors 1504 and 1704 to one terminal of the winding of relay 1701 and a path being traced from conductor 1506 through the back contact and outer right-hand armature of relay 1507 to the left-hand armature of relay 1702. These are the paths over which signals will be transmitted between the manual switching office and the director circuit. Relay 1216 also completed a circuit from ground through its inner lower armature and front contact, conductors 1231 and 1131, break contact associated with the ring contact of jack 1117 and winding of relay 1118 to battery. At one of its armatures and front contacts the relay 1118 connects battery over a circuit including conductors 1119 and 719, and winding of Select magnet 721 to ground. The Select magnet conditions for operation all of the sets of link circuit contacts associated with the horizontal link circuit conductors that are connected to the trunk circuit in Figs. 11 and 13, these being the uppermost contacts and horizontal conductors in Fig. 7.

The relay 1902, having been operated, prepared the director circuit shown in Figs. 15, 16, 17, 18 and 19 to receive and decode message address code signals and to operate the proper Hold magnet in the link circuit to establish a connection to a called subscriber station. These operations have been fully described in a foregoing section of this specification entitled "Director Circuit Prepares to Route Subscriber's Call," with this difference, that the director circuit is now associated with the trunk circuit and will transmit its director-ready signal in the previously-described manner over the trunk to the manual switching office and will receive the message address code from that office.

For a more detailed description of the operation of the trunk circuit and of the trunk sequence circuit reference may be had to the hereinbefore-identified Patents 2,340,599 and 2,368,666. As in the case of the operation of a Select magnet for the purpose of establishing a connection between calling and called subscribers through a line junctor and also as in the case of the operation of a Select magnet in connection with the seizure of a trunk by a calling subscriber the operation of the Select magnet 721 causes a ground connection to be extended over conductors 704, 804, 805, 1205, 1505, 1605, 2005 and winding of relay 2001, which operates and disconnects the ground supplied through its outer lower armature and back contact to prevent the attempted routing of any other call by a subscriber's sequence circuit, a junctor sequence circuit or any other trunk sequence circuit.

The director circuit returns a director-ready signal to the manual switching office. In the case of a call by a subscriber to be routed over a junctor circuit to another subscriber as being rector-ready circuit has been described as being a spacing signal of about three seconds duration followed by a steady marking signal. In the case of the transmission of a director-ready signal over a trunk to a manual switching office, the outgoing transmission path of the trunk is in the spacing condition as a normal or idle condition and the director impresses on the outgoing line circuit of the trunk a steady marking condition as the director-ready signal. The reception and decoding of the message address codes by the director circuit, the testing of the called subscriber's line for busy or out-of-order condition, the operation of a Hold magnet to effect the operation of one of the conditioned sets of link circuit contacts to connect the trunk to the called subscriber's line and the release of the director circuit to render it available for routing another call are operations which have been completely described hereinbefore. The transmission of call, recall and disconnect signals between a subscriber and the manual switching office and the restoration of the trunk circuit and trunk sequence circuit to normal following a disconnect are operations that are fully described in Patent 2,340,599 and Patent 2,368,666.

In the event that the director, seeking to extend a call incoming over a trunk to a subscriber station, finds that the subscriber's line tests busy it will seize one of the overflow lines in Figs. 22 and 23 if any is available, and will condition the overflow line to return an answer-back signal and to record the message on the printing reperforator 2307, if it is satisfactory to the originating subscriber served by a remote office to have the message stored in overflow for transmission when the called subscriber's line becomes idle. If it is not satisfactory to the remote calling subscriber to have the message recorded in overflow the operator at the manual switching office will transmit a disconnect signal for releasing the overflow line and for restoring the trunk and sequence circuit to normal.

If the director, in attempting to route a call incoming over the trunk circuit from the manual switching office, finds that the called subscriber's line is busy and that all overflow lines are busy it will, in the manner hereinbefore described, manufacture busy signals and transmit them over the trunk to the manual switching office, at which point the operator should disconnect and attempt to place the call later.

It is to be understood that the above-described arrangements are illustrative of the application of the principles of the invention. Numerous other arrangements may be devised by those skilled in the art without departing from the spirit and scope of the invention.

What is claimed is:

1. In a telegraph switching system, a switching center, a plurality of remote telegraph stations, a line connecting each of said remote stations to said switching center means at said switching center responsive to message-directing signals for selectively interconnecting any two of said lines, and means seizable independently of the selecting attributes of message directing signals when a line represented by received message directing signals is busy for recording the message for subsequent transmission when said busy line becomes idle.

2. In a telegraph switching system, a switching center, a plurality of remote telegraph stations, a line connecting each of said remote stations to said switching center, switching means at said switching center responsive to message-directing signals for selectively interconnecting any two of said lines, a signal recorder in said switching center, and means effective when a line represented by received message-directing signals is busy for connecting said recorder independently of the selecting attributes of said message directing signals to the line over which said message directing signals were received whereby to record the message signals for retransmission when said busy line becomes idle.

3. In a telegraph switching system, a switching center, a plurality of remote telegraph stations, a line connecting each of said remote stations to said switching center, switching means at said switching center responsive to message-directing signals incoming over any one of said lines for connecting said one line to any other of said lines, a signal recorder in said switching center, means for testing the line represented by said incoming message-directing signals for busy or idle condition, and means responsive to a busy condition thereof for connecting said one line to said signal recorder independently of the selecting attributes of said message directing signals whereby to record the message signals for retransmission when said busy line becomes idle.

4. In a telegraph switching system, a switching center, a plurality of remote telegraph stations, a line connecting each of said remote stations to said switching center, switching means at said switching center responsive to message-directing signals incoming over any one of said lines for connecting said one line to any other of said lines, a plurality of signal recorders in said switching center, means for testing the line represented by said incoming message-directing signals for busy or idle condition, and means responsive to a busy condition thereof for connecting said one line to an idle one of said signal recorders whereby to record the message intended for said busy line for retransmission when it becomes idle.

5. In a telegraph switching system, a switching center, a plurality of remote telegraph stations, a line connecting each of said remote stations to said switching center, switching means at said switching center responsive to message-directing signals incoming over any one of said lines for connecting said one line to any other of said lines, a plurality of signal recorders in said switching center, means for testing the line represented by said incoming message-directing signals for busy or idle condition, means responsive to a busy condition of the tested line for connecting said one line to an idle one of said signal recorders whereby to record the message intended for said busy line for retransmission when it becomes idle, and means responsive to a busy condition of all of said recorders for transmitting a busy signal to said one line.

6. In a telegraph exchange system, an automatic switching center, a plurality of telegraph channels extending to another switching center, a plurality of subscriber stations each having a line terminating in said automatic switching center, means at said automatic switching center for interconnecting any of said subscriber station lines and any of said telegraph channels to establish a message transmission path between said subscriber station and said other switching center, and means at said automatic switching center for interconnecting any two of said lines to establish a message transmission path between two of said subscriber stations.

7. In a telegraph exchange system, an automatic switching center, a plurality of telegraph channels extending to another switching center, a plurality of subscriber stations each having a line terminating in said automatic switching center, means at said automatic switching center for interconnecting any of said subscriber station lines and any of said telegraph channels to establish a message transmission path between said subscriber station and said other switching center, means at said automatic switching center for interconnecting any two of said lines to establish a message transmission path between two of said subscriber stations, and means at each of said subscriber stations for selectively causing the activation of either of said interconnecting means.

8. In a telegraph exchange system, an automatic switching center, a plurality of telegraph channels extending to another switching center, a plurality of subscriber stations each having a line terminating in said automatic switching center, means at said automatic switching center for automatically connecting any one of said lines to an idle one of said telegraph channels at the instance of the subscriber station associated with the line, means at said automatic switching center for connecting any one of said telegraph channels to any one of said lines selectively at the instance of said other switching center, and means at said automatic switching center for connecting any one of said lines at the instance of the subscriber station associated therewith to any other one of said lines selectively.

9. In a telegraph exchange system, an automatic switching center, a plurality of telegraph channels extending to another switching center, a plurality of subscriber stations each having a line terminating in said automatic switching center, means at said automatic switching center for automatically connecting any one of said lines to an idle one of said telegraph channels at the instance of the subscriber station associated with the line, means at said automatic switching center for connecting any one of said telegraph channels to any one of said lines selectively at the instance of said other switching center, means at said automatic switching center for connecting any one of said lines at the instance of the subscriber station associated therewith to any other one of said lines selectively, and means at each of said subscriber stations for selectively causing the activation of either the first-mentioned or the last-mentioned connecting means.

10. In a communication system, a plurality of subscribers' lines each terminating in a subscriber station, a switching point, a group of lines extending from said switching point to another switching point, means for automatically connecting a calling one of said subscribers' lines primarily to any other one of said subscribers' lines and secondarily to one of the lines of the group extending to said other switching point, means individual to each subscriber's line for fixing the order of preference between said other subscribers' lines and said group of lines, and means individual to each of said stations for altering the said fixed order of preference.

11. In a communication system, a plurality of subscribers' lines each terminating in a subscriber station, means for automatically connecting a calling one of said subscribers' lines to any other one of said subscribers' lines, a plurality of overflow lines each provided with a reperforator, and means for automatically connecting a calling subscriber's line to one of said overflow lines to provide for recording of the calling subscriber's message when a called subscriber's line is busy.

12. In a communication system, a switching center, a plurality of subscriber stations, a line connecting each of said subscriber stations to said switching center, means for automatically and selectively connecting a calling one of said subscriber lines to any other one of said subscriber lines, a plurality of overflow lines each provided with a reperforator, means for automatically connecting a calling subscriber's line to one of said overflow lines when a called subscriber's line is busy to provide for recording the calling subscriber's message for subsequent transmission, a transmitter associated with said reperforator to transmit the message signals stored by said reperforator, and means under manual control for connecting said transmitter to the called subscriber's line and for initiating operation of said transmitter.

13. In a communication system, a switching center, a plurality of subscriber stations, a line connecting each of said subscriber stations to said switching center, means at said switching center for automatically and selectively connecting a calling one of said subscriber's lines to any other one of said subscriber's lines, a plurality of overflow lines each provided with a reperforator, means for automatically connecting a calling subscriber's line to one of said overflow lines when a called subscriber's line is busy to record the message for subsequent transmission to the called subscriber station, a transmitter associated with each of said reperforators for transmitting message signals recorded by the reperforator, means under manual control for connecting said transmitter to the line extending to the called subscriber station and for initiating operation of said transmitter, and means for indicating completion of the transmission of a message by said transmitter.

14. In a telegraph switching system, a switching center, a subscriber station having a tape transmitter adapted to transmit signals from a perforated tape containing one or more messages each preceded by switching code signals and followed by end-of-message signals, a line connecting said subscriber station to said switching center, a plurality of other subscriber stations each connected by a line to said switching center, means seizable at said switching center for decoding said switching code signals, switching means controlled by said decoding means for selectively connecting the line of said first-mentioned subscriber station to any other of said lines, means responsive to transmission of an end-of-message signal for stopping said tape transmitter, and means responsive to seizure of said decoding means for restarting said transmitter to initiate transmission of the switching code signals preceding the next message.

15. In a telegraph switching system, a switching center, a subscriber station having a tape transmitter adapted to transmit signals from a perforated tape containing one or more messages each preceded by switching code signals and followed by end-of-message signals, a line connecting said subscriber station to said switching center, a plurality of other subscriber stations each connected by a line to said switching center, means seizable at said switching center for decoding said switching code signals, switching means controlled by said decoding means for selectively connecting the line of said first-mentioned subscriber station to any other of said lines, means responsive to transmission of an end-of-message signal for stopping said tape transmitter, means responsive to seizure of said decoding means for restarting said transmitter to initiate transmission of the switching code signals preceding the next message, means for stopping said transmitter after the transmission of said switching code signals, and means responsive to completion of a connection by said connecting means to another of said lines for again restarting said transmitter to initiate transmission of the message.

16. In a telegraph switching system, a switching center, a subscriber station having a tape transmitter adapted to transmit signals from a perforated tape containing one or more messages each preceded by switching code signals and followed by end-of-message signals, a line connecting said subscriber station to said switching center, a plurality of other subscriber stations each connected by a line to said switching center, means seizable at said switching center for decoding said switching code signals, switching means controlled by said decoding means for selectively connecting the line of said first-mentioned subscriber station to any other of said lines, and means for starting, stopping and restarting said tape transmitter in conformity with the progressive conditioning of said decoding means and switching means to accommodate transmission of switching code signals and message signals.

17. In a telegraph switching system, a switching center, a plurality of subscriber stations each having a line terminating at said switching center, means seizable at said switching center by any of said lines for decoding switching code signals, means for signaling over the seizing line to the subscriber station the accomplished seizure of said decoding means, and switching means controlled by said decoding means upon response thereof to switching code signals received over the seizing line for connecting said line to another of said lines for transmission of a message to the station associated with said other line.

18. In a telegraph switching system, a switching center, a plurality of subscriber stations each having a line terminating at said switching center, means seizable at said switching center by any of said lines for decoding switching code signals, means for signaling over the seizing line to the subscriber station readiness of said seized decoding means to respond to switching code signals, and switching means controlled by said decoding means upon response thereof to switching code signals received over the seizing line for connecting said line to another of said lines for transmission of a message to the station associated with said other line.

19. In a telegraph switching system, a switching center, a plurality of subscriber stations each having a line terminating at said switching center; means seizable at said switching center by any of said lines for decoding switching code signals; means for signaling over the seizing line to the subscriber station readiness of said seized decoding means to respond to switching code signals; switching means controlled by said decoding means upon response thereof to switching code signals received over the seizing line for connecting said line to another of said lines for message transmission to the station associated with said other line; and means for signaling over the seizing line to the station associated therewith readiness of the station associated with said other line to receive said message transmission.

GEORGE J. KNANDEL.

References Cited in the file of this patent

UNITED STATES PATENTS

| Number | Name | Date |
|---|---|---|
| 2,193,967 | Kleinschmidt | Mar. 19, 1940 |
| 2,211,927 | Griffins | Aug. 20, 1940 |
| 2,390,656 | Fitch et al. | Dec. 11, 1945 |
| 2,412,955 | Bacon et al. | Dec. 24, 1946 |
| 2,486,699 | Bacon | Nov. 1, 1949 |
| 2,557,392 | Potts | June 19, 1951 |
| 2,560,266 | Bacon et al. | July 10, 1951 |
| 2,570,279 | Ridler et al. | Oct. 9, 1951 |
| 2,608,615 | Oberman | Aug. 26, 1952 |